(12) United States Patent
Farr et al.

(10) Patent No.: US 11,930,881 B2
(45) Date of Patent: *Mar. 19, 2024

(54) SOLE STRUCTURES INCLUDING POLYOLEFIN PLATES AND ARTICLES OF FOOTWEAR FORMED THEREFROM

(71) Applicant: NIKE, Inc., Beaverton, OR (US)

(72) Inventors: Isaac Farr, Beaverton, OR (US);
Devon Frazier, Beaverton, OR (US);
Jeremy D. Walker, Portland, OR (US);
Zachary C. Wright, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,843

(22) Filed: Dec. 20, 2022

(65) Prior Publication Data
US 2023/0134525 A1    May 4, 2023

Related U.S. Application Data

(63) Continuation of application No. 17/592,675, filed on Feb. 4, 2022, now Pat. No. 11,678,718, which is a
(Continued)

(51) Int. Cl.
*B32B 27/12* (2006.01)
*A43B 13/04* (2006.01)
(Continued)

(52) U.S. Cl.
CPC .............. *A43B 13/04* (2013.01); *A43B 13/12* (2013.01); *A43B 13/32* (2013.01); *B32B 7/04* (2013.01);
(Continued)

(58) Field of Classification Search
CPC ............ C12Q 1/6886; C12Q 2600/106; C12Q 2600/136; C12Q 2600/156;
(Continued)

(56) References Cited

U.S. PATENT DOCUMENTS 1,963,577 A    6/1934  Cuozzo
3,190,016 A    6/1965  Hansjosten
(Continued)

FOREIGN PATENT DOCUMENTS

BE    549506 A      12/1959
CN    1259967 A     7/2000
(Continued)

OTHER PUBLICATIONS

International Search Report and Written Opinion for PCT/US2022/074879, dated Nov. 28, 2022.
(Continued)

*Primary Examiner* — Lawrence D Ferguson
(74) *Attorney, Agent, or Firm* — THOMAS | HORSTEMEYER, LLP

(57) ABSTRACT

A variety of plates for footwear are provided including a polyolefin resin. Sole structures and articles of footwear formed therefrom are also provided. Methods of making the polyolefin resin compositions, plates, sole structures, and articles of footwear are also provided. In some aspects, the polyolefin resin composition includes an effective amount of a polymeric resin modifier. The effective amount can be an amount effective to allow the resin composition to pass a flex test, and in particular to pass a flex test without significant change in abrasion loss. In some aspects, the resin composition also includes a clarifying agent to improve optical clarity of the plate. In some aspects, the plates include a textile disposed on one or both of a first side and the second side of the plate. The textile can provide for improved
(Continued)

bonding of the plate to other components such as a chassis or an upper.

18 Claims, 12 Drawing Sheets

Related U.S. Application Data continuation of application No. 16/256,864, filed on Jan. 24, 2019, now Pat. No. 11,272,758.

(60) Provisional application No. 62/671,866, filed on May 15, 2018, provisional application No. 62/657,580, filed on Apr. 13, 2018, provisional application No. 62/621,202, filed on Jan. 24, 2018.

(51) Int. Cl.

| | |
|---|---|
| *A43B 13/12* | (2006.01) |
| *A43B 13/32* | (2006.01) |
| *B32B 7/04* | (2019.01) |
| *B32B 27/18* | (2006.01) |
| *B32B 27/32* | (2006.01) |
| *C08K 5/06* | (2006.01) |
| *C08K 5/1575* | (2006.01) |
| *C08L 23/08* | (2006.01) |
| *C08L 23/12* | (2006.01) |
| *C08L 23/14* | (2006.01) |
| *C08L 23/16* | (2006.01) |
| *C08L 53/00* | (2006.01) |
| *C08L 59/00* | (2006.01) |
| *A43B 5/02* | (2006.01) |
| *A43C 15/16* | (2006.01) |

(52) U.S. Cl.
CPC .............. *B32B 27/12* (2013.01); *B32B 27/18* (2013.01); *B32B 27/32* (2013.01); *B32B 27/327* (2013.01); *C08K 5/06* (2013.01); *C08K 5/1575* (2013.01); *C08L 23/0815* (2013.01); *C08L 23/12* (2013.01); *C08L 23/14* (2013.01); *C08L 23/16* (2013.01); *C08L 53/00* (2013.01); *C08L 59/00* (2013.01); *A43B 5/02* (2013.01); *A43C 15/16* (2013.01); *B32B 2437/02* (2013.01); *C08L 2205/03* (2013.01); *C08L 2207/02* (2013.01)

(58) Field of Classification Search
CPC ... C12Q 2600/172; A43B 13/04; A43B 13/12; A43B 13/32; A43B 5/02; A43C 15/16; B32B 2437/02; B32B 27/12; B32B 27/18; B32B 27/32; B32B 27/327; B32B 7/04; C08K 5/06; C08K 5/1575; C08L 2205/025; C08L 2205/03; C08L 2207/02; C08L 23/0815; C08L 23/12; C08L 23/14; C08L 23/16; C08L 53/00; C08L 59/00
See application file for complete search history.

(56) References Cited

U.S. PATENT DOCUMENTS

| | | |
|---|---|---|
| 3,824,716 A | 7/1974 | Di Paolo |
| 3,851,411 A | 12/1974 | Crosbie et al. |
| 4,120,477 A | 10/1978 | Justamante |
| 4,228,600 A | 10/1980 | Krug et al. |
| 4,434,518 A | 3/1984 | Watanabe |
| 4,542,598 A | 9/1985 | Misevich et al. |
| 5,025,573 A | 6/1991 | Giese et al. |
| 5,118,753 A | 6/1992 | Hikasa et al. |
| 5,300,365 A | 4/1994 | Ogale |
| 5,538,804 A | 7/1996 | Ogale |
| 5,784,809 A | 7/1998 | McDonald |
| 5,820,719 A | 10/1998 | Strickland et al. |
| 6,008,286 A | 12/1999 | Groves |
| 6,308,439 B1 | 10/2001 | Ellis, III |
| 6,497,058 B2 | 12/2002 | Dietrich et al. |
| 6,584,705 B2 | 7/2003 | Lain |
| 6,625,906 B2 | 9/2003 | Mayer et al. |
| 6,948,264 B1 | 9/2005 | Lyden |
| 6,973,746 B2 | 12/2005 | Auger et al. |
| 7,010,867 B2 | 3/2006 | Brown |
| 7,585,796 B2 | 9/2009 | Suzuki et al. |
| 7,619,038 B2 | 11/2009 | Mehta et al. |
| 7,712,231 B2 | 5/2010 | Umezawa et al. |
| 7,823,297 B2 | 11/2010 | Polegato Moretti |
| 7,832,117 B2 | 11/2010 | Auger et al. |
| 7,886,460 B2 | 2/2011 | Teteriatnikov et al. |
| 8,079,159 B1 | 12/2011 | Rosa |
| 8,138,269 B2 | 3/2012 | Kiss et al. |
| 8,171,656 B2 | 5/2012 | Salminen et al. |
| 8,263,707 B2 | 9/2012 | Datta et al. |
| 8,327,560 B2 | 12/2012 | Berend |
| 8,394,892 B2 | 3/2013 | Bokhari et al. |
| 8,470,449 B2 | 6/2013 | Hoya et al. |
| 8,505,216 B2 | 8/2013 | Sokolowski et al. |
| 8,533,977 B2 | 9/2013 | Hide et al. |
| 8,541,502 B2 | 9/2013 | Martinez et al. |
| 8,671,590 B2 | 3/2014 | Rasmussen et al. |
| 8,713,819 B2 | 5/2014 | Auger et al. |
| 8,716,400 B2 | 5/2014 | Carnahan et al. |
| 8,776,397 B2 | 7/2014 | Borel et al. |
| 8,802,774 B2 | 8/2014 | Carnahan et al. |
| 8,822,599 B2 | 9/2014 | Li Pi Shan et al. |
| 8,921,484 B2 | 12/2014 | Liang et al. |
| 9,003,679 B2 | 4/2015 | Baucom et al. |
| 9,167,867 B2 | 10/2015 | Fahmi et al. |
| 9,210,967 B2 | 12/2015 | Gerber |
| 9,289,029 B2 | 3/2016 | Miette |
| 9,468,251 B2 | 10/2016 | Auger |
| 9,480,301 B2 | 11/2016 | Cavaliere et al. |
| 9,486,033 B2 | 11/2016 | Polegato Moretti |
| 9,661,896 B2 | 5/2017 | Elliott et al. |
| 9,775,402 B2 | 10/2017 | Nonogawa et al. |
| 9,833,038 B2 | 12/2017 | Foxen et al. |
| 9,888,741 B2 | 2/2018 | Diard et al. |
| 9,981,437 B2 | 5/2018 | Campos, II et al. |
| 9,982,122 B2 | 5/2018 | Li et al. |
| 10,182,617 B2 | 1/2019 | Craig |
| 10,350,851 B2 | 7/2019 | Salmini et al. |
| 10,548,367 B2 | 2/2020 | Kenens et al. |
| 10,660,403 B2 | 5/2020 | Weidl |
| 10,662,322 B2 | 5/2020 | Inoue |
| 10,932,522 B2 | 3/2021 | Kurcinka et al. |
| 10,966,484 B2 | 4/2021 | Merlo |
| 11,044,963 B2 | 6/2021 | Love et al. |
| 11,116,276 B2 | 9/2021 | Su et al. |
| 11,213,091 B2 | 1/2022 | Constantinou et al. |
| 11,272,758 B2 | 3/2022 | Farr et al. |
| 11,503,875 B2 | 11/2022 | Farr et al. |
| 11,696,620 B2 | 7/2023 | Farr et al. |
| 2001/0007177 A1 | 7/2001 | Brown et al. |
| 2002/0028875 A1 | 3/2002 | Anderle et al. |
| 2003/0131499 A1 | 7/2003 | Silverman |
| 2004/0087751 A1 | 5/2004 | Tau et al. |
| 2004/0166752 A1 | 8/2004 | Taghavi |
| 2004/0168348 A1 | 9/2004 | Strickland |
| 2006/0199906 A1 | 9/2006 | Walton et al. |
| 2008/0249232 A1 | 10/2008 | Datta et al. |
| 2010/0192421 A1 | 8/2010 | Kerns et al. |
| 2011/0061264 A1 | 3/2011 | Solymosi et al. |
| 2012/0198728 A1 | 8/2012 | Farrelly |
| 2013/0255103 A1 | 10/2013 | Dua et al. |
| 2014/0250727 A1 | 9/2014 | Vandernoot et al. |
| 2015/0068066 A1 | 3/2015 | Ludemann et al. |
| 2015/0143720 A1 | 5/2015 | Avar |
| 2015/0351492 A1 | 12/2015 | Dombrow et al. |
| 2016/0128433 A1 | 5/2016 | Downing et al. |
| 2016/0174655 A1 | 6/2016 | Schiller et al. |
| 2016/0219978 A1 | 8/2016 | Elder et al. |

(56) References Cited

U.S. PATENT DOCUMENTS

| | | |
|---|---|---|
| 2016/0242499 A1 | 8/2016 | Droege et al. |
| 2016/0295935 A1 | 10/2016 | Foster et al. |
| 2016/0295971 A1 | 10/2016 | Arnese et al. |
| 2017/0181498 A1 | 6/2017 | Whelan et al. |
| 2017/0273399 A1 | 9/2017 | Nishi |
| 2018/0116337 A1 | 5/2018 | Montross et al. |
| 2018/0125151 A1 | 5/2018 | Möhlmann et al. |
| 2018/0153254 A1 | 6/2018 | Fusco et al. |
| 2018/0327580 A1 | 11/2018 | Minowa et al. |
| 2019/0016079 A1 | 1/2019 | Tanabe et al. |
| 2019/0029361 A1 | 1/2019 | Gopalan et al. |
| 2019/0031870 A1 | 1/2019 | Grestenberger et al. |
| 2019/0045880 A1 | 2/2019 | Li et al. |
| 2019/0098946 A1 | 4/2019 | Bee et al. |
| 2019/0116926 A1 | 4/2019 | Constantinou et al. |
| 2019/0223547 A1 | 7/2019 | Farr et al. |
| 2019/0225784 A1 | 7/2019 | Farr et al. |
| 2019/0335852 A1 | 11/2019 | Constantinou et al. |
| 2019/0343220 A1 | 11/2019 | Farr |
| 2019/0343221 A1 | 11/2019 | Farr et al. |
| 2019/0380434 A1 | 12/2019 | Luh |
| 2020/0275738 A1 | 9/2020 | Rhenter |
| 2021/0015210 A1 | 1/2021 | Farr et al. |
| 2021/0022445 A1 | 1/2021 | Dua et al. |
| 2021/0085025 A1 | 3/2021 | Geis et al. |
| 2021/0214536 A1 | 7/2021 | Tateishi |
| 2021/0235812 A1 | 8/2021 | Bartel et al. |
| 2022/0142295 A1 | 5/2022 | Laverty |
| 2022/0402236 A1 | 12/2022 | Dua et al. |

FOREIGN PATENT DOCUMENTS

| | | |
|---|---|---|
| CN | 1531883 A | 9/2004 |
| CN | 1537484 A | 10/2004 |
| CN | 1796448 A | 7/2006 |
| CN | 101389469 A | 3/2009 |
| CN | 101466784 A | 6/2009 |
| CN | 104824901 A | 8/2015 |
| CN | 105415818 A | 3/2016 |
| CN | 206525647 U | 9/2017 |
| DE | 1865048 U | 1/1963 |
| DE | 2709546 A1 | 9/1978 |
| EP | 0962459 A1 | 12/1999 |
| EP | 1504688 A1 | 2/2005 |
| EP | 1591031 A1 | 11/2005 |
| EP | 1820821 A1 | 8/2007 |
| EP | 2471858 A1 | 7/2012 |
| EP | 3005897 A1 | 4/2016 |
| EP | 3168261 A1 | 5/2017 |
| EP | 3168361 A1 | 5/2017 |
| EP | 3179877 A2 | 6/2017 |
| EP | 3199586 A1 | 8/2017 |
| EP | 3245889 A1 | 11/2017 |
| EP | 3315040 A2 | 5/2018 |
| EP | 3427603 A1 | 1/2019 |
| EP | 2471859 A1 | 7/2021 |
| FR | 1109855 A | 2/1956 |
| FR | 2775875 A1 | 9/1999 |
| FR | 2898252 A1 | 9/2007 |
| GB | 1062411 A | 3/1967 |
| GB | 2425706 A | 11/2006 |
| JP | 8-113681 A | 5/1996 |
| JP | 2000210102 A | 8/2000 |
| JP | 2005278989 A | 10/2005 |
| KR | 20170053782 A | 5/2017 |
| NL | 272430 A | 12/1960 |
| NO | 2017104452 A1 | 6/2017 |
| WO | 98/39385 A1 | 9/1998 |
| WO | 0001528 A1 | 1/2000 |
| WO | 2003005845 A1 | 1/2003 |
| WO | 2006065648 A1 | 6/2006 |
| WO | 2007120147 A1 | 10/2007 |
| WO | 2017082358 A1 | 5/2017 |
| WO | 2017115840 A1 | 7/2017 |
| WO | 2017141200 A1 | 8/2017 |

OTHER PUBLICATIONS

International Preliminary Report on Patentability for PCT/US2019/015021, dated Jul. 7, 2020.
International Preliminary Report on Patentability for PCT/US2022/072223, dated Dec. 12, 2022.
Written Opinion for PCT/US2019/015016, dated Nov. 20, 2019.
International Search Report and Written Opinion for PCT/US2022/072223, dated Aug. 22, 2022.
Written Opinion for PCT/US2019/031392, dated Apr. 1, 2020.
Written Opinion for PCT/US2019/015021, dated Mar. 26, 2020.
International Search Report and Written Opinion for PCT/US2019/031392, dated Sep. 6, 2019.
International Preliminary Report on Patentability for PCT/US2019/031392, dated Aug. 27, 2020.
International Search Report and Written Opinion for PCT/US2019/015016 dated Jul. 29, 2019.
Written Opinion for PCT/US2019/015021, dated May 11, 2020.
International Search Report and Written Opinion for PCT/US2019/015021, dated Jun. 5, 2019.
International Preliminary Report on Patentability for PCT/US2019/031389, dated Apr. 3, 2020.
"Waterborne Adhesives and Sealants," Apr. 17, 2017, Polymer Properties Database available at https://web.archive.org/web/20170417122206/https://polymerdatabase.com/Adhesives/WB%20Adhesives.html. (Year: 2017).
Written Opinion for PCT/US2019/015021, dated Jan. 8, 2020.
"Present Situation and Development of Thermoplastic Elastomers", Lei Xiaoping, et al., Fiber Composites, No. 2.
Derwent Abstract for RO 93151 A, Dec. 1987, 1 page.
International Search Report and Written Opinion for PCT/US2019/031389, dated Sep. 6, 2019.
International Preliminary Report on Patentability for PCT/US2019/015016, dated Feb. 19, 2020.
International Preliminary Report on Patentability for PCT/US2022/074879, dated Mar. 30, 2023.

SOLE STRUCTURES INCLUDING POLYOLEFIN PLATES AND ARTICLES OF FOOTWEAR FORMED THEREFROM

CROSS-REFERENCE TO RELATED APPLICATIONS

This application is a continuation of co-pending U.S. nonprovisional application entitled "SOLE STRUCTURES INCLUDING POLYOLEFIN PLATES AND ARTICLES OF FOOTWEAR FORMED THEREFROM" having Ser. No. 17/592,675, filed Feb. 4, 2022, which claims priority to, and the benefit of, co-pending U.S. nonprovisional application entitled "SOLE STRUCTURES INCLUDING POLYOLEFIN PLATES AND ARTICLES OF FOOTWEAR FORMED THEREFROM" having Ser. No. 16/256,864, filed Jan. 24, 2019, now issued as U.S. Pat. No. 11,272,758, which claims priority to, and the benefit of, co-pending U.S. provisional application entitled "PLATES AND OTHER COMPONENTS INCLUDING POLYOLEFIN RESINS AND ARTICLES OF FOOTWEAR FORMED THEREFROM" having Ser. No. 62/621,202, filed Jan. 24, 2018; co-pending U.S. provisional application entitled "SOLE STRUCTURES INCLUDING POLYOLEFIN PLATES AND ARTICLES OF FOOTWEAR FORMED THEREFROM" having Ser. No. 62/657,580, filed Apr. 13, 2018; and co-pending U.S. provisional application entitled "SOLE STRUCTURES INCLUDING POLYOLEFIN PLATES AND ARTICLES OF FOOTWEAR FORMED THEREFROM" having Ser. No. 62/671,866, filed May 15, 2018; the contents of which are all incorporated by reference in their entirety.

TECHNICAL FIELD

The present disclosure generally relates to sole structures and plates including polyolefin resins and articles of footwear including said sole structures.

BACKGROUND

The design and manufacture of footwear and sporting equipment involves a variety of factors from the aesthetic aspects, to the comfort and feel, to the performance and durability. While design and fashion may be rapidly changing, the demand for increasing performance in the footwear and sporting equipment market is unchanging. In addition, the market has shifted to demand lower-cost and recyclable materials still capable of meeting increasing performance demands. To balance these demands, designers of footwear and sporting equipment employ a variety of materials and designs for the various components.

BRIEF DESCRIPTION OF THE DRAWINGS

Further aspects of the present disclosure will be readily appreciated upon review of the detailed description, described below, when taken in conjunction with the accompanying drawings.

FIG. 1A is a lateral side perspective view of the exemplary article of athletic footwear. FIG. 1B is a lateral side elevational view of the exemplary article of athletic footwear. FIG. 1C is a medial side elevational view of the exemplary article of athletic footwear. FIG. 1D is a top view of the exemplary article of athletic footwear. FIG. 1E is a front view of the exemplary article of athletic footwear. FIG. 1F is a rear view of the exemplary article of athletic footwear. FIG. 1G is an exploded perspective view of the exemplary article of athletic footwear. FIG. 1H is a sectional view along 1-1 of the exemplary article of athletic footwear.

FIG. 2A is a lateral side elevational view of the exemplary article of athletic footwear. FIG. 2B is an exploded perspective view of the second exemplary article of athletic footwear. FIG. 2C is a sectional view along 2-2 of the second exemplary article of athletic footwear.

FIG. 4A is a lateral side elevational view of the exemplary article of athletic footwear. FIG. 4B is an exploded perspective view of the second exemplary article of athletic footwear. FIG. 4C is a sectional view along 4-4 of the second exemplary article of athletic footwear.

FIG. 5A is a lateral side elevational view of the fifth exemplary article of athletic footwear. FIG. 5B is an exploded perspective view of the fifth exemplary article of athletic footwear

DETAILED DESCRIPTION

Figure 1A:
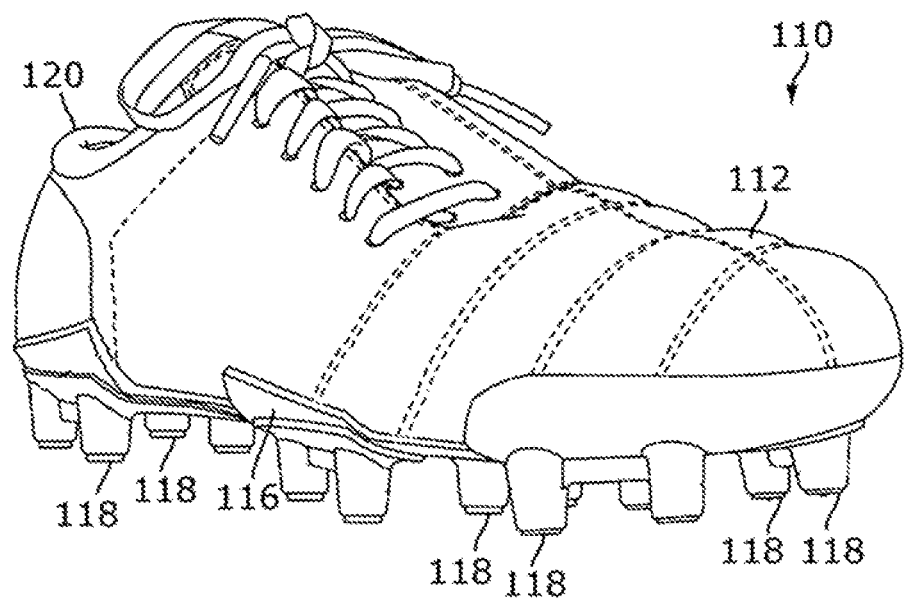
FIGS. 1A-1H depict an exemplary article of athletic footwear.

State of the art specialty polymers for footwear and sporting equipment include polymers such as polyurethane and polyamide polymers, but there remains a need for lower-cost alternatives to these performance polymers, especially lower-cost alternatives that are recyclable and readily processable. Alternatives such as polyolefins, while cost-effective, have traditionally suffered from poor mechanical properties and poor surfaces and surface energies for bonding. New designs and materials are needed. In particular, there remains a need for improved polymer resins for making components of footwear and sporting equipment which are resistant to stress whitening or cracking when flexed under cold conditions, resistant to abrasion, and that are capable of adequate bonding for footwear and other athletic equipment applications.

In various aspects, this disclosure provides sole structures including a plate containing a polyolefin resin. In some aspects, the sole structures include the plate and a textile on one or more surfaces of the plate. The textile can improve the bonding of other components (e.g. an upper or a chassis) to the plate. The textile can also be used for decorative purposes. Plates having the polyolefin resin compositions can have improved mechanical properties making them particularly suitable for use in components for footwear and sporting equipment. Specifically, these resin compositions are both resistant to stress whitening or cracking when flexed under cold conditions and resistant to abrasion to the levels needed for use in footwear and sporting equipment. The present disclosure provides a variety of plates for articles of footwear which include these polyolefin resin compositions.

In some aspects, this disclosure provides a sole structure for an article of footwear, the sole structure having a plate containing a polyolefin resin, the plate having a first side and a second side, wherein the first side is configured to be ground-facing when the plate is a component of an article of footwear; and a textile disposed on one or both of the first side and the second side. In some aspects, the sole structure further includes a chassis configured to be on the first side of the plate. The chassis can wrap around the plate and engage or be attached to an upper when the sole structure is a component of an article of footwear, for example the chassis can attach to the upper at the bite line. In some aspects, the sole structures do not include a textile, e.g. the sole structure can include the plate and a chassis as described above and detailed more fully below.

In various aspects, this disclosure also provides articles of footwear including a sole structure described herein.

Before the present disclosure is described in greater detail, it is to be understood that this disclosure is not limited to particular aspects described, and as such may, of course, vary. Other systems, methods, features, and advantages of resin compositions and articles and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Sole Structures and Articles of Footwear Made Therefrom

In some aspects, the present disclosure is directed to sole structures including a plate containing a polyolefin resin. The present disclosure also provides articles of footwear including the sole structures. As discussed below, the plates containing the polyolefin resin compositions desirably exhibit high levels of mechanical strength and yet flexural durability. However, applicants have found that in some aspects, when polyolefin resin compositions are used in the plates, bonding to a surface of the plate (e.g. bonding between the plate and the upper) may be unsatisfactory. Therefore, in some aspects, the sole structures include the plate and a textile disposed on one or more surfaces of the plate. Not wishing to be bound by any particular theory, it is believed that including the textile disposed on one or more surfaces of the plate can lead to improved bonding between the plate and the upper, particularly when the upper is formed of a different polymeric resin than the plate. In one example, using a textile comprising fibers or yarns formed of a polymeric material having a different surface energy as compared to the surface energy of the polyolefin resin of the plate may facilitate bonding between an upper which comprises a polymeric material having a surface energy which is closer to the surface energy of the textile than to the surface energy of the polyolefin resin of the plate, thereby increasing the strength of a bond between the plate and the upper as compared to using a plate without the textile. Using a textile can provide a textured surface having a greater surface area, providing greater opportunity to form mechanical bonds between the upper and the plate, thereby increasing the strength of a bond between the plate and the upper as compared to using a plate without the textile. As an additional benefit, the textile can be used to provide a decorative or stylistic surface in some aspects.

Figure 1B:
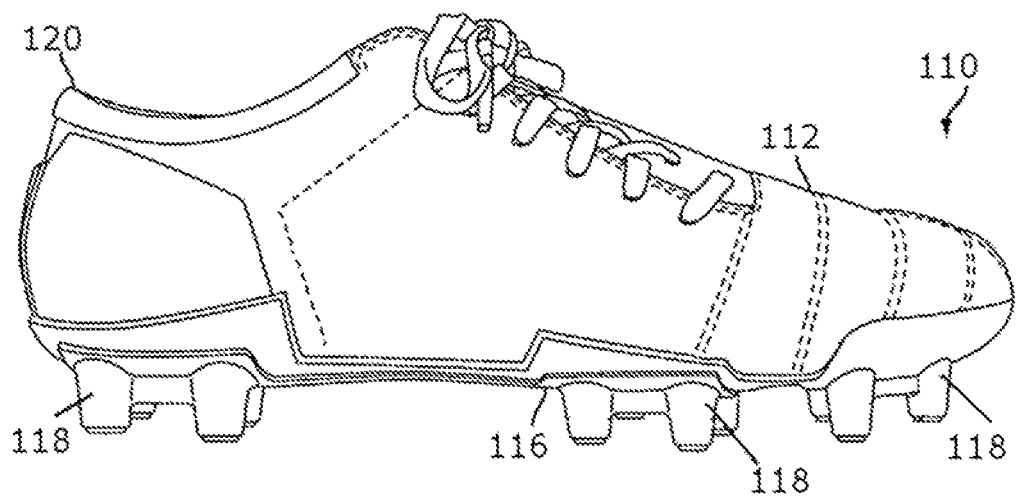
Figure 1C:
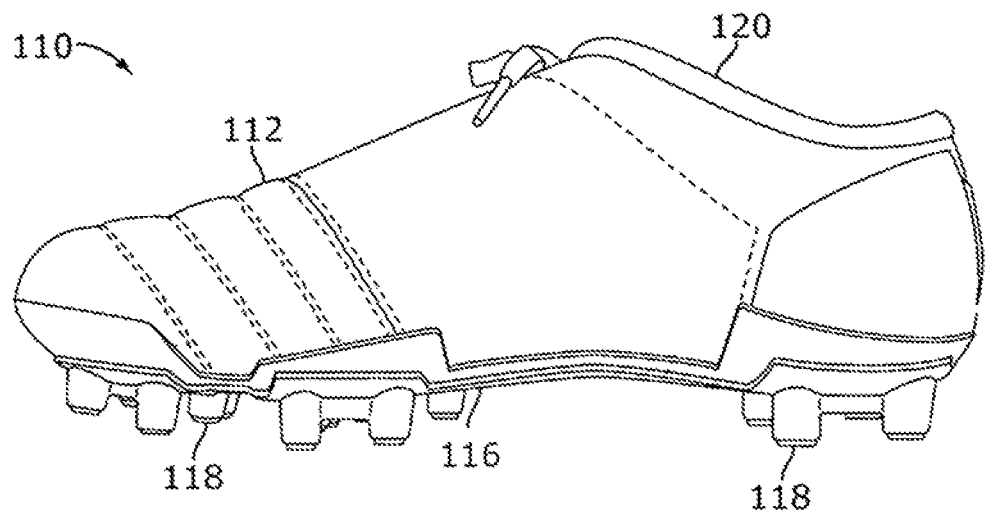
Figure 1D:
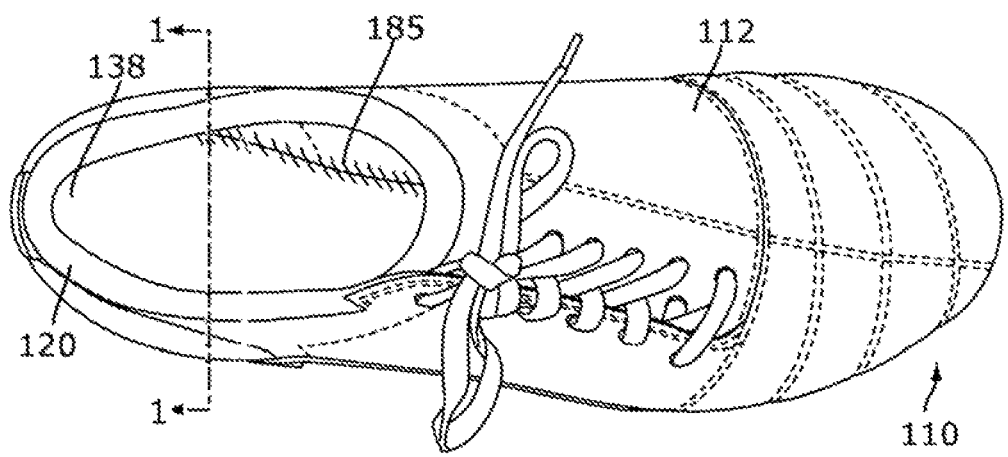
Figure 1E:
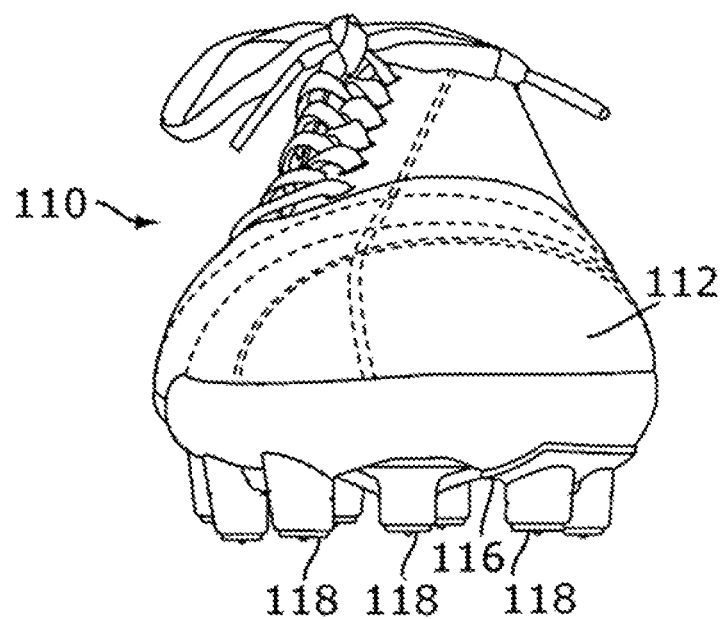
Figure 1F:
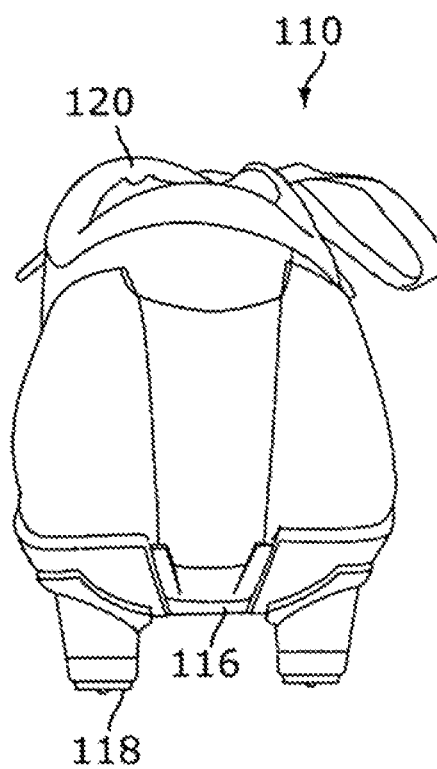

FIG. 1A is a lateral side perspective view of an exemplary cleated article of athletic footwear 110, for example a soccer/futbol boot. As seen in FIG. 1A, the article of footwear 110 includes an upper 112 and a sole structure 113, which includes a plate 116 and a textile 114 disposed on the upper side 152 of the plate. The textile 114 is located between the plate 116 and the upper 112. The plate 116 includes multiple traction elements 118. When worn, traction elements 118 provide traction to a wearer so as to enhance stability. One or more of the traction elements 118 can be integrally formed with the plate, as illustrated in FIG. 1A, or can be removable. Optionally, one or more of the traction elements 118 can include a traction element tip (not pictured) configured to be ground-contacting. The traction element tip can be integrally formed with the traction element 118. Optionally, the traction element tip can be formed of a different material (e.g., a metal, or a polymeric material containing different polymers) than the rest of the traction element 118. FIG. 1B is a lateral side elevational view of article of footwear 110. When the article of footwear 110 is worn, the lateral side of the article 110 is generally oriented on the side facing away from the centerline of the wearer's body. FIG. 1C is a medial side elevational view of the article of footwear 110. When the article of footwear 110 is worn, the medial side generally faces toward the centerline of the wearer's body. FIG. 1D is a top view of the article of footwear 110 (with no sock liner in place) and without a lasting board or other board-like member 115, and further shows upper 112. Upper 112 includes a padded collar 120. Alternatively or in addition, the upper can include a region configured to extend up to or over a wearer's ankle (not illustrated). In at least one aspect, upper 112 is tongueless, with the upper wrapping from the medial side of the wearer's foot, over the top of the foot, and under the lateral side portion of the upper, as illustrated in FIG. 1D. Alternatively, the article of footwear can include a tongue (not illustrated). As illustrated in FIG. 1A-1G, the laces of the article of footwear 110 optionally can be located on the lateral side of the article. In other examples, the article of footwear may have a slip-on design or may include a closure system other than laces (not illustrated). FIG. 1E and FIG. 1F are, respectively, front and rear elevational views of the article of footwear 110.

Figure 1G:
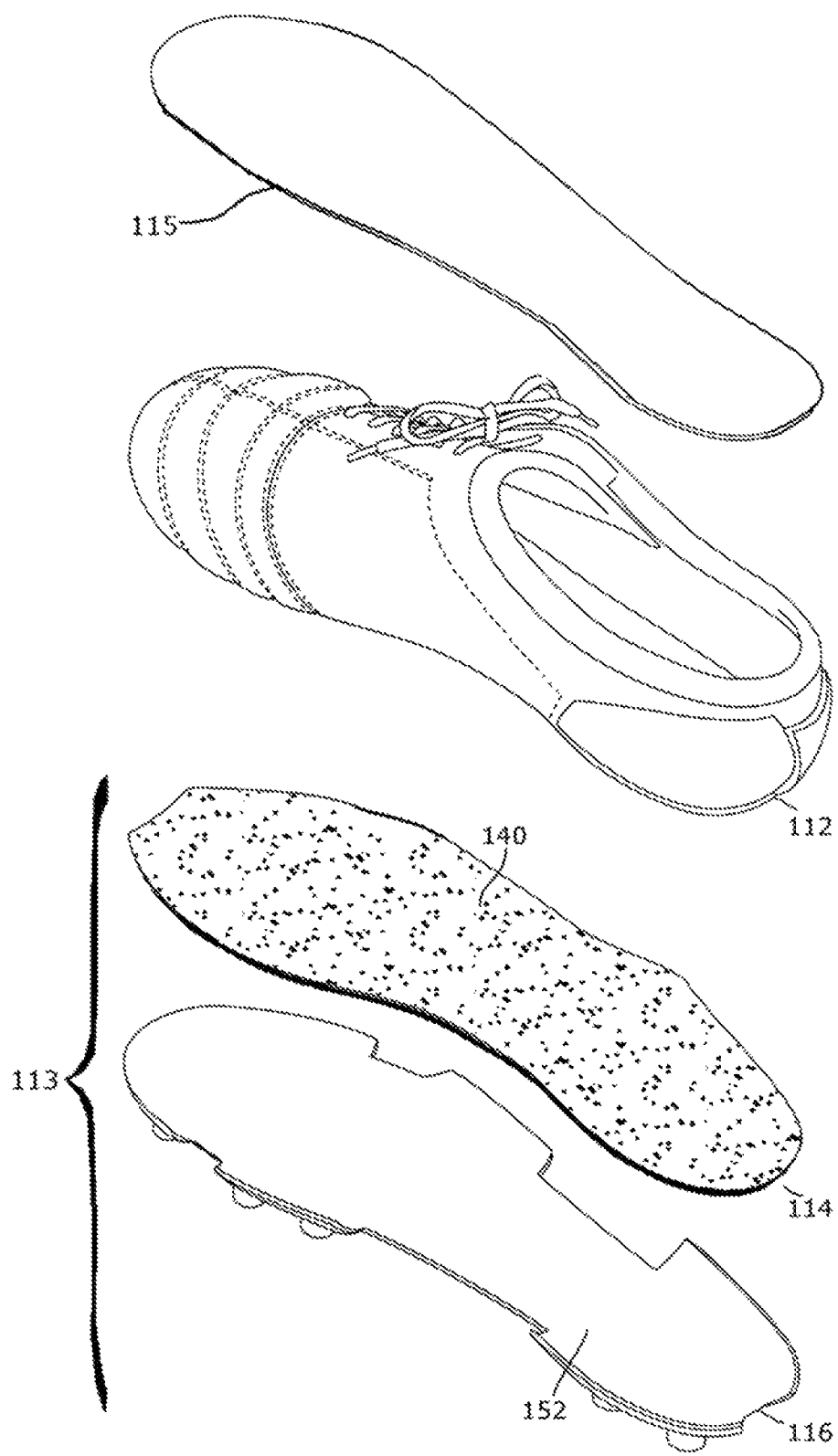
Figure 1H:
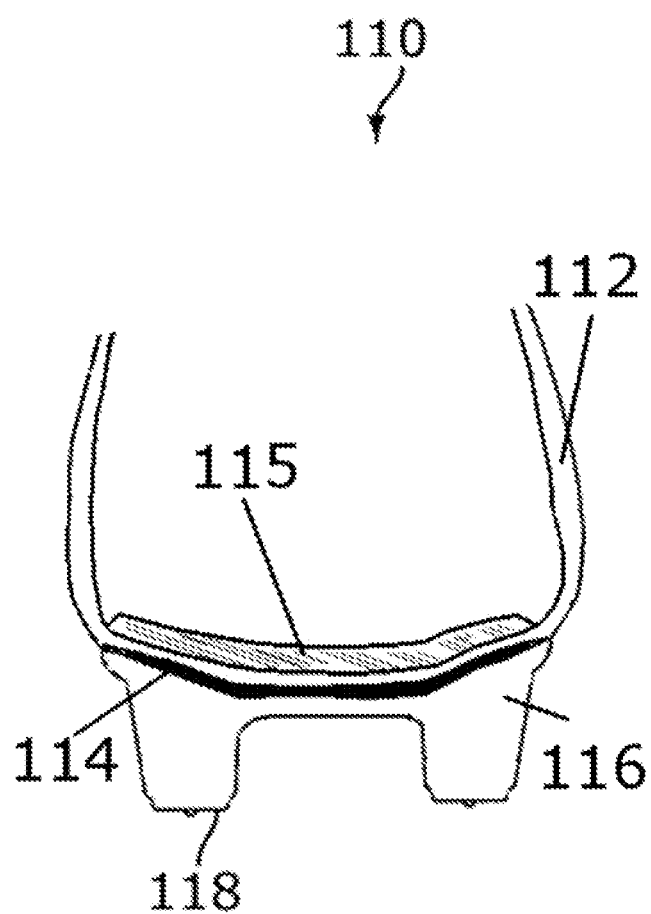

FIG. 1G is an exploded perspective view of the article of footwear 110 showing upper 112, plate 116, and textile 114. As seen in FIG. 1D, upper 112 includes a strobel 138. As illustrated in FIG. 1D, the strobel 138 is roughly the shape of a wearer's foot, and closes the bottom of the upper 112, and is stitched to other components to form the upper 112 along the periphery of the strobel 138 with stitching 185. A lasting board or other board-like member 115 can be located above or below the strobel 138. In some aspects, a lasting board or other board-like member can replace the strobel. The lasting board or other board-like member 115 can extend substantially the entire length of the plate, or can be present in a portion of the length of the plate, such as, for example, in the toe region 130, or in the midfoot region, or in the heel region. Upper 112 including strobel 138 is bonded to the upper surface 140 of the textile 114 (FIGS. 1G-1H). The lower surface 142 of the textile 114 can be bonded or melded to the upper surface 152 of the plate 116. In some aspects, the lower surface 142 of the textile 114 can be mechanically bonded to the upper surface 152 of the plate 116 by melding polymers in the textile 114 and the polymeric resin of the plate 116. Alternatively or in addition, upper 112 including strobel 138 are mechanically bonded to the upper surface 140 of the textile 114 by melding the polymeric resin of the upper 112 or strobel 138 with the polymeric resin of the plate 116. In some aspects, the bonding can include both adhesive bonding and mechanical bonding.

In at least one aspect, plate 116 and textile 114 are first bonded before upper 112 and/or strobel 138 is bonded to textile 114. In some aspects, the article of footwear 110 can include a removable sock liner (not pictured). As is known in the art, a sock liner conforms to and lines the inner bottom surface of a shoe and is the component contacted by the sole (or socked sole) of a wearer's foot.

Figure 2A:
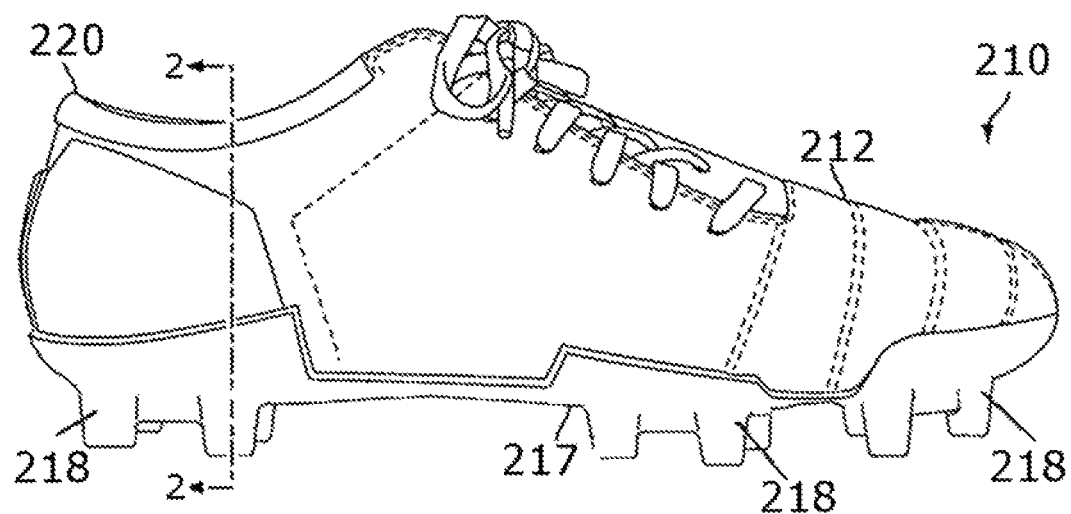
FIGS. 2A-2C depict a second exemplary article of athletic footwear.
Figure 2B:
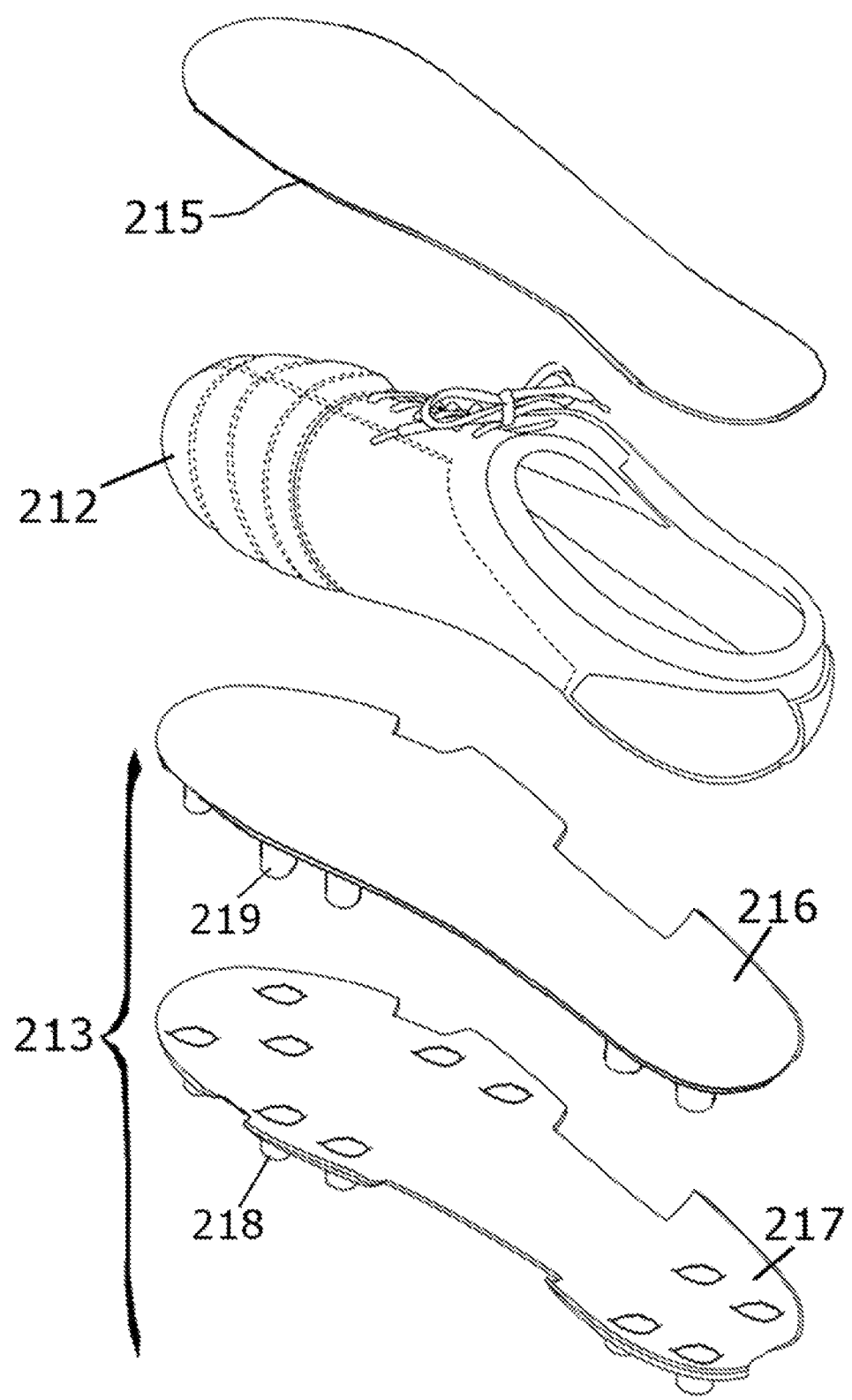
Figure 2C:
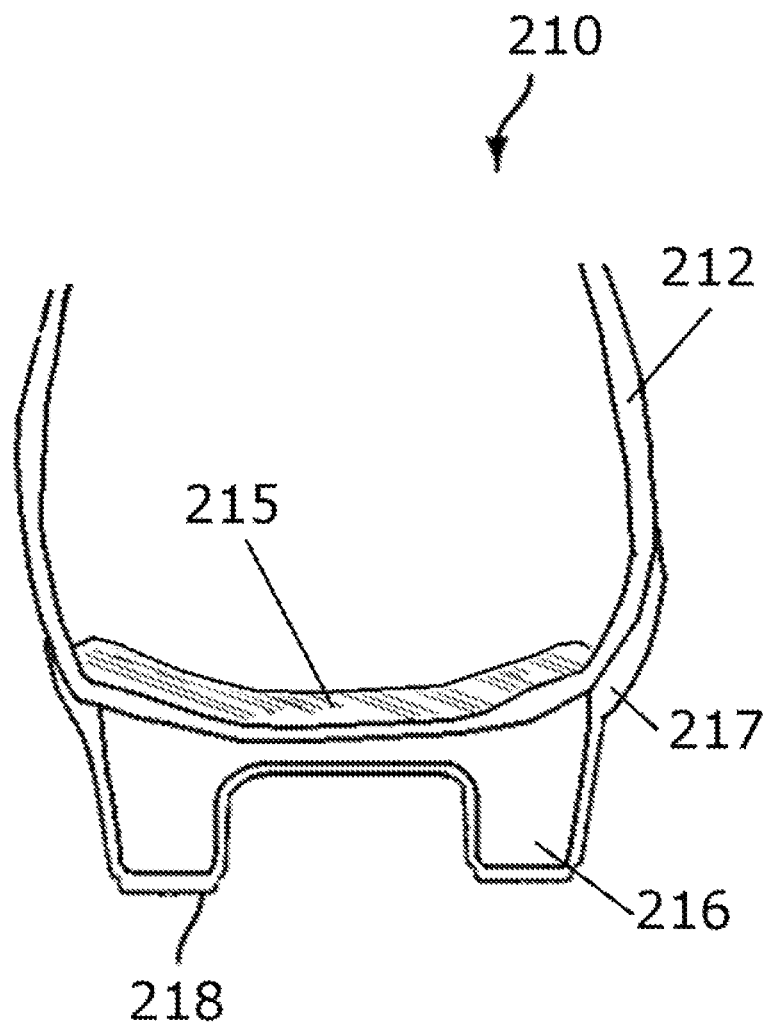

FIGS. 2A-2C depict a second exemplary article of athletic footwear. FIG. 2A is a lateral side elevational view of the exemplary article of athletic footwear. FIG. 2B is an exploded perspective view of the second exemplary article of athletic footwear. FIG. 2C is a sectional view along 2-2 of the second exemplary article of athletic footwear. FIG. 2A is a lateral side elevational view of an exemplary article of footwear 210 that does not have a textile. The article of footwear 210 includes an upper 212 and a sole structure 213 having a plate 216 and a chassis 217. The chassis 217 includes multiple traction elements 218. The traction elements 218 can be formed entirely from the chassis 217 material or, as pictured in FIG. 2B, the traction elements 118 can have a corresponding inner traction element 219 that is formed in the plate 216 and encased by the chassis 217. Optionally, one or more of the traction elements 218 can include a traction element tip (not pictured) configured to be ground-contacting. The article of footwear 210 can include a lasting board member 215 which can extend substantially the entire length of the plate 216.

Figure 3:
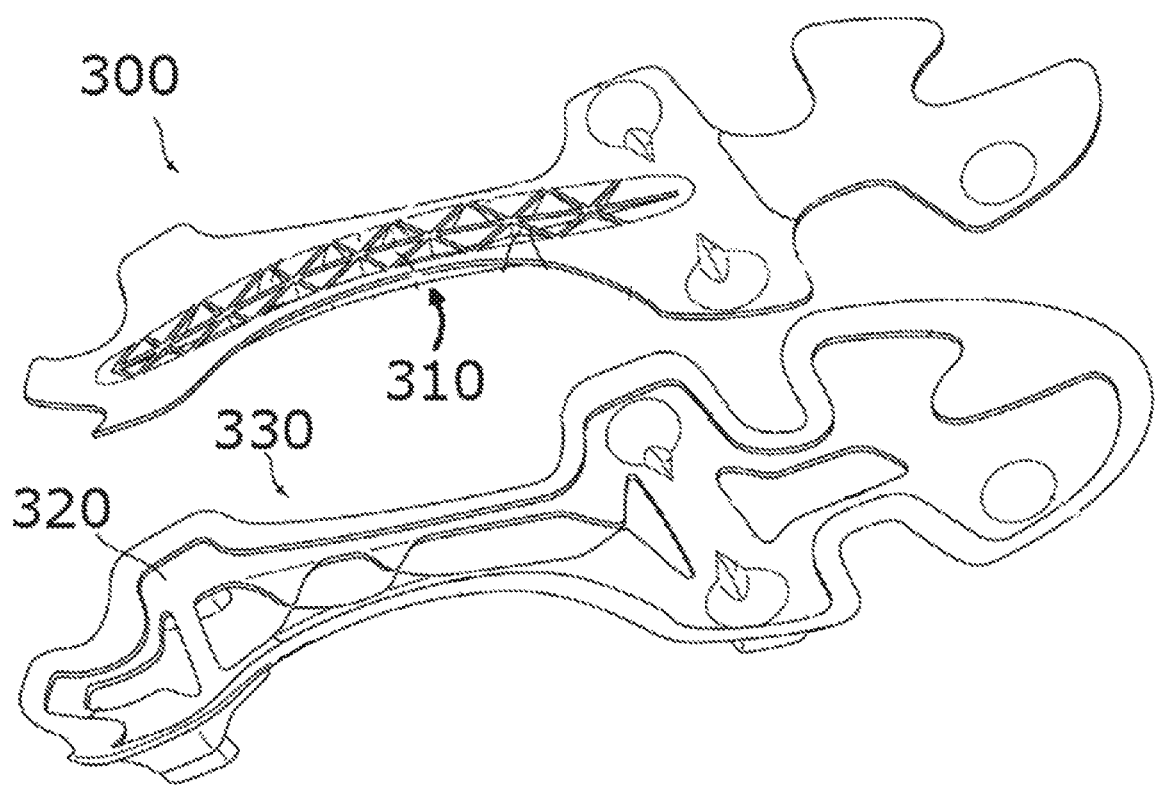
FIG. 3 depicts an exploded view of a third exemplary sole structure having a chassis and a rigid plate providing rigidity without adding substantial amounts of extra material, and therefore maintaining a low weight.

In some aspects, the sole structure may include a plate to provide rigidity, strength, and/or support without substantially adding weight. For example, some exemplary sole structure aspects may include a plate having certain features that provide resistance to vertical bending, lateral bending, and/or torsion. As depicted in FIG. 3, the plate 300 can include a reinforcing rib 310 longitudinally along the plate. The reinforcing rib can include a hollow structure, and thus, may provide rigidity without adding substantial amounts of extra material, and therefore maintains a low weight. The plate 300 can sit within a chassis 330, for example with a recess 320 in the chassis 330.

Figure 4A:
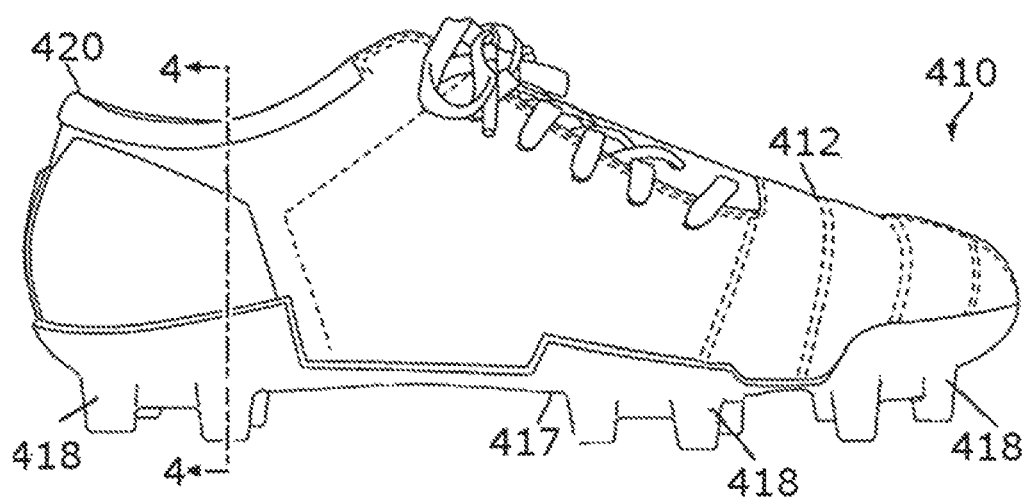
FIGS. 4A-4C depict a fourth exemplary article of athletic footwear.
Figure 4B:
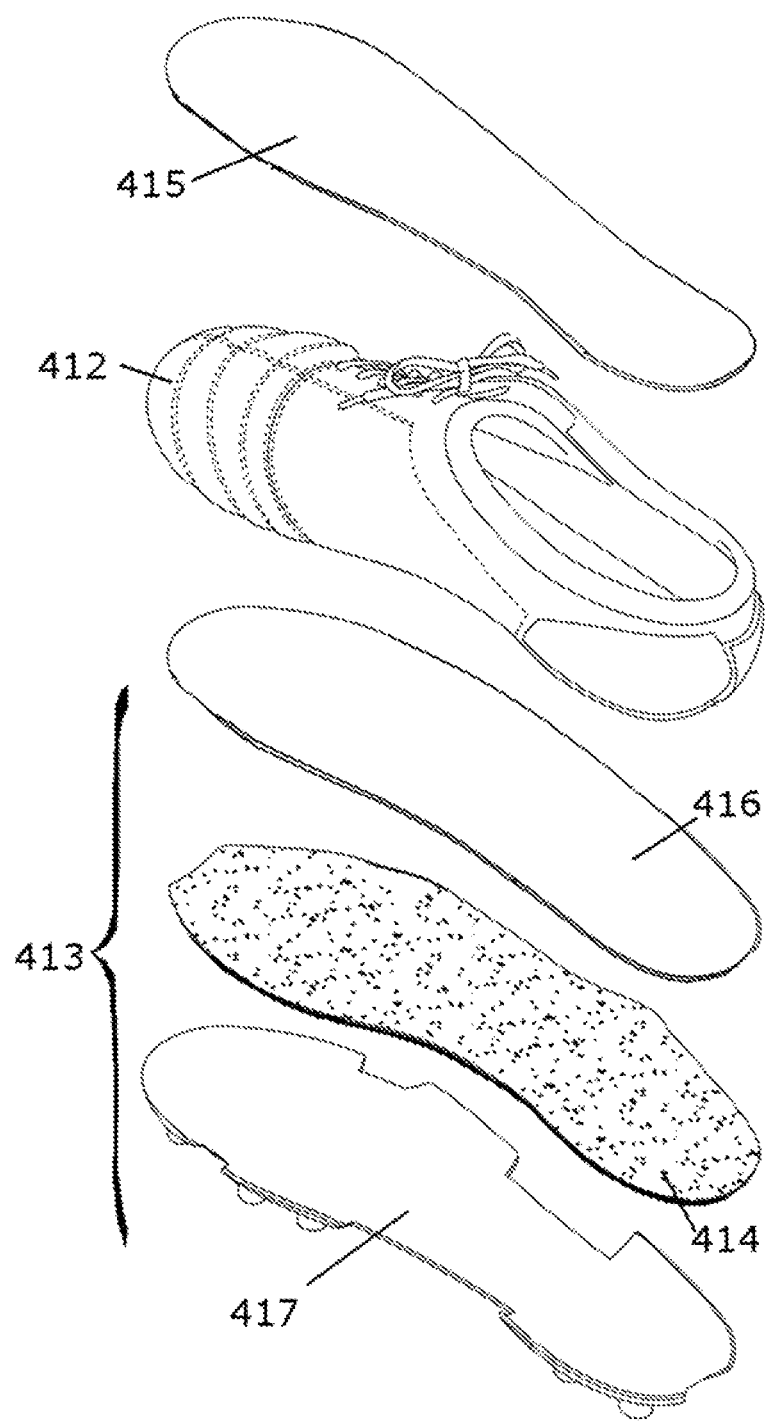
Figure 4C:
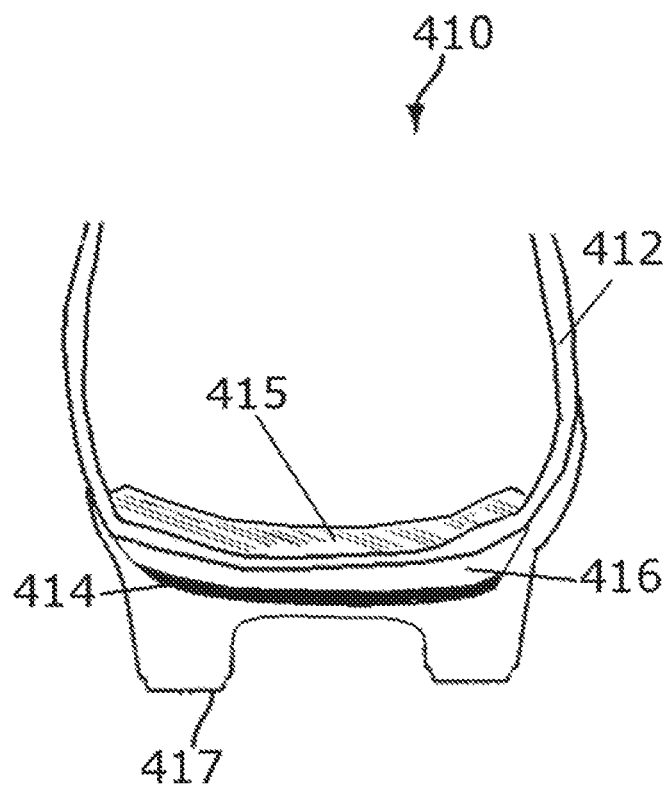

In some aspects, when the sole structure includes a plate and a chassis configured to wrap around the plate and to engage or be attached to an upper when the sole structure is a component of an article of footwear, the sole structure also includes one or more textiles. For example, a textile can be between the plate and the upper and can provide for improved bonding between the plate and the upper. A textile can also be positioned between the plate and the chassis. In aspects where the textile is between the plate and the chassis, the textile can provide for improved adhesion between the plate and the chassis and/or the textile can be a decorative or ornamental textile. In some aspects, the sole structure can include a decorative textile on the exterior or ground facing surface of the chassis. For example, as depicted in FIGS. 4A-4C, the article of footwear 410 includes an upper 412 and a sole structure 413 having a plate 416 and a chassis 417. The chassis 417 includes multiple traction elements 418. The traction elements 418 can be formed entirely from the chassis 417 material as pictured. Optionally, one or more of the traction elements 418 can include a traction element tip (not pictured) configured to be ground-contacting. A textile 414 is positioned between the plate 416 and the chassis 417. The article of footwear 410 can include a lasting board member 415 which can extend substantially the entire length of the plate 416.

Figure 5A:
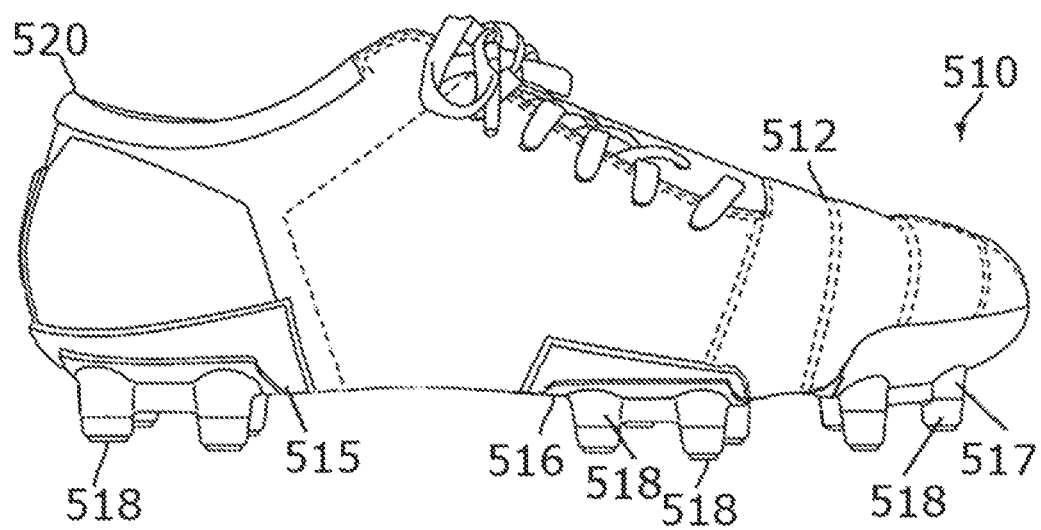
FIGS. 5A-5B depict a fifth exemplary article of athletic footwear.
Figure 5B:
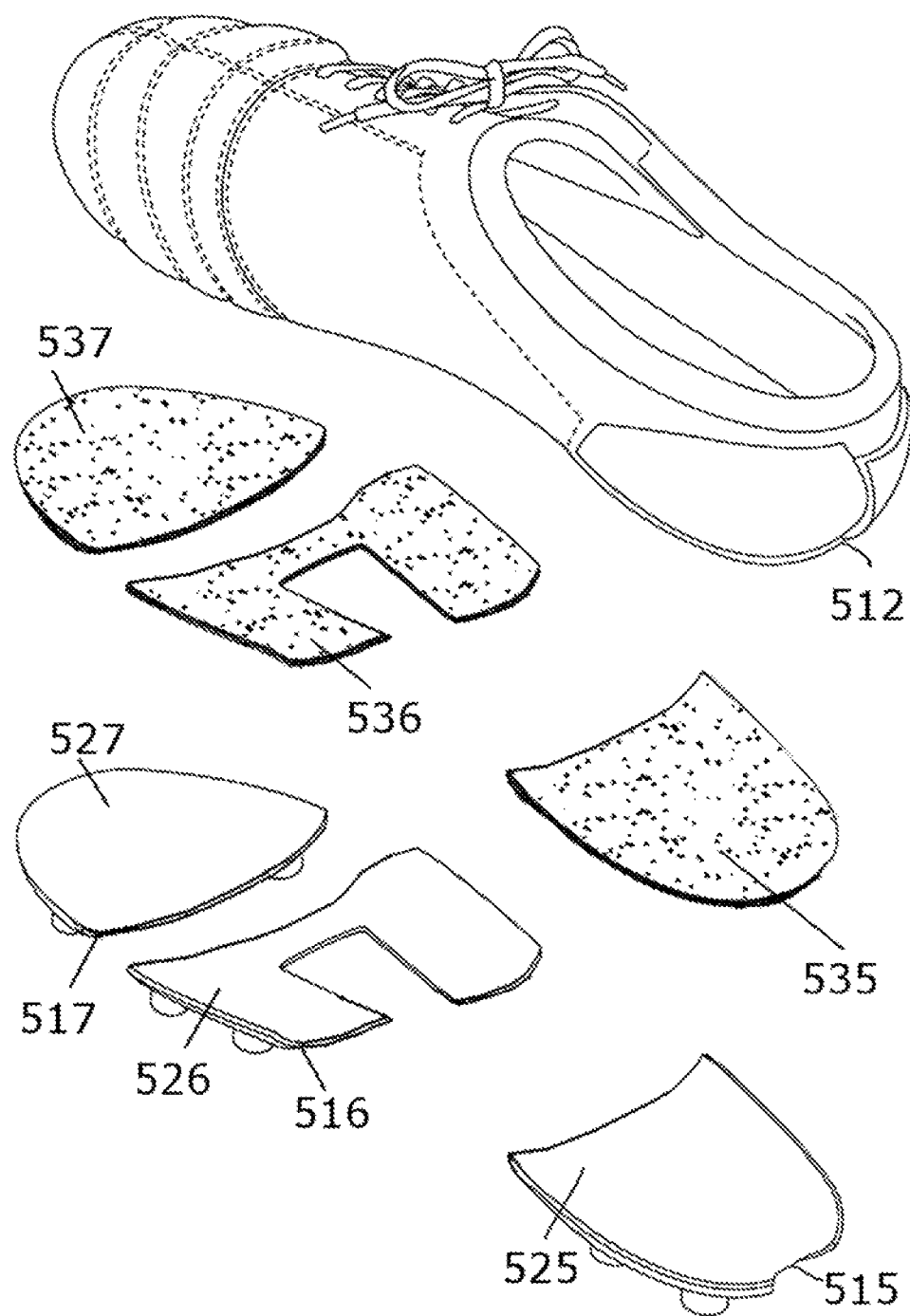

FIG. 5A is a lateral side elevational view of an exemplary article of footwear 510 including separate heel plate 515, midfoot plate 516, and toe plate 517. The article of footwear 510 includes an upper 512 and a heel plate 515, midfoot plate 516, and toe plate 517. Each of the heel plate 515, midfoot plate 516, and toe plate 517 include multiple traction elements 518. When worn, traction elements 518 provide traction to a wearer so as to enhance stability. One or more of the traction elements 518 can be integrally formed with the heel plate 515, midfoot plate 516, and/or toe plate 517, as illustrated in FIG. 5A, or can be removable. FIG. 5B is an exploded perspective view of the article of footwear 510 showing upper 512, heel plate 515, midfoot plate 516, and toe plate 517. In this aspect, the upper surface 525 of the heel plate 515 can include a heel textile 535. The upper surface 527 of the toe plate 517 can include a toe textile 537. Likewise, the upper surface 526 of the midfoot plate 516 includes a midfoot textile 536. The textiles can provide for improved bonding between upper 512, heel plate 515, midfoot plate 516, and toe plate 517.

This disclosure provides a variety of sole structures including a polyolefin plate, i.e. including a plate containing a polyolefin resin composition. The plate includes a polyolefin resin composition, for example any of the polyolefin resin compositions described herein. The sole structures can also include an elastomeric material containing a cured rubber and a hydrogel material, wherein in the elastomeric material, the hydrogel material is distributed throughout the cured rubber, and at least a portion of the hydrogel material present in the elastomeric material is physically entrapped by the cured rubber. Such systems are described in U.S. provisional patent application 62/574,262 entitled "RUBBER COMPOSITIONS AND USES THEREOF" filed Oct. 19, 2017, the contents of which are incorporated in their entirety as if fully disclosed herein. The elastomeric materials can provide for anti-clog properties.

The sole structures can include a textile on one or more surfaces of the plate. For instance, when the plate has a first side and a second side, the first side can be configured to be ground-facing when the plate is a component of an article of footwear and the second side can be configured to be upward facing. In some aspects, the textile is on one or both of the first side and the second side. The textile can provide for improved bonding between the plate and other components of the sole structure, e.g. between the plate and a chassis. The textile can also provide for improved bonding between the plate and the upper when the sole structure is a component of an article of footwear. In some aspects, the textile is a patterned or decorative textile.

In some aspects, the sole structures include a chassis. In some aspects, the chassis is in combination with one or more textiles in the sole structure, while in some aspects the sole structure includes a chassis and no textile. The chassis can be configured to be on the first side or ground facing side of the plate. In some aspects, the chassis is configured to wrap around the plate and to engage or be attached to an upper when the sole structure is a component of an article of footwear. The chassis can attach to the upper at the bite line.

In some aspects, the traction elements are made from the same or nearly the same polyolefin resin composition as the plate. In other aspects, the traction elements are made from a second resin that is different from the polyolefin resin. In some aspects, the sole structure includes a chassis and the chassis is made from the second resin. The second resin can include a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, an olefin elastomer, a copolymer thereof, or a blend or mixture thereof. In some aspects, the second resin includes about 20%, about 10%, or less of a polyolefin. The second resin can include about 20%, about 10%, or less of polypropylene. The second resin can include an ethylene-propylene rubber (EPDM) dispersed in a polypropylene. The second resin can include a block copolymer comprising a polystyrene block. The block copolymer comprises can be, for example. a copolymer of styrene and one or both of ethylene and butylene. In general, the second resin can be any resin that is compatible with the polyolefin resin and that has the appropriate durability and mechanical properties.

In particular, the second resin (e.g. a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, an olefin elastomer, a copolymer thereof, or a blend or mixture thereof) have been found to bond well to the resin compositions of the present disclosure.

Additionally, second resins containing an ethylene-propylene rubber (EPDM) dispersed in a polypropylene, or containing a block copolymer having a polystyrene block; and wherein the block copolymer includes a copolymer of styrene and one or both of ethylene and butylene, have been found to be particularly useful in ground-contacting portions of traction elements, as these compositions both bond well to the resin compositions of the present disclosure, and can provide an even higher level of abrasion-resistance than the resin compositions of the present disclosure, which may be desired in the ground-contacting portions of traction elements.

In some aspects, it can be beneficial to include a clarifying agent in the plate (in the polyolefin resin) and/or, when a chassis is present, in the chassis. The clarifying agent can allow for clear visibility of a textile through the plate. The clarifying agent can be present in any suitable amount to provide sufficient optical clarity of the final plate or sole structure. In some aspects, the clarifying agent is present in an amount from about 0.5% by weight to about 5% by weight or about 1.5% by weight to about 2.5% by weight based upon a total weight of the polyolefin resin. The clarifying agent can include those selected from the group of substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl)methylene], and a derivative thereof. The clarifying agent can include an acetal compound that is the condensation product of a polyhydric alcohol and an aromatic aldehyde. The polyhydric alcohol can include those selected from the group consisting of acyclic polyols such as xylitol and sorbitol and acyclic deoxy polyols such as 1,2,3-trideoxynonitol or 1,2,3-trideoxynon-1-enitol. The aromatic aldehyde can include those selected from the group consisting of benzaldehyde and substituted benzaldehydes.

Resin Compositions

A variety of resin compositions are provided having the abrasion resistance and flexural durability suitable for use in the articles and components described above. In some aspects, a resin composition is provided including a polyolefin copolymer, and an effective amount of a polymeric resin modifier. The effective amount of the resin modifier provides improved flexural durability while maintaining a suitable abrasion resistance. For example, in some aspects the effective amount of the polymeric resin modifier is an amount effective to allow the resin composition to pass a flex test pursuant to the Cold Ross Flex Test using the Plaque Sampling Procedure. At the same time, the resin composition can still have a suitable abrasion loss when measured pursuant to ASTM D 5963-97a using the Material Sampling Procedure. In some aspects, the otherwise same resin composition except without the polymeric resin modifier does not pass the cold Ross flex test using the Material Sampling Procedure.

The polymeric resin modifier can provide improved flexural strength, toughness, creep resistance, or flexural durability without a significant loss in the abrasion resistance. In some aspects, a resin composition is provided including a polyolefin copolymer, and an effective amount of a polymeric resin modifier, wherein the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to ASTM D 5963-97a using the Material Sampling Procedure. In other words, in some aspects, the effective amount of the polymeric resin modifier is an amount which is sufficient to produce a resin composition that does not stress whiten or crack during 150,000 flex cycles of the Cold Ross Flex test, while the abrasion resistance of the resin composition has not been significantly degraded and thus is not significantly different than the abrasion resistance of a comparator resin composition which is otherwise identical to the resin composition except that it is free of the polymeric resin modifier.

In some aspects, the resin composition has an abrasion loss of about 0.05 cubic centimeters ($cm^3$) to about 0.1 cubic centimeters ($cm^3$), about 0.07 cubic centimeters ($cm^3$) to about 0.1 cubic centimeters ($cm^3$), about 0.08 cubic centimeters ($cm^3$) to about 0.1 cubic centimeters ($cm^3$), or about 0.08 cubic centimeters ($cm^3$) to about 0.11 cubic centimeters ($cm^3$) pursuant to ASTM D 5963-97a using the Material Sampling Procedure. In some aspects, the resin composition has no significant change in the abrasion loss as compared to an abrasion loss of a second resin composition identical to the resin composition except without the polymeric resin modifier when measured pursuant to ASTM D 5963-97a using the Material Sampling Procedure. A change is abrasion loss, as used herein, is said to not be significant when the change is about 30%, about 25%, about 20%, about 15%, about 10%, or less when measured pursuant to ASTM D 5963-97a using the Material Sampling Procedure.

The resin compositions can include a variety of polyolefin copolymers. The copolymers can be alternating copolymers or random copolymers or block copolymers or graft copolymers. In some aspects, the copolymers are random copolymers. In some aspects, the copolymer includes a plurality of repeat units, with each of the plurality of repeat units individually derived from an alkene monomer having about 1 to about 6 carbon atoms. In other aspects, the copolymer includes a plurality of repeat units, with each of the plurality of repeat units individually derived from a monomer selected from the group consisting of ethylene, propylene, 4-methyl-1-pentene, 1-butene, 1-octene, and a combination thereof. In some aspects, the polyolefin copolymer includes a plurality of repeat units each individually selected from Formula 1A-1D. In some aspects, the polyolefin copolymer includes a first plurality of repeat units having a structure according to Formula 1A, and a second plurality of repeat units having a structure selected from Formula 1B-1D.

Formula 1A

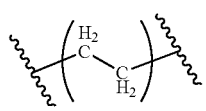

-continued

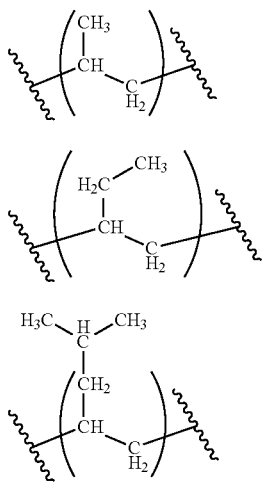

Formula 1B

Formula 1C

Formula 1D

In some aspects, the polyolefin copolymer includes a plurality of repeat units each individually having a structure according to Formula 2

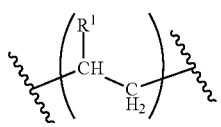

Formula 2 where $R^1$ is a hydrogen or a substituted or unsubstituted, linear or branched, $C_1$-$C_{12}$ alkyl. $C_1$-$C_6$ alkyl, $C_1$-$C_3$ alkyl, $C_1$-$C_{12}$ heteroalkyl, $C_1$-$C_6$ heteroalkyl, or $C_1$-$C_3$ heteroalkyl. In some aspects, each of the repeat units in the first plurality of repeat units has a structure according to Formula 1A above, and each of the repeat units in the second plurality of repeat units has a structure according to Formula 2 above.

In some aspects, the polyolefin copolymer is a random copolymer of a first plurality of repeat units and a second plurality of repeat units, and each repeat unit in the first plurality of repeat units is derived from ethylene and the each repeat unit in the second plurality of repeat units is derived from a second olefin. In some aspects, the second olefin is an alkene monomer having about 1 to about 6 carbon atoms. In other aspects, the second olefin includes propylene, 4-methyl-1-pentene, 1-butene, or other linear or branched terminal alkenes having about 3 to 12 carbon atoms. In some aspects, the polyolefin copolymer contains about 80% to about 99%, about 85% to about 99%, about 90% to about 99%, or about 95% to about 99% polyolefin repeat units by weight based upon a total weight of the polyolefin copolymer. In some aspects, the polyolefin copolymer consists essentially of polyolefin repeat units. In some aspects, polymers in the resin composition consist essentially of polyolefin copolymers.

The polyolefin copolymer can include ethylene, i.e. can include repeat units derived from ethylene such as those in Formula 1A. In some aspects, the polyolefin copolymer includes about 1% to about 5%, about 1% to about 3%, about 2% to about 3%, or about 2% to about 5% ethylene by weight based upon a total weight of the polyolefin copolymer.

The resin compositions can be made without the need for polyurethanes and/or without the need for polyamides. For example, in some aspects the polyolefin copolymer is substantially free of polyurethanes. In some aspects, the polymer chains of the polyolefin copolymer are substantially free of urethane repeat units. In some aspects, the resin composition is substantially free of polymer chains including urethane repeat units. In some aspects, the polyolefin copolymer is substantially free of polyamide. In some aspects, the polymer chains of the polyolefin copolymer are substantially free of amide repeat units. In some aspects, the resin composition is substantially free of polymer chains including amide repeat units.

In some aspects, the polyolefin copolymer includes polypropylene or is a polypropylene copolymer. In some aspects, the polymeric component of the resin composition (i.e., the portion of the resin composition that is formed by all of the polymers present in the composition) consists essentially of polypropylene copolymers. In some aspects the resin composition is provided including a polypropylene copolymer, and an effective amount of a polymeric resin modifier, wherein the resin composition has an abrasion loss as described above, and wherein the effective amount of the polymeric resin modifier is an amount effective to allow the resin composition to pass a flex test pursuant to the Cold Ross Flex Test using the Plaque Sampling Procedure. In some aspects, the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to ASTM D 5963-97a using the Material Sampling Procedure.

The polypropylene copolymer can include a random copolymer, e.g. a random copolymer of ethylene and propylene. The polypropylene copolymer can include about 80% to about 99%, about 85% to about 99%, about 90% to about 99%, or about 95% to about 99% propylene repeat units by weight based upon a total weight of the polypropylene copolymer. In some aspects, the polypropylene copolymer includes about 1% to about 5%, about 1% to about 3%, about 2% to about 3%, or about 2% to about 5% ethylene by weight based upon a total weight of the polypropylene copolymer. In some aspects, the polypropylene copolymer is a random copolymer including about 2% to about 3% of a first plurality of repeat units by weight and about 80% to about 99% by weight of a second plurality of repeat units based upon a total weight of the polypropylene copolymer; wherein each of the repeat units in the first plurality of repeat units has a structure according to Formula 1A above and each of the repeat units in the second plurality of repeat units has a structure according to Formula 1B above.

The combination of abrasion resistance and flexural durability can be related to the overall crystallinity of the resin composition. In some aspects, the resin composition has a percent crystallization (% crystallization) of about 45%, about 40%, about 35%, about 30%, about 25% or less when measured according to the Differential Scanning calorimeter (DSC) Test using the Material Sampling Procedure. It has been found that adding the polymeric resin modifier to the resin composition in an amount which only slightly decreases the % crystallinity of the resin composition as compared to an otherwise identical resin composition except without the polymeric resin modifier can result in resin compositions which are able to pass the Cold Ross Flex test while maintaining a relatively low abrasion loss. In some aspects, the polymeric resin modifier leads to a decrease in the percent crystallinity (% crystallinity) of the resin composition. In some aspects, the resin composition has a percent crystallization (% crystallization) that is at least 6, at least 5, at least 4, at least 3, or at least 2 percentage points less than a percent crystallization (% crystallization) of the otherwise same resin composition except without the polymeric resin modifier when measured according to the Differential Scanning calorimeter (DSC) Test using the Material Sampling Procedure.

In some aspects, the effective amount of the polymeric resin modifier is about 5% to about 30%, about 5% to about 25%, about 5% to about 20%, about 5% to about 15%, about 5% to about 10%, about 10% to about 15%, about 10% to about 20%, about 10% to about 25%, or about 10% to about 30% by weight based upon a total weight of the resin composition. In some aspects, the effective amount of the polymeric resin modifier is about 20%, about 15%, about 10%, about 5%, or less by weight based upon a total weight of the resin composition.

The polymeric resin modifier can include a variety of exemplary resin modifiers described herein. In some aspects, the polymeric resin modifier is a metallocene catalyzed copolymer primarily composed of isotactic propylene repeat units with about 11% by weight-15% by weight of ethylene repeat units based on a total weight of metallocene catalyzed copolymer randomly distributed along the copolymer. In some aspects, the polymeric resin modifier includes about 10% to about 15% ethylene repeat units by weight based upon a total weight of the polymeric resin modifier. In some aspects, the polymeric resin modifier includes about 10% to about 15% repeat units according to Formula 1A above by weight based upon a total weight of the polymeric resin modifier. In some aspects, the polymeric resin modifier is a copolymer of repeat units according to Formula 1B above, and the repeat units according to Formula 1B are arranged in an isotactic stereochemical configuration.

In some aspects, the polymeric resin modifier is a copolymer containing isotactic propylene repeat units and ethylene repeat units. In some aspects, the polymeric resin modifier is a copolymer including a first plurality of repeat units and a second plurality of repeat units; wherein each of the repeat units in the first plurality of repeat units has a structure according to Formula 1A above and each of the repeat units in the second plurality of repeat units has a structure according to Formula 1B above, and wherein the repeat units in the second plurality of repeat units are arranged in an isotactic stereochemical configuration.

Hydrogel Materials

In an aspect, the hydrogel material comprises a polyurethane hydrogel. The hydrogel material can comprise a polyamide hydrogel, a polyurea hydrogel, a polyester hydrogel, a polycarbonate hydrogel, a polyetheramide hydrogel, a hydrogel formed of addition polymers of ethylenically unsaturated monomers, copolymers thereof (e.g., co-polyesters, co-polyethers, co-polyamides, co-polyurethanes, co-polyolefins), and combinations thereof. Additional details are provided herein.

The term "externally facing" as used in "externally facing layer" refers to the position the element is intended to be in when the element is present in an article during normal use. If the article is footwear, the element is positioned toward the ground during normal use by a wearer when in a standing position, and thus can contact the ground including unpaved surfaces when the footwear is used in a conventional manner, such as standing, walking or running on an unpaved surface. In other words, even though the element may not necessarily be facing the ground during various steps of manufacturing or shipping, if the element is intended to face the ground during normal use by a wearer, the element is understood to be externally-facing or more specifically for an article of footwear, ground-facing. In some circumstances, due to the presence of elements such as traction elements, the externally facing (e.g., ground-facing) surface can be positioned toward the ground during conventional use but may not necessarily come into contact the ground. For example, on hard ground or paved surfaces, the terminal ends of traction elements on the outsole may directly contact the ground, while portions of the outsole located between the traction elements do not. As described in this example, the portions of the outsole located between the traction elements are considered to be externally facing (e.g., ground-facing) even though they may not directly contact the ground in all circumstances.

It has been found the layered material and articles incorporating the layered material (e.g. footwear) can prevent or reduce the accumulation of soil on the externally-facing layer of the layered material during wear on unpaved surfaces. As used herein, the term "soil" can include any of a variety of materials commonly present on a ground or playing surface and which might otherwise adhere to an outsole or exposed midsole of a footwear article. Soil can include inorganic materials such as mud, sand, dirt, and gravel; organic matter such as grass, turf, leaves, other vegetation, and excrement; and combinations of inorganic and organic materials such as clay. Additionally, soil can include other materials such as pulverized rubber which may be present on or in an unpaved surface.

While not wishing to be bound by theory, it is believed that the layered material (e.g., the hydrogel material) in accordance with the present disclosure, when sufficiently wet with water (including water containing dissolved, dispersed or otherwise suspended materials) can provide compressive compliance and/or expulsion of uptaken water. In particular, it is believed that the compressive compliance of the wet layered material, the expulsion of liquid from the wet layered material, or both in combination, can disrupt the adhesion of soil on or at the outsole, or the cohesion of the particles to each other, or can disrupt both the adhesion and cohesion. This disruption in the adhesion and/or cohesion of soil is believed to be a responsible mechanism for preventing (or otherwise reducing) the soil from accumulating on the footwear outsole (due to the presence of the wet material).

This disruption in the adhesion and/or cohesion of soil is believed to be a responsible mechanism for preventing (or otherwise reducing) the soil from accumulating on the footwear outsole (due to the presence of the layered material). As can be appreciated, preventing soil from accumulating on the bottom of footwear can improve the performance of traction elements present on the outsole during wear on unpaved surfaces, can prevent the footwear from gaining weight due to accumulated soil during wear, can preserve ball handling performance of the footwear, and thus can provide significant benefits to wearer as compared to an article of footwear without the material present on the outsole.

In aspects where the layered material (e.g., hydrogel material) swells, the swelling of the layered material can be observed as an increase in material thickness from the dry-state thickness of the layered material, through a range of intermediate-state thicknesses as additional water is absorbed, and finally to a saturated-state thickness layered material, which is an average thickness of the layered material when fully saturated with water. For example, the saturated-state thickness for the fully saturated layered material can be greater than 150%, greater than 200%, greater than 250%, greater than 300%, greater than 350%, greater than 400%, or greater than 500%, of the dry-state thickness for the same layered material (e.g., the hydrogel material), as characterized by the Swelling Capacity Test. In some aspects, the saturated-state thickness for the fully saturated layered material can be about 150% to 500%, about 150% to 400%, about 150% to 300%, or about 200% to 300% of the dry-state thickness for the same layered material. Examples of suitable average thicknesses for the layered material in a wet state (referred to as a saturated-state thickness) can be about 0.2 millimeters to 10 millimeters, about 0.2 millimeters to 5 millimeters, about 0.2 millimeters to 2 millimeters, about 0.25 millimeters to 2 millimeters, or about 0.5 millimeters to 1 millimeter.

In particular aspects, the layered material in neat form can have an increase in thickness at 1 hour of about 35% to 400%, about 50% to 300%, or about 100% to 200%, as characterized by the Swelling Capacity Test. In some further embodiments, the layered material in neat form can have an increase in thickness at 24 hours of about 45% to 500%, about 100% to 400%, or about 150% to 300%. Correspondingly, the outsole film in neat form can have an increase in film volume at 1 hour of about 50% to 500%, about 75% to 400%, or about 100% to 300%.

In particular aspects, the layered material can quickly take up water that is in contact with the layered material. For instance, the layered material can take up water from mud and wet grass, such as during a warmup period prior to a competitive match. Alternatively (or additionally), the layered material can be pre-conditioned with water so that the layered material is partially or fully saturated, such as by spraying or soaking the layered material with water prior to use.

In particular aspects, the layered material can exhibit an overall water uptake capacity of about 25% to 225% as measured in the Water Uptake Capacity Test over a soaking time of 24 hours using the Component Sampling Procedure, as will be defined below. Alternatively, the overall water uptake capacity exhibited by the layered material is in the range of about 30% to about 200%; alternatively, about 50% to about 150%; alternatively, about 75% to about 125%. For the purpose of this disclosure, the term "overall water uptake capacity" is used to represent the amount of water by weight taken up by the layered material as a percentage by weight of dry layered material. The procedure for measuring overall water uptake capacity includes measurement of the "dry" weight of the layered material, immersion of the layered material in water at ambient temperature (~23° C.) for a predetermined amount of time, followed by re-measurement of the weight of the layered material when "wet". The procedure for measuring the overall weight uptake capacity according to the Water Uptake Capacity Test using the Component Sampling Procedure is described below.

In an aspect, the layered material can also be characterized by a water uptake rate of 10 $g/m^2/\sqrt{min}$ to 120 $g/m^2/\sqrt{min}$ as measured in the Water Uptake Rate Test using the Material Sampling Procedure. The water uptake rate is defined as the weight (in grams) of water absorbed per square meter ($m^2$) of the elastomeric material over the square root of the soaking time ($\sqrt{min}$). Alternatively, the water uptake rate ranges from about 12 $g/m^2/\sqrt{min}$ to about 100 $g/m^2/\sqrt{min}$; alternatively, from about 25 $g/m^2/\sqrt{min}$ to about 90 $g/m^2/\sqrt{min}$; alternatively, up to about 60 $g/m^2/\sqrt{min}$.

In an aspect, the overall water uptake capacity and the water uptake rate can be dependent upon the amount of the hydrogel material that is present in the layered material. The hydrogel material can characterized by a water uptake capacity of 50% to 2000% as measured according to the Water Uptake Capacity Test using the Material Sampling Procedure. In this case, the water uptake capacity of the hydrogel material is determined based on the amount of water by weight taken up by the hydrogel material as a percentage by weight of dry hydrogel material. Alternatively, the water uptake capacity exhibited by the hydrogel material is in the range of about 100% to about 1500%; alternatively, in the range of about 300% to about 1200%.

As also discussed above, in some aspects, the surface of the layered material preferably exhibits hydrophilic properties. The hydrophilic properties of the layered material surface can be characterized by determining the static sessile drop contact angle of the layered material's surface. Accordingly, in some examples, the layered material's surface in a dry state has a static sessile drop contact angle (or dry-state contact angle) of less than 105°, or less than 95°, less than 85°, as characterized by the Contact Angle Test. The Contact Angle Test can be conducted on a sample obtained in accordance with the Article Sampling Procedure or the Co-Extruded Film Sampling Procedure. In some further examples, the layered material in a dry state has a static sessile drop contact angle ranging from 60° to 100°, from 70° to 100°, or from 65° to 95°.

In other examples, the surface of the layered material in a wet state has a static sessile drop contact angle (or wet-state contact angle) of less than 90°, less than 80°, less than 70°, or less than 60°. In some further examples, the surface in a wet state has a static sessile drop contact angle ranging from 45° to 75°. In some cases, the dry-state static sessile drop contact angle of the surface is greater than the wet-state static sessile drop contact angle of the surface by at least 10°, at least 15°, or at least 20°, for example from 10° to 40°, from 10° to 30°, or from 10° to 20°.

The surface of the layered material, including the surface of an article can also exhibit a low coefficient of friction when the material is wet. Examples of suitable coefficients of friction for the layered material in a dry state (or dry-state coefficient of friction) are less than 1.5, for instance ranging from 0.3 to 1.3, or from 0.3 to 0.7, as characterized by the Coefficient of Friction Test. The Coefficient of Friction Test can be conducted on a sample obtained in accordance with the Article Sampling Procedure, or the Co-Extruded Film Sampling Procedure. Examples of suitable coefficients of friction for the layered material in a wet state (or wet-state coefficient of friction) are less than 0.8 or less than 0.6, for instance ranging from 0.05 to 0.6, from 0.1 to 0.6, or from 0.3 to 0.5. Furthermore, the layered material can exhibit a reduction in its coefficient of friction from its dry state to its wet state, such as a reduction ranging from 15% to 90%, or from 50% to 80%. In some cases, the dry-state coefficient of friction is greater than the wet-state coefficient of friction for the material, for example being higher by a value of at least 0.3 or 0.5, such as 0.3 to 1.2 or 0.5 to 1.

Furthermore, the compliance of the layered material, including an article comprising the material, can be characterized by based on the layered material's storage modulus in the dry state (when equilibrated at 0% relative humidity (RH)), and in a partially wet state (e.g., when equilibrated at 50% RH or at 90% RH), and by reductions in its storage modulus between the dry and wet states. In particular, the layered material can have a reduction in storage modulus ($\Delta E'$) from the dry state relative to the wet state. A reduction in storage modulus as the water concentration in the hydrogel-containing material increases corresponds to an increase in compliance, because less stress is required for a given strain/deformation.

In some aspects, the layered material exhibits a reduction in the storage modulus from its dry state to its wet state (50% RH) of more than 20%, more than 40%, more than 60%, more than 75%, more than 90%, or more than 99%, relative to the storage modulus in the dry state, and as characterized by the Storage Modulus Test with the Neat Film Sampling Process.

In some further aspects, the dry-state storage modulus of the layered material is greater than its wet-state (50% RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In other aspects, the layered material exhibits a reduction in the storage modulus from its dry state to its wet state (90% RH) of more than 20%, more than 40%, more than 60%, more than 75%, more than 90%, or more than 99%, relative to the storage modulus in the dry state, and as characterized by the Storage Modulus Test with the Neat Film Sampling Process. In further aspects, the dry-state storage modulus of the layered material is greater than its wet-state (90% RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the layered material can also exhibit a reduction in its glass transition temperature from the dry state (when equilibrated at 0% relative humidity (RH) to the wet state (when equilibrated at 90% RH). While not wishing to be bound by theory, it is believed that the water taken up by the layered material plasticizes the layered material, which reduces its storage modulus and its glass transition temperature, rendering the layered material more compliant (e.g., compressible, expandable, and stretchable).

In some aspects, the layered material can exhibit a reduction in glass transition temperature ($\Delta T_g$) from its dry-state (0% RH) glass transition temperature to its wet-state glass transition (90% RH) temperature of more than a 5° C. difference, more than a 6° C. difference, more than a 10° C. difference, or more than a 15° C. difference, as characterized by the Glass Transition Temperature Test with the Neat Film Sampling Process or the Neat Material Sampling Process. For instance, the reduction in glass transition temperature ($\Delta T_g$) can range from more than a 5° C. difference to a 40° C. difference, from more than a 6° C. difference to a 50° C. difference, form more than a 10° C. difference to a 30° C. difference, from more than a 30° C. difference to a 45° C. difference, or from a 15° C. difference to a 20° C. difference. The layered material can also exhibit a dry glass transition temperature ranging from −40° C. to −80° C., or from −40° C. to −60° C.

Alternatively (or additionally), the reduction in glass transition temperature ($\Delta T_g$) can range from a 5° C. difference to a 40° C. difference, form a 10° C. difference to a 30° C. difference, or from a 15° C. difference to a 20° C. difference. The layered material can also exhibit a dry glass transition temperature ranging from −40° C. to −80° C., or from −40° C. to −60° C.

The total amount of water that the layered material can take up depends on a variety of factors, such as its composition (e.g., its hydrophilicity), its cross-linking density, its thickness, and the like. The water uptake capacity and the water uptake rate of the layered material are dependent on the size and shape of its geometry, and are typically based on the same factors. Conversely, the water uptake rate is transient and can be defined kinetically. The three primary factors for water uptake rate for layered material present given part geometry include time, thickness, and the exposed surface area available for taking up water.

Even though the layered material can swell as it takes up water and transitions between the different material states with corresponding thicknesses, the saturated-state thickness of the layered material preferably remains less than the length of the traction element. This selection of the layered material and its corresponding dry and saturated thicknesses ensures that the traction elements can continue to provide ground-engaging traction during use of the footwear, even when the layered material is in a fully swollen state. For example, the average clearance difference between the lengths of the traction elements and the saturated-state thickness of the layered material is desirably at least 8 millimeters. For example, the average clearance distance can be at least 9 millimeters, 10 millimeters, or more.

As also mentioned above, in addition to swelling, the compliance of the layered material can also increase from being relatively stiff (i.e., dry-state) to being increasingly stretchable, compressible, and malleable (i.e., wet-state). The increased compliance accordingly can allow the layered material to readily compress under an applied pressure (e.g., during a foot strike on the ground), and in some aspects, to quickly expel at least a portion of its retained water (depending on the extent of compression). While not wishing to be bound by theory, it is believed that this compressive compliance alone, water expulsion alone, or both in combination can disrupt the adhesion and/or cohesion of soil, which prevents or otherwise reduces the accumulation of soil.

In addition to quickly expelling water, in particular examples, the compressed layered material is capable of quickly re-absorbing water when the compression is released (e.g., liftoff from a foot strike during normal use). As such, during use in a wet or damp environment (e.g., a muddy or wet ground), the layered material can dynamically expel and repeatedly take up water over successive foot strikes, particularly from a wet surface. As such, the layered material can continue to prevent soil accumulation over extended periods of time (e.g., during an entire competitive match), particularly when there is ground water available for re-uptake.

In addition to being effective at preventing soil accumulation, the layered material has also been found to be sufficiently durable for its intended use on the ground-contacting side of the article of footwear. In various aspects, the useful life of the layered material (and footwear containing it) is at least 10 hours, 20 hours, 50 hours, 100 hours, 120 hours, or 150 hours of wear.

As used herein, the terms "take up", "taking up", "uptake", "uptaking", and the like refer to the drawing of a liquid (e.g., water) from an external source into the layered material, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

As described herein, the externally facing layer includes the first material. In an aspect, the first material comprises a hydrogel material. The hydrogel material can comprise a polymeric hydrogel. In aspect, the polymeric hydrogel can comprise or consist essentially of a polyurethane hydrogel. Polyurethane hydrogels are prepared from one or more diisocyanate and one or more hydrophilic diol. The polymer may also include a hydrophobic diol in addition to the hydrophilic diol. The polymerization is normally carried out using roughly an equivalent amount of the diol and diisocyanate. Examples of hydrophilic diols are polyethylene glycols or copolymers of ethylene glycol and propylene glycol. The diisocyanate can be selected from a wide variety of aliphatic or aromatic diisocyanates. The hydrophobicity of the resulting polymer is determined by the amount and type of the hydrophilic diols, the type and amount of the hydrophobic diols, and the type and amount of the diisocyanates. Additional details regarding polyurethane are provided herein.

In an aspect, the polymeric hydrogel can comprise or consist essentially of a polyurea hydrogel. Polyurea hydrogels are prepared from one or more diisocyanate and one or more hydrophilic diamine. The polymer may also include a hydrophobic diamine in addition to the hydrophilic diamines. The polymerization is normally carried out using roughly an equivalent amount of the diamine and diisocyanate. Typical hydrophilic diamines are amine-terminated polyethylene oxides and amine-terminated copolymers of polyethylene oxide/polypropylene. Examples are Jeffamine® diamines sold by Huntsman (The Woodlands, Tex., USA). The diisocyanate can be selected from a wide variety of aliphatic or aromatic diisocyanates. The hydrophobicity of the resulting polymer is determined by the amount and type of the hydrophilic diamine, the type and amount of the hydrophobic amine, and the type and amount of the diisocyanate. Additional details regarding polyurea are provided herein.

In an aspect, the polymeric hydrogel can comprise or consist essentially of a polyester hydrogel. Polyester hydrogels can be prepared from dicarboxylic acids (or dicarboxylic acid derivatives) and diols where part or all of the diol is a hydrophilic diol. Examples of hydrophilic diols are polyethylene glycols or copolymers of ethylene glycol and propylene glycol. A second hydrophobic diol can also be used to control the polarity of the final polymer. One or more diacid can be used which can be either aromatic or aliphatic. Of particular interest are block polyesters prepared from hydrophilic diols and lactones of hydroxyacids. The lactone is polymerized on the each end of the hydrophilic diol to produce a triblock polymer. In addition, these triblock segments can be linked together to produce a multiblock polymer by reaction with a dicarboxylic acid. Additional details regarding polyurea are provided herein.

In an aspect, the polymeric hydrogel can comprise or consist essentially of a polycarbonate hydrogel. Polycarbonates are typically prepared by reacting a diol with phosgene or a carbonate diester. A hydrophilic polycarbonate is produced when part or all of the diol is a hydrophilic diol. Examples of hydrophilic diols are hydroxyl terminated polyethers of ethylene glycol or polyethers of ethylene glycol with propylene glycol. A second hydrophobic diol can also be included to control the polarity of the final polymer. Additional details regarding polycarbonate are provided herein.

In an embodiment, the polymeric hydrogel can comprise or consist essentially of a polyetheramide hydrogel. Polyetheramides are prepared from dicarboxylic acids (or dicarboxylic acid derivatives) and polyether diamines (a polyether terminated on each end with an amino group). Hydrophilic amine-terminated polyethers produce hydrophilic polymers that will swell with water. Hydrophobic diamines can be used in conjunction with hydrophilic diamines to control the hydrophilicity of the final polymer. In addition, the type dicarboxylic acid segment can be selected to control the polarity of the polymer and the physical properties of the polymer. Typical hydrophilic diamines are amine-terminated polyethylene oxides and amine-terminated copolymers of polyethylene oxide/polypropylene. Examples are Jeffamine® diamines sold by Huntsman (The Woodlands, Tex., USA). Additional details regarding polyetheramide are provided herein.

In an aspect, the polymeric hydrogel can comprise or consist essentially of a hydrogel formed of addition polymers of ethylenically unsaturated monomers. The addition polymers of ethylenically unsaturated monomers can be random polymers. Polymers prepared by free radical polymerization of one of more hydrophilic ethylenically unsaturated monomer and one or more hydrophobic ethylenically unsaturated monomers. Examples of hydrophilic monomers are acrylic acid, methacrylic acid, 2-acrylamido-2-methylpropane sulphonic acid, vinyl sulphonic acid, sodium p-styrene sulfonate, [3-(methacryloylamino)propyl]trimethylammonium chloride, 2-hydroxyethyl methacrylate, acrylamide, N,N-dimethylacrylamide, 2-vinylpyrrolidone, (meth)acrylate esters of polyethylene glycol, and (meth)acrylate esters of polyethylene glycol monomethyl ether. Examples of hydrophobic monomers are (meth)acrylate esters of C1 to C4 alcohols, polystyrene, polystyrene methacrylate macromonomer and mono(meth)acrylate esters of siloxanes. The water uptake and physical characteristics are tuned by selection of the monomer and the amounts of each monomer type. Additional details regarding ethylenically unsaturated monomers are provided herein.

The addition polymers of ethylenically unsaturated monomers can be comb polymers. Comb polymers are produced when one of the monomers is a macromer (an oligomer with an ethylenically unsaturated group one end). In one case the main chain is hydrophilic while the side chains are hydrophobic. Alternatively the comb backbone can be hydrophobic while the side chains are hydrophilic. An example is a backbone of a hydrophobic monomer such as styrene with the methacrylate monoester of polyethylene glycol.

The addition polymers of ethylenically unsaturated monomers can be block polymers. Block polymers of ethylenically unsaturated monomers can be prepared by methods such as anionic polymerization or controlled free radical polymerization. Hydrogels are produced when the polymer has both hydrophilic blocks and hydrophobic blocks. The polymer can be a diblock polymer (A-B) polymer, triblock polymer (A-B-A) or multiblock polymer. Triblock polymers with hydrophobic end blocks and a hydrophilic center block are most useful for this application. Block polymers can be prepared by other means as well. Partial hydrolysis of polyacrylonitrile polymers produces multiblock polymers with hydrophilic domains (hydrolyzed) separated by hydrophobic domains (unhydrolyzed) such that the partially hydrolyzed polymer acts as a hydrogel. The hydrolysis converts acrylonitrile units to hydrophilic acrylamide or acrylic acid units in a multiblock pattern.

The polymeric hydrogel can comprise or consist essentially of a hydrogel formed of copolymers. Copolymers combine two or more types of polymers within each polymer chain to achieve the desired set of properties. Of particular interest are polyurethane/polyurea copolymers, polyurethane/polyester copolymers, polyester/polycarbonate copolymers.

Now having described aspects of the hydrogel material, the elastomer material, the thermoplastic hot melt adhesive, and the tie layer, additional details are provided regarding the thermoplastic polymer. In aspects, thermoplastic polymer can include polymers of the same or different types of monomers (e.g., homopolymers and copolymers, including terpolymers). In certain aspects, the thermoplastic polymer can include different monomers randomly distributed in the polymer (e.g., a random co-polymer). The term "polymer" refers to a polymerized molecule having one or more monomer species that can be the same or different. When the monomer species are the same, the polymer can be termed homopolymer and when the monomers are different, the polymer can be referred to as a copolymer. The term "copolymer" is a polymer having two or more types of monomer species, and includes terpolymers (i.e., copolymers having three monomer species). In an aspect, the "monomer" can include different functional groups or segments, but for simplicity is generally referred to as a monomer.

For example, the thermoplastic polymer can be a polymer having repeating polymeric units of the same chemical structure (segments) which are relatively harder (hard segments), and repeating polymeric segments which are relatively softer (soft segments). In various aspects, the polymer has repeating hard segments and soft segments, physical crosslinks can be present within the segments or between the segments or both within and between the segments. Particular examples of hard segments include isocyanate segments. Particular examples of soft segments include an alkoxy group such as polyether segments and polyester segments. As used herein, the polymeric segment can be referred to as being a particular type of polymeric segment such as, for example, an isocyanate segment (e.g., diisocyante segment), an alkoky polyamide segment (e.g., a polyether segment, a polyester segment), and the like. It is understood that the chemical structure of the segment is derived from the described chemical structure. For example, an isocyanate segment is a polymerized unit including an isocyanate functional group. When referring to polymeric segments of a particular chemical structure, the polymer can contain up to 10 mol % of segments of other chemical structures. For example, as used herein, a polyether segment is understood to include up to 10 mol % of non-polyether segments.

In certain aspects, the thermoplastic polymer can be a thermoplastic polyurethane (also referred to as "TPU"). In aspects, the thermoplastic polyurethane can be a thermoplastic polyurethane polymer. In such aspects, the thermoplastic polyurethane polymer can include hard and soft segments. In aspects, the hard segments can comprise or consist of isocyanate segments (e.g., diisocyanate segments). In the same or alternative aspects, the soft segments can comprise or consist of alkoxy segments (e.g., polyether segments, or polyester segments, or a combination of polyether segments and polyester segments). In a particular aspect, the thermoplastic material can comprise or consist essentially of an elastomeric thermoplastic polyurethane having repeating hard segments and repeating soft segments.

Thermoplastic Polyurethanes

In aspects, one or more of the thermoplastic polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

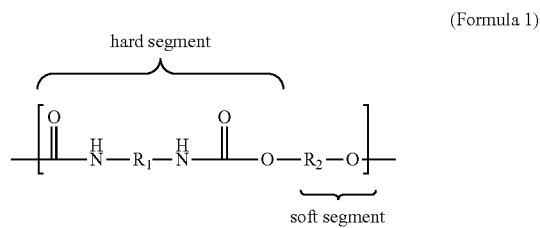

(Formula 1)

In these embodiments, each $R_1$ and $R_2$ independently is an aliphatic or aromatic segment. Optionally, each $R_2$ can be a hydrophilic segment.

Additionally, the isocyanates can also be chain extended with one or more chain extenders to bridge two or more isocyanates. This can produce polyurethane polymer chains as illustrated below in Formula 2, where $R_3$ includes the chain extender. As with each $R_1$ and $R_3$, each $R_3$ independently is an aliphatic or aromatic segment.

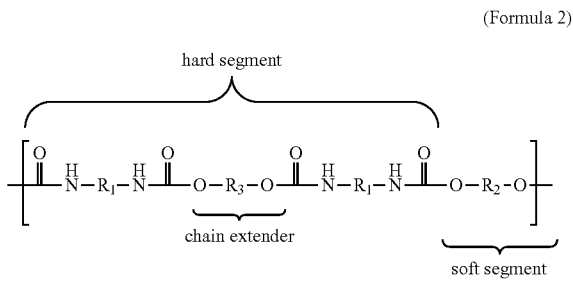

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5% to 85% by weight, from 5% to 70% by weight, or from 10% to 50% by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate ($T_m$DI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In an aspect, the diisocyanate segments can include aliphatic diisocyanate segments. In one aspect, a majority of the diisocyanate segments comprise the aliphatic diisocyanate segments. In an aspect, at least 90% of the diisocyanate segments are aliphatic diisocyanate segments. In an aspect, the diisocyanate segments consist essentially of aliphatic diisocyanate segments. In an aspect, the aliphatic diisocyanate segments are substantially (e.g., about 50% or more, about 60% or more, about 70% or more, about 80% or more, about 90% or more) linear aliphatic diisocyanate segments. In an aspect, at least 80% of the aliphatic diisocyanate segments are aliphatic diisocyanate segments that are free of side chains. In an aspect, the aliphatic diisocyanate segments include $C_2$-$C_{10}$ linear aliphatic diisocyanate segments.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane polymer chains include toluene diisocyanate (TDI), TDI adducts with trimethyloylpropane ($T_m$P), methylene diphenyl diisocyanate (MDI), xylene diisocyanate (XDI), tetramethylxylylene diisocyanate ($T_m$XDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the polymer chains are substantially free of aromatic groups.

In particular aspects, the polyurethane polymer chains are produced from diisocynates including HMDI, TDI, MDI, $H_{12}$ aliphatics, and combinations thereof. For example, the low processing temperature polymeric composition of the present disclosure can comprise one or more polyurethane polymer chains are produced from diisocynates including HMDI, TDI, MDI, $H_{12}$ aliphatics, and combinations thereof.

In certain aspects, polyurethane chains which are crosslinked (e.g., partially crosslinked polyurethane polymers which retain thermoplastic properties) or which can be crosslinked, can be used in accordance with the present disclosure. It is possible to produce crosslinked or crosslinkable polyurethane polymer chains using multi-functional isocyantes. Examples of suitable triisocyanates for producing the polyurethane polymer chains include TDI, HDI, and IPDI adducts with trimethyloylpropane ($T_m$P), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane polymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, di hydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5% to 85% by weight, from 5% to 70% by weight, or from 10% to 50% by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to, polyethylene oxide (PEO), polypropylene oxide (PPO), polytetrahydrofuran (PTHF), polytetramethylene oxide (P $T_m$O), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various of the thermoplastic polyurethanes, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$alkylene refers to an alkylene group having, e.g., 1, 2, 3, 4, 5, or 6 carbon atoms. The term "alkenylene" refers to a bivalent hydrocarbon having at least one double bond.

In various aspects, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly(carboxybetaine (pCB) and ammonium phosphonate groups such as a phosphatidylcholine group).

In some aspects, the $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

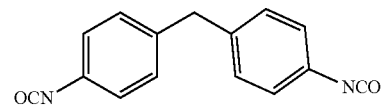

(Formula 3)

In some exemplary aspects, the pendant hydrophilic group is a polyethylene oxide group and the linking group is MDI, as shown below.

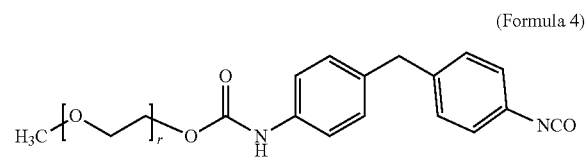

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

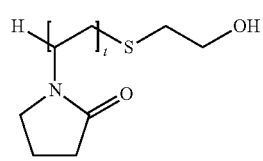

(Formula 5)

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

In various aspects, each $R^5$ independently includes a $C_{1-10}$ alkylene group (e.g., a methylene, ethylene, propylene, butylene, pentylene, hexylene, heptylene, octylene, nonylene, or decylene group). In other cases, each $R^5$ is a polyether group (e.g., a polyethylene, polypropylene, or polybutylene group). In various cases, each R5 is a polyurethane group.

Optionally, in some aspects, the polyurethane can include an at least partially crosslinked polymeric network that includes polymer chains that are derivatives of polyurethane. In such cases, it is understood that the level of crosslinking is such that the polyurethane retains thermoplastic properties (i.e., the crosslinked thermoplastic poly-

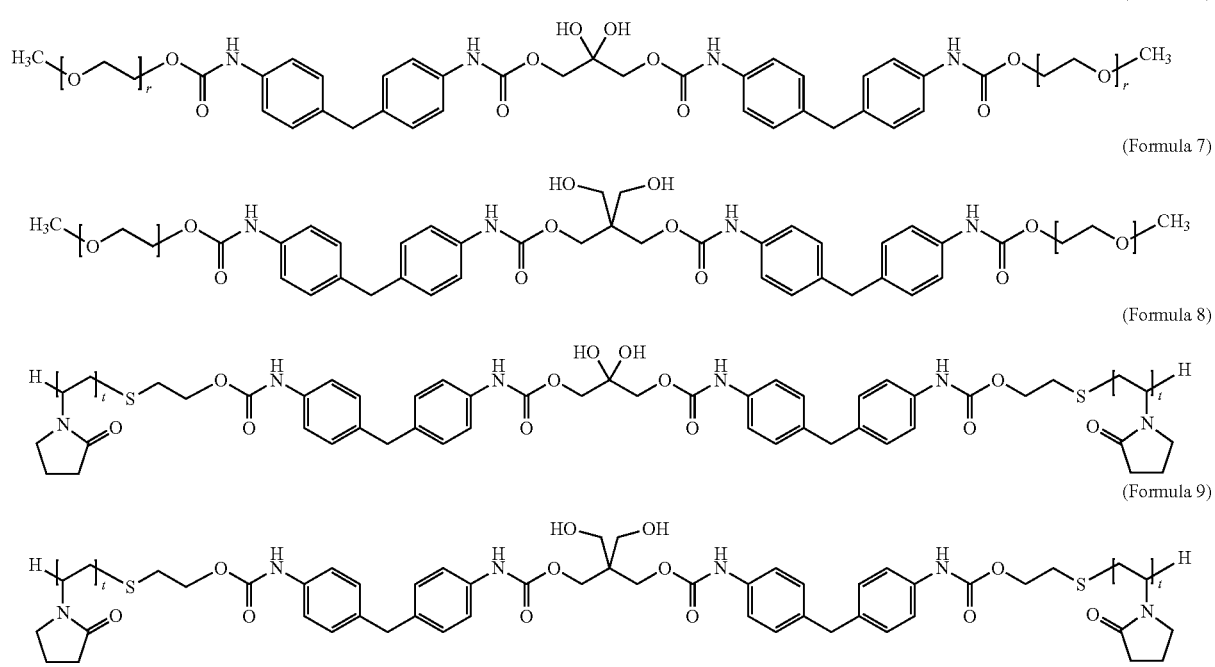

(Formula 6)

(Formula 7)

(Formula 8)

(Formula 9)

In various cases, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

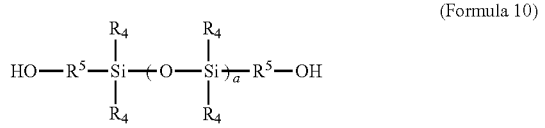

(Formula 10)

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkylene, polyether, or polyurethane.

In some aspects, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

urethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

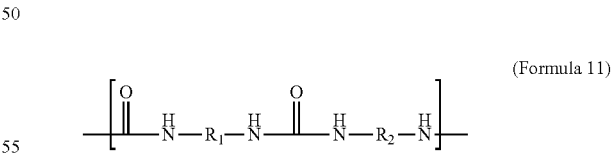

(Formula 11)

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

As described herein, the thermoplastic polyurethane can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Thermoplastic Polyamides

In various aspects, the thermoplastic polymer can comprise a thermoplastic polyamide. The thermoplastic polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

In aspects, the thermoplastic polymers can be a block co-polyamide. For example, the block co-polyamide can have repeating hard segments, and repeating soft segments. The hard segments can comprise polyamide segments, and the soft segments can comprise non-polyamide segments. The thermoplastic polymers can be an elastomeric thermoplastic co-polyamide comprising or consisting of block co-polyamides having repeating hard segments and repeating soft segments. In block co-polymers, including block co-polymers having repeating hard segments and soft segments, physical crosslinks can be present within the segments or between the segments or both within and between the segments.

The thermoplastic polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a co-polyamide, or can be a random co-polyamide. The thermoplastic copolyamide can be formed from the polycodensation of a polyamide oligomer or prepolymer with a second oligomer prepolymer to form a copolyamide (i.e., a co-polymer including polyamide segments. Optionally, the second prepolymer can be a hydrophilic prepolymer.

In some aspects, the thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the thermoplastic polyamide can be the same or different.

In some aspects, the thermoplastic polyamide or the polyamide segment of the thermoplastic copolyamide is derived from the polycondensation of lactams and/or amino acids, and includes an amide segment having a structure shown in Formula 13, below, wherein $R_6$ is the segment of the polyamide derived from the lactam or amino acid.

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{5-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the thermoplastic copolyamide, Formula 13 can include a polyamide-polyether block copolymer segment, as shown below:

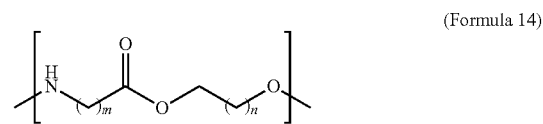

(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the thermoplastic polyamide or the polyamide segment of the thermoplastic co-polyamide is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

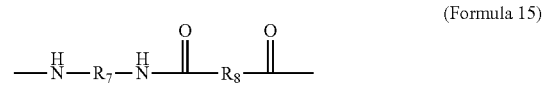

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine ($T_mD$), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the polymer chains are substantially free of aromatic groups.

In some aspects, each polyamide segment of the thermoplastic polyamide (including the thermoplastic copolyamide) is independently derived from a polyamide prepolymer selected from the group consisting of 12-aminolauric acid, caprolactam, hexamethylene diamine and adipic acid.

In some aspects, the thermoplastic polyamide comprises or consists of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 16:

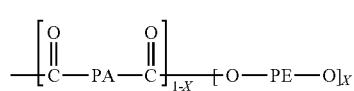
(Formula 16)

In various aspects, a disclosed poly(ether block amide) polymer is prepared by polycondensation of polyamide blocks containing reactive ends with polyether blocks containing reactive ends. Examples include, but are not limited to: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

Disclosed poly(ether block amide) polymers include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. In various aspects, the copolymer comprises polyamide blocks comprising polyamide 12 or of polyamide 6.

Disclosed poly(ether block amide) polymers include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have an $M_n$ of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—(CH$_2$)$_{10}$—COOH can be used; and a lactam such as caprolactam and lauryllactam can be used; or various combinations of any of the foregoing. In various aspects, the copolymer comprises polyamide blocks obtained by condensation of lauryllactam in the presence of adipic acid or dodecanedioic acid and with a $M_n$ of 750 have a melting point of 127-130° C. In a further aspect, the various constituents of the polyamide block and their proportion can be chosen in order to obtain a melting point of less than 150° C. and advantageously between 90° C. and 135° C.

Disclosed poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be arylic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

In various aspects, the constituents of the polyamide block and their proportion can be chosen in order to obtain a melting point of less than 150° C. and advantageously between 90° C. and 135° C. In a further aspect, the various constituents of the polyamide block and their proportion can be chosen in order to obtain a melting point of less than 150° C. and advantageously between 90° C. and 135° C.

In an aspect, the number average molar mass of the polyamide blocks can be from about 300 g/mol and about 15,000 g/mol, from about 500 g/mol and about 10,000 g/mol, from about 500 g/mol and about 6,000 g/mol, from about 500 g/mol to 5,000 g/mol, and from about 600 g/mol and about 5,000 g/mol. In a further aspect, the number average molecular weight of the polyether block can range from about 100 g/mol to about 6,000 g/mol, from about 400 g/mol to 3000 g/mol and from about 200 g/mol to about 3,000 g/mol. In a still further aspect, the polyether (PE) content (x) of the poly(ether block amide) polymer can be from about 0.05 to about 0.8 (i.e., from about 5 mol % to about 80 mol %). In a yet further aspect, the polyether blocks can be present from about 10 wt % to about 50 wt %, from about 20 wt % to about 40 wt %, and from about 30 wt % to about 40 wt %. The polyamide blocks can be present from about 50 wt % to about 90 wt %, from about 60 wt % to about 80 wt %, and from about 70 wt % to about 90 wt %.

In an aspect, the polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and P $T_mG$ blocks, i.e. those consisting of tetramethylene glycol units, also known as polytetrahydrofuran. PPG or P $T_mG$ blocks are advantageously used. The amount of polyether blocks in these copolymers containing polyamide and polyether blocks can be from about 10 wt % to about 50 wt % of the copolymer and from about 35 wt % to about 50 wt %.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300° C., preferably 200 to 290° C., and the pressure in the reactor is set between 5 and 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. In an aspect, the polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 mbar (5000 Pa) at a temperature such that the reactants and the copolymers obtained are in the molten state. By way of example, this temperature can be between 100 and 400° C. and usually between 200 and 250° C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium. In an aspect, the derivative can be prepared from a tetraalkoxides consistent with the general formula M(OR)$_4$, in which M represents titanium, zirconium or hafnium and R, which can be identical or different, represents linear or branched alkyl radicals having from 1 to 24 carbon atoms.

In a further aspect, the catalyst can comprise a salt of the metal (M), particularly the salt of (M) and of an organic acid and the complex salts of the oxide of (M) and/or the hydroxide of (M) and an organic acid. In a still further aspect, the organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. In some aspects, M is zirconium and such salts are called zirconyl salts, e.g., the commercially available product sold under the name zirconyl acetate.

In an aspect, the weight proportion of catalyst varies from about 0.01 to about 5% of the weight of the mixture of the dicarboxylic polyamide with the polyetherdiol and the polyol. In a further aspect, the weight proportion of catalyst varies from about 0.05 to about 2% of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. In one aspect, it can be useful to blend a block copolymer having a high level of polyamide groups with a block copolymer having a higher level of polyether blocks, to produce a blend having an average level of polyether blocks of about 20 to 40 wt % of the total blend of poly(amid-block-ether) copolymers, and preferably about 30 to 35 wt %. In a further aspect, the copolymer comprises a blend of two different poly(ether-block-amide)s comprising at least one block copolymer having a level of polyether blocks below about 35 wt %, and a second poly(ether-block-amide) having at least about 45 wt % of polyether blocks.

In various aspects, the thermoplastic polymer is a polyamide or a poly(ether-block-amide) with a melting temperature ($T_m$) from about 90° C. to about 120° C. when determined in accordance with AS $T_m$ D3418-97 as described herein below. In a further aspect, the thermoplastic polymer is a polyamide or a poly(ether-block-amide) with a melting temperature ($T_m$) from about 93° C. to about 99° C. when determined in accordance with AS $T_m$ D3418-97 as described herein below. In a still further aspect, the thermoplastic polymer is a polyamide or a poly(ether-block-amide) with a melting temperature ($T_m$) from about 112° C. to about 118° C. when determined in accordance with AS $T_m$ D3418-97 as described herein below. In some aspects, the thermoplastic polymer is a polyamide or a poly(ether-block-amide) with a melting temperature of about 90° C., about 91° C., about 92° C., about 93° C., about 94° C., about 95° C., about 96° C., about 97° C., about 98° C., about 99° C., about 100°

C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C., any range of melting temperature ($T_m$) values encompassed by any of the foregoing values, or any combination of the foregoing melting temperature ($T_m$) values, when determined in accordance with AS $T_m$ D3418-97 as described herein below.

In various aspects, the thermoplastic polymer is a polyamide or a poly(ether-block-amide) with a glass transition temperature ($T_g$) from about −20° C. to about 30° C. when determined in accordance with AS $T_m$ D3418-97 as described herein below. In a further aspect, the thermoplastic polymer is a polyamide or a poly(ether-block-amide) with a glass transition temperature ($T_g$) from about −13° C. to about −7° C. when determined in accordance with AS $T_m$ D3418-97 as described herein below. In a still further aspect, the thermoplastic polymer is a polyamide or a poly(ether-block-amide) with a glass transition temperature ($T_g$) from about 17° C. to about 23° C. when determined in accordance with AS $T_m$ D3418-97 as described herein below. In some aspects, the thermoplastic polymer is a polyamide or a poly(ether-block-amide) with a glass transition temperature ($T_g$) of about −20° C., about −19° C., about −18° C., about −17° C., about −16° C., about −15° C., about −14° C., about −13° C., about −12° C., about −10° C., about −9° C., about −8° C., about −7° C., about −6° C., about −5° C., about −4° C., about −3° C., about −2° C., about −1° C., about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., any range of glass transition temperature values encompassed by any of the foregoing values, or any combination of the foregoing glass transition temperature values, when determined in accordance with AS $T_m$ D3418-97 as described herein below.

In various aspects, the thermoplastic polymer is a polyamide or a poly(ether-block-amide) with a melt flow index from about 10 cm³/10 min to about 30 cm³/10 min when tested in accordance with AS $T_m$ D1238-13 as described herein below at 160° C. using a weight of 2.16 kg. In a further aspect, the thermoplastic polymer is a polyamide or a poly(ether-block-amide) with a melt flow index from about 22 cm³/10 min to about 28 cm³/10 min when tested in accordance with AS $T_m$ D1238-13 as described herein below at 160° C. using a weight of 2.16 kg. In some aspects, the thermoplastic polymer is a polyamide or a poly(ether-block-amide) with a melt flow index of about 10 cm³/10 min, about 11 cm³/10 min, about 12 cm³/10 min, about 13 cm³/10 min, about 14 cm³/10 min, about 15 cm³/10 min, about 16 cm³/10 min, about 17 cm³/10 min, of about 18 cm³/10 min, about 19 cm³/10 min, of about 20 cm³/10 min, about 21 cm³/10 min, about 22 cm³/10 min, about 23 cm³/10 min, about 24 cm³/10 min, about 25 cm³/10 min, about 26 cm³/10 min, about 27 cm³/10 min, of about 28 cm³/10 min, about 29 cm³/10 min, of about 30 cm³/10 min, any range of melt flow index values encompassed by any of the foregoing values, or any combination of the foregoing melt flow index values, when determined in accordance with AS $T_m$ D1238-13 as described herein below at 160° C. using a weight of 2.16 kg.

In various aspects, the thermoplastic polymer is a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. In a further aspect, the thermoplastic polymer is a polyamide or a poly(ether-block-amide) with a cold Ross flex test result of about 140,000 to about 160,000 when tested on a thermoformed plaque of the polyamide or the poly(ether-block-amide) in accordance with the cold Ross flex test as described herein below. In a still further aspect, the thermoplastic polymer is a polyamide or a poly(ether-block-amide) with a cold Ross flex test result of about 130,000 to about 170,000 when tested on a thermoformed plaque of the polyamide or the poly(ether-block-amide) in accordance with the cold Ross flex test as described herein below. In some aspects, the thermoplastic polymer is a polyamide or a poly(ether-block-amide) with a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

In various aspects, the thermoplastic polymer is a polyamide or a poly(ether-block-amide) with a modulus from about 5 MPa to about 100 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In a further aspect, the thermoplastic polymer is a polyamide or a poly(ether-block-amide) with a modulus from about 20 MPa to about 80 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In some aspects, the thermoplastic polymer is a polyamide or a poly(ether-block-amide) with a modulus of about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, any range of modulus values encompassed by any of the foregoing values, or any combination of the foregoing modulus values, when tested on a thermoformed plaque of the polyamide or the poly(ether-block-amide) in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 cm³/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) is a mixture of a first polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 $cm^3$/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below; and a second polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

Exemplary commercially available copolymers include, but are not limited to, those available under the tradenames of VESTAMID® (Evonik Industries); PLATAMID® (Arkema), e.g., product code H2694; PEBAX® (Arkema), e.g., product code "PEBAX MH1657" and "PEBAX MV1074"; PEBAX® RNEW (Arkema); GRILAMID® (EMS-Chemie AG), or also to other similar materials produced by various other suppliers.

In some examples, the thermoplastic polyamide is physically crosslinked through, e.g., nonpolar or polar interactions between the polyamide groups of the polymers. In examples where the thermoplastic polyamide is a thermoplastic copolyamide, the thermoplastic copolyamide can be physically crosslinked through interactions between the polyamide groups, an optionally by interactions between the copolymer groups. When the thermoplastic copolyamide is physically crosslinked thorough interactions between the polyamide groups, the polyamide segments can form the portion of the polymer referred to as the "hard segment", and copolymer segments can form the portion of the polymer referred to as the "soft segment". For example, when the thermoplastic copolyamide is a thermoplastic poly(ether-block-amide), the polyamide segments form the hard segment portion of the polymer, and polyether segments can form the soft segment portion of the polymer. Therefore, in some examples, the thermoplastic polymer can include a physically crosslinked polymeric network having one or more polymer chains with amide linkages.

In some aspects, the polyamide segment of the thermoplastic co-polyamide includes polyamide-11 or polyamide-12 and the polyether segment is a segment selected from the group consisting of polyethylene oxide, polypropylene oxide, and polytetramethylene oxide segments, and combinations thereof.

Optionally, the thermoplastic polyamide can be partially covalently crosslinked, as previously described herein. In such cases, it is to be understood that the degree of crosslinking present in the thermoplastic polyamide is such that, when it is thermally processed in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies.

Thermoplastic Polyesters

In aspects, the thermoplastic polymers can comprise a thermoplastic polyester. The thermoplastic polyester can be formed by reaction of one or more carboxylic acids, or its ester-forming derivatives, with one or more bivalent or multivalent aliphatic, alicyclic, aromatic or aralphatic alcohols or a bisphenol. The thermoplastic polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that that can be used to prepare a thermoplastic polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the thermoplastic polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

In some aspects, the thermoplastic polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The thermoplastic polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the thermoplastic polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical cross-links can be present within the blocks or between the blocks or both within and between the blocks. In a particular example, the thermoplastic material can comprise or consist essentially of an elastomeric thermoplastic co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The thermoplastic co-polyester can be formed from the polycodensation of a polyester oligomer or pre-polymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly (3-hydroxybutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the thermoplastic polyester is a block copolymer comprising segments of one or more of poly-butylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable thermoplastic polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

In some aspects, the thermoplastic polyester is a biodegradable resin, for example, a copolymerized polyester in which poly(α-hydroxy acid) such as polyglycolic acid or polylactic acid is contained as principal repeating units.

The disclosed thermoplastic polyesters can be prepared by a variety of polycondensation methods known to the skilled artisan, such as a solvent polymerization or a melt polymerization process.

Thermoplastic Polyolefins

In some aspects, the thermoplastic polymers can comprise or consist essentially of a thermoplastic polyolefin. Exemplary of thermoplastic polyolefins useful can include, but are not limited to, polyethylene, polypropylene, and thermoplastic olefin elastomers (e.g., metallocene-catalyzed block copolymers of ethylene and α-olefins having 4 to about 8 carbon atoms). In a further aspect, the thermoplastic polyolefin is a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed compositions, yarns, and fibers are polymers of cycloolefins such as cyclopentene or norbornene.

It is to be understood that polyethylene, which optionally can be crosslinked, is inclusive a variety of polyethylenes, including, but not limited to, low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMVV), high density and ultrahigh molecular weight polyethylene (HDPE-UHMVV), and blends or mixtures of any of the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 wt % vinyl acetate-derived composition.

In some aspects, the thermoplastic polyolefin, as disclosed herein, can be formed through free radical, cationic, and/or anionic polymerization by methods well known to those skilled in the art (e.g., using a peroxide initiator, heat, and/or light). In a further aspect, the disclosed thermoplastic polyolefin can be prepared by radical polymerization under high pressure and at elevated temperature. Alternatively, the thermoplastic polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. In various aspects, the metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable thermoplastic polyolefins can be prepared by polymerization of monomers of monolefins and diolefins as described herein. Exemplary monomers that can be used to prepare disclosed thermoplastic polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbbury mixer and a biaxial extruder.

In some aspects, the thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

In some aspects, the thermoplastic polyolefin can be a copolymer of suitable monolefin monomers or a copolymer of a suitable monolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

In some aspects, the thermoplastic polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

In some aspects, the polyolefin is a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

In some aspects, the polyolefin is a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Methods of Making Resin Compositions

In various aspects, this disclosure also provides a method for making a resin composition, the method including blending a polypropylene copolymer and an effective amount of a polymeric resin modifier, wherein the effective amount of the polymeric resin modifier is effective to allow the resin composition to pass a flex test pursuant to the Cold Ross Flex Test using the Plaque Sampling Procedure.

A method is provided for making a resin composition, the method including blending a polypropylene copolymer and an effective amount of a polymeric resin modifier, wherein the effective amount of the polymeric resin modifier is effective to allow the resin composition to pass a flex test pursuant to the Cold Ross Flex Test using the Plaque Sampling Procedure without a significant change in abrasion loss when measured pursuant to ASTM D 5963-97a using the Material Sampling Procedure.

The resin compositions provided herein can be made by blending an effective amount of a polymeric resin modifier and a polyolefin copolymer to form a blended resin composition, wherein the effective amount is as described above. Methods of blending polymers can include film blending in a press, blending in a mixer (e.g. mixers commercially available under the tradename "HAAKE" from Thermo Fisher Scientific, Waltham, Mass.), solution blending, hot melt blending, and extruder blending. In some aspects, the polymeric resin modifier and polyolefin copolymer are miscible such that they can be readily mixed by the screw in the injection barrel during injection molding, e.g. without the need for a separate blending step.

The resin compositions provided herein can be made by blending an effective amount of an isotactic polyolefin copolymer resin modifier, wherein the effective amount is an amount effective to allow the resin composition to pass a flex test pursuant to the Cold Ross Flex Test using the Plaque Sampling Procedure, where a second resin composition identical to the resin composition except without the isotactic polyolefin copolymer resin modifier fails the flex test pursuant to the Cold Ross Flex Test using the Plaque Sampling Procedure. The effective amount can be an amount effective to maintain an abrasion loss of the resin composition within about 20% of an abrasion loss of the second resin composition as measured pursuant to ASTM D 5963-97a using the Material Sampling Procedure. The effective amount can be the effective amount of the isotactic polyolefin copolymer resin modifier is an amount effective to decrease a % crystallization of the resin composition by at least 4 percentage points as compared to a % crystallization of the second resin composition when measured according to the Differential Scanning calorimeter (DSC) Test using the Material Sampling Procedure.

The methods can further include extruding the blended resin composition to form an extruded resin composition. The methods of extruding the blended resin can include manufacturing long products of relatively constant cross-section (rods, sheets, pipes, films, wire insulation coating).

The methods of extruding the blended resin can include conveying a softened blended resin composition through a die with an opening. The blended resin can be conveyed forward by a feeding screw and forced through the die. Heating elements, placed over the barrel, can soften and melt the blended resin. The temperature of the material can be controlled by thermocouples. The product going out of the die can be cooled by blown air or in a water bath to form the extruded resin composition. Alternatively, the product going out of the die can be pelletized with little cooling as described below.

The method can further include pelletizing the extruded resin composition to form a pelletized resin composition. Methods of pelletizing can include melt pelletizing (hot cut) whereby the melt coming from a die is almost immediately cut into pellets that are conveyed and cooled by liquid or gas. Methods of pelletizing can include strand pelletizing (cold cut) whereby the melt coming from the die head is converted into strands (the extruded resin composition) that are cut into pellets after cooling and solidification.

The method can further include injection molding the pelletized resin composition to form an article. The injection molding can include the use of a non-rotating, cold plunger to force the pelletized resin through a heated cylinder wherein the resin composition is heated by heat conducted from the walls of the cylinder to the resin composition. The injection molding can include the use of a rotating screw, disposed co-axially of a heated barrel, for conveying the pelletized resin composition toward a first end of the screw and to heat the resin composition by the conduction of heat from the heated barrel to the resin composition. As the resin composition is conveyed by the screw mechanism toward the first end, the screw is translated toward the second end so as to produce a reservoir space at the first end. When sufficient melted resin composition is collected in the reservoir space, the screw mechanism can be pushed toward the first end so as to inject the material into a selected mold.

Methods of Making Components and Articles

The disclosure provides several methods for making components and articles described herein. The methods can include injection molding a resin composition described herein. The disclosure provides methods for manufacturing a component for an article of footwear or sporting equipment, by injection molding a resin composition described herein.

The methods can further include providing a component containing a resin composition, and providing a second element, and affixing the component to the second element. The second element can include a textile or multilayer film. For example, the second element can include an upper. The second element can include one or both of polyolefin fibers and polyolefin yarns.

In some aspects, polyolefin is present on a side or outer layer of the second element, and the method includes affixing the polyolefins together. The second element can include a yarn, a textile, a film, or some other element. Affixing the component to the second element can include directly injecting the resin composition onto the second element. Affixing the component to the second element can include forming a mechanical bond between the resin composition and the second element. Affixing the component to the second element can include (i) increasing a temperature of the resin composition to a first temperature above a melting or softening point of the resin composition, (ii) contacting the resin composition and the second element while the resin composition is at the first temperature, and (iii) keeping the resin composition and the second element in contact with each other while decreasing the temperature of the resin composition to a second temperature below the melting or softening point of the resin composition, forming a mechanical bond between the resin composition and the second element.

The second element can be a thermoplastic polymeric material, and affixing the component to the second element can include (i) increasing a temperature of the thermoplastic polymeric material to a first temperature above a melting or softening point of the thermoplastic polymeric material, (ii) contacting the resin composition and the second element while the thermoplastic polymeric material is at the first temperature, and (iii) keeping the resin composition and the second element in contact with each other while decreasing the temperature of the thermoplastic polymeric material to a second temperature below the melting or softening point of the thermoplastic polymeric material, forming a mechanical bond between the resin composition and the second element.

The second element can include a thermoplastic polymeric material, and affixing the component to the second element can include (i) increasing a temperature of both the resin composition and the thermoplastic polymeric material to a first temperature above both a melting or softening point of the resin composition and a melting or softening point of the thermoplastic polymeric material, (ii) contacting the resin composition and the second element while both the resin composition and the thermoplastic polymeric material are at the first temperature, and (iii) keeping the resin composition and the second element in contact with each other while decreasing the temperature of both the resin composition and the thermoplastic polymeric material to a second temperature below both the melting or softening point of the resin composition and the melting or softening point of the thermoplastic polymeric material, melding at least a portion of the resin material and the thermoplastic polymeric material with each other, thereby forming a mechanical bond between the resin composition and the second element.

In some aspects, the article is an article of footwear and the method included injection molding a plate described herein. The method can include providing the plate, providing an upper, and affixing the plate and the upper.

Property Analysis and Characterization Procedure

Cold Ross Flex Test

The cold Ross flex test is determined according the following test method. The purpose of this test is to evaluate the resistance to cracking of a sample under repeated flexing to 60 degrees in a cold environment. A thermoformed plaque of the material for testing is sized to fit inside the flex tester machine. Each material is tested as five separate samples. The flex tester machine is capable of flexing samples to 60 degrees at a rate of 100+/−5 cycles per minute. The mandrel diameter of the machine is 10 millimeters. Suitable machines for this test are the Emerson AR-6, the Satra S $T_m$ 141F, the Gotech GT-7006, and the Shin II Scientific SI-LTCO (DaeSung Scientific). The sample(s) are inserted into the machine according to the specific parameters of the flex machine used. The machine is placed in a freezer set to −6° C. for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

Abrasion Loss Test ASTM D 5963-97a

Abrasion loss is tested on cylindrical test pieces with a diameter of 16±0.2 mm and a minimum thickness of 6 mm cut from sheets using a ASTM standard hole drill. The abrasion loss is measured using Method B of ASTM D 5963-97a on a Gotech GT-7012-D abrasion test machine. The tests are performed as 22° C. with an abrasion path of 40 meters. The Standard Rubber #1 used in the tests has a density of 1.336 grams per cubic centimeter (g/cm$^3$). The smaller the abrasion loss volume, the better the abrasion resistance.

Mud Pull Off Testing Method

A two-inch diameter material sample is cut and affixed to the top plate of a set of parallel, flat aluminum test plates on a standard mechanical testing machine (e.g. Instron tensile testing equipment.) A 1-inch diameter mud sample, approximately 7 millimeter in height is loaded onto the bottom plate of the mechanical tester. The soil used to make the mud is commercially available under the tradename "TIMBERLINE TOP SOIL", model 50051562, from Timberline (subsidiary of Old Castle, Inc., Atlanta, Ga.) and was sifted with a square mesh with a pore dimension of 1.5 millimeter on each side. The mud was previously dried and then diluted to water to 22% water by weight. The force transducers are normalized to zero force. The plates are then pressed together to a load of 445 Newtons in the compressive direction. The load is then immediately removed and a small force hysteresis is measured at the mud detachment point that is greater than the tared value of zero in the tensile direction. The maximum force measured is the pull off force for the mud adhesion to the material substrate. The compression/detachment cycle is repeated at least 10 times until a stable value is obtained.

Differential Scanning Calorimeter (DSC) Test

To determine percent crystallinity of a resin composition including a copolymer and a polymeric resin modifier, samples of the copolymer, the resin composition, and of a homopolymer of the main component of the copolymer (e.g., polypropylene homopolymer polypropylene) are all analyzed by differential scanning calorimetry (DSC) over the temperature range from −80° C. to 250° C. A heating rate of 10° C. per minute is used. The melting endotherm is measured for each sample during heating. Universal Analysis software (TA Instruments, New Castle, Del., USA) is used to calculate percent crystallinity (% crystallinity) based upon the melting endotherm for the homopolymer (e.g., 207 Joules per gram for 100% crystalline polypropylene material). Specifically, the percent crystallinity (% crystallinity) is calculated by dividing the melting endotherm measured for the copolymer or for the resin composition by the 100% crystalline homopolymer melting endotherm.

Method to Determine the Creep Relation Temperature $T_{cr}$.

The creep relation temperature $T_{cr}$ is determined according to the exemplary techniques described in U.S. Pat. No. 5,866,058. The creep relaxation temperature $T_{cr}$ is calculated to be the temperature at which the stress relaxation modulus of the tested material is 10% relative to the stress relaxation modulus of the tested material at the solidification temperature of the material, where the stress relaxation modulus is measured according to AS $T_m$ E328-02. The solidification temperature is defined as the temperature at which there is little to no change in the stress relaxation modulus or little to no creep about 300 seconds after a stress is applied to a test material, which can be observed by plotting the stress relaxation modulus (in Pa) as a function of temperature (in ° C.).

Method to Determine the Vicat Softening Temperature $T_{vs}$.

The Vicat softening temperature $T_{vs}$ is be determined according to the test method detailed in AS $T_m$ D1525-09 Standard Test Method for Vicat Softening Temperature of Plastics, preferably using Load A and Rate A. Briefly, the Vicat softening temperature is the temperature at which a flat-ended needle penetrates the specimen to the depth of 1 mm under a specific load. The temperature reflects the point of softening expected when a material is used in an elevated temperature application. It is taken as the temperature at which the specimen is penetrated to a depth of 1 mm by a flat-ended needle with a 1 mm$^2$ circular or square cross-section. For the Vicat A test, a load of 10 N is used, whereas for the Vicat B test, the load is 50 N. The test involves placing a test specimen in the testing apparatus so that the penetrating needle rests on its surface at least 1 mm from the edge. A load is applied to the specimen per the requirements of the Vicat A or Vicate B test. The specimen is then lowered into an oil bath at 23° C. The bath is raised at a rate of 50° C. or 120° C. per hour until the needle penetrates 1 mm. The test specimen must be between 3 and 6.5 mm thick and at least 10 mm in width and length. No more than three layers can be stacked to achieve minimum thickness.

Method to Determine the Heat Deflection Temperature $T_{hd}$.

The heat deflection temperature $T_{hd}$ is be determined according to the test method detailed in AS $T_m$ D648-16 Standard Test Method for Deflection Temperature of Plastics Under Flexural Load in the Edgewise Position, using a 0.455 MPa applied stress. Briefly, the heat deflection temperature is the temperature at which a polymer or plastic sample deforms under a specified load. This property of a given plastic material is applied in many aspects of product design, engineering, and manufacture of products using thermoplastic components. In the test method, the bars are placed under the deflection measuring device and a load (0.455 MPa) of is placed on each specimen. The specimens are then lowered into a silicone oil bath where the temperature is raised at 2° C. per minute until they deflect 0.25 mm per AS $T_m$ D648-16. AS $T_m$ uses a standard bar 5"×½"×¼". ISO edgewise testing uses a bar 120 mm×10 mm×4 mm. ISO flatwise testing uses a bar 80 mm×10 mm×4 mm.

Method to Determine the Melting Temperature, $T_m$, and Glass Transition Temperature, $T_g$.

The melting temperature $T_m$ and glass transition temperature $T_g$ are determined using a commercially available Differential Scanning calorimeter ("DSC") in accordance with AS $T_m$ D3418-97. Briefly, a 10-15 gram sample is placed into an aluminum DSC pan and then the lead was sealed with the crimper press. The DSC is configured to scan from −100° C. to 225° C. with a 20° C./minute heating rate, hold at 225° C. for 2 minutes, and then cool down to 25° C. at a rate of −10° C./minute. The DSC curve created from this scan is then analyzed using standard techniques to determine the glass transition temperature $T_g$ and the melting temperature $T_m$.

Method to Determine the Melt Flow Index.

The melt flow index is determined according to the test method detailed in AS $T_m$ D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow rate values are calculated in g/10 min.

Method to Determine the Modulus (Plaque).

The modulus for a thermoformed plaque of material is determined according to the test method detailed in AS $T_m$ D412-98 Standard Test Methods for Vulcanized Rubber and Thermoplastic Rubbers and Thermoplastic Elastomers-Tension, with the following modifications. The sample dimension is the AS $T_m$D412-98 Die C, and the sample thickness used is 2.0 millimeters+/−0.5 millimeters. The grip type used is a pneumatic grip with a metal serrated grip face. The grip distance used is 75 millimeters. The loading rate used is 500 millimeters/minute. The modulus (initial) is calculated by taking the slope of the stress (MPa) versus the strain in the initial linear region.

Method to Determine the Modulus (Yarn).

The modulus for a yarn is determined according to the test method detailed in EN ISO 2062 (Textiles-Yarns from Packages)—Determination of Single-End Breaking Force and Elongation at Break Using Constant Rate of Extension (CRE) Tester, with the following modifications. The sample length used is 600 millimeters. The equipment used is an Instron and Gotech Fixture. The grip distance used is 250 millimeters. The pre-loading is set to 5 grams and the loading rate used is 250 millimeters/minute. The first meter of yarn is thrown away to avoid using damaged yarn. The modulus (initial) is calculated by taking the slope of the stress (MPa) versus the strain in the initial linear region.

Method to Determine Tenacity and Elongation.

The tenacity and elongation of yarn can be determined according to the test method detailed in EN ISO 2062 Determination of single end breaking force and elongation at break using constant rate of extension tester with the preload set to 5 grams.

Method to Determine Shrinkage.

The free-standing shrinkage of fibers and/or yarns can be determined by the following method. A sample fiber or yarn is cut to a length of approximately 30 millimeters with minimal tension at approximately room temperature (e.g., 20° C.). The cut sample is placed in a 50° C. or 70° C. oven for 90 seconds. The sample is removed from the oven and measured. The percentage of shrink is calculated using the pre- and post-oven measurements of the sample, by dividing the post-oven measurement by the pre-oven measurement, and multiplying by 100.

Method to Determine Enthalpy of Melting.

The enthalpy of melting is determined by the following method. A 5-10 mg sample of fibers or yarn is weighed to determine the sample mass, is placed into an aluminum DSC pan, and then the lid of the DSC pan is sealed using a crimper press. The DSC is configured to scan from −100° C. to 225° C. with a 20° C./minute heating rate, hold at 225° C. for 2 minutes, and then cool down to room temperature (e.g., 25° C.) at a rate of −10° C./minute. The enthalpy of melting is calculated by integrating the area of the melting endotherm peak and normalizing by the sample mass.

Water Uptake Capacity Test Protocol

This test measures the water uptake capacity of the layered material after a predetermined soaking duration for a sample (e.g., taken with the above-discussed Footwear Sampling Procedure). The sample is initially dried at 60° C. until there is no weight change for consecutive measurement intervals of at least 30 minutes apart (e.g., a 24-hour drying period at 60° C. is typically a suitable duration). The total weight of the dried sample ($Wt_{sample\ dry}$) is then measured in grams. The dried sample is allowed to cool down to 25° C., and is fully immersed in a deionized water bath maintained at 25° C. After a given soaking duration, the sample is removed from the deionized water bath, blotted with a cloth to remove surface water, and the total weight of the soaked sample ($Wt_{sample\ wet}$) is measured in grams.

Any suitable soaking duration can be used, where a 24-hour soaking duration is believed to simulate saturation conditions for the layered material of the present disclosure (i.e., the hydrophilic resin will be in its saturated state). Accordingly, as used herein, the expression "having a water uptake capacity at 5 minutes" refers to a soaking duration of 5 minutes, the expression "having a water uptake capacity at 1 hour" refers to a soaking duration of 1 hour, the expression "having a water uptake capacity at 24 hours" refers to a soaking duration of 24 hours, and the like. If no time duration is indicated after a water uptake capacity value, the soaking duration corresponds to a period of 24 hours.

As can be appreciated, the total weight of a sample taken pursuant to the Footwear Sampling Procedure includes the weight of the material as dried or soaked ($Wt_{sample\ dry}$ or $Wt_{sample\ wet}$) and the weight of the substrate ($Wt_{substrate}$) needs to be subtracted from the sample measurements.

The weight of the substrate ($Wt_{substrate}$) is calculated using the sample surface area (e.g., 4.0 cm$^2$), an average measured thickness of the layered material, and the average density of the layered material. Alternatively, if the density of the material for the substrate is not known or obtainable, the weight of the substrate ($Wt_{substrate}$) is determined by taking a second sample using the same sampling procedure as used for the primary sample, and having the same dimensions (surface area and film/substrate thicknesses) as the primary sample. The material of the second sample is then cut apart from the substrate of the second sample with a blade to provide an isolated substrate. The isolated substrate is then dried at 60° C. for 24 hours, which can be performed at the same time as the primary sample drying. The weight of the isolated substrate ($Wt_{substrate}$) is then measured in grams.

The resulting substrate weight ($Wt_{substrate}$) is then subtracted from the weights of the dried and soaked primary sample ($Wt_{sample\ dry}$ or $Wt_{sample\ wet}$) to provide the weights of the material as dried and soaked t ($Wt_{component\ dry}$ or $Wt_{component\ wet}$) as depicted by Equations 1 and 2.

$$Wt_{component\ dry} = Wt_{sample\ dry} - Wt_{substrate} \quad \text{(Eq. 1)}$$

$$Wt_{component\ wet} = Wt_{sample\ wet} - Wt_{substrate} \quad \text{(Eq. 2)}$$

The weight of the dried component t ($Wt_{component\ dry}$) is then subtracted from the weight of the soaked component ($Wt_{component\ wet}$) to provide the weight of water that was taken up by the component, which is then divided by the weight of the dried component t ($Wt_{component\ dry}$) to provide the water uptake capacity for the given soaking duration as a percentage, as depicted below by Equation 3.

$$\text{Water Uptake Capacity} = \frac{Wt_{component\ wet} - Wt_{component\ dry}}{Wt_{component\ dry}} (100\%) \quad \text{(Eq. 3)}$$

For example, a water uptake capacity of 50% at 1 hour means that the soaked component weighed 1.5 times more than its dry-state weight after soaking for 1 hour. Similarly, a water uptake capacity of 500% at 24 hours means that the soaked component weighed 5 times more than its dry-state weight after soaking for 24 hours.

Water Uptake Rate Test Protocol

This test measures the water uptake rate of the layered material by modeling weight gain as a function of soaking time for a sample with a one-dimensional diffusion model. The sample can be taken with any of the above-discussed sampling procedures, including the Footwear Sampling Procedure. The sample is dried at 60° C. until there is no weight change for consecutive measurement intervals of at least 30 minutes apart (a 24-hour drying period at 60° C. is typically a suitable duration). The total weight of the dried sample t ($Wt_{sample\ dry}$) is then measured in grams. Additionally, the average thickness of the component for the dried sample is measured for use in calculating the water uptake rate, as explained below.

The dried sample is allowed to cool down to 25° C., and is fully immersed in a deionized water bath maintained at 25° C. Between soaking durations of 1, 2, 4, 9, 16, and 25 minutes, the sample is removed from the deionized water bath, blotted with a cloth to remove surface water, and the total weight of the soaked sample t ($Wt_{sample\ wet}$) is measured, where "t" refers to the particular soaking-duration data point (e.g., 1, 2, 4, 9, 16, or 25 minutes).

The exposed surface area of the soaked sample is also measured with calipers for determining the specific weight gain, as explained below. The exposed surface area refers to the surface area that comes into contact with the deionized water when fully immersed in the bath. For samples obtained using the Footwear Sampling Procedure, the samples only have one major surface exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Footwear Sampling Procedure includes the weight of the material as dried or soaked ($Wt_{component\ wet}$ or $Wt_{component\ dry}$) and the weight of the article or backing substrate ($Wt_{substrate}$). In order to determine a weight change of the material due to water uptake, the weight of the substrate ($Wt_{substrate}$) needs to be subtracted from the sample weight measurements. This can be accomplished using the same steps discussed above in the Water Uptake Capacity Test to provide the resulting material weights $Wt_{component\ wet}$ and $Wt_{component\ dry}$ for each soaking-duration measurement.

The specific weight gain ($Ws_t$) from water uptake for each soaked sample is then calculated as the difference between the weight of the soaked sample ($Wt_{component\ wet}$) and the weight of the initial dried sample t ($Wt_{component\ dry}$) where the resulting difference is then divided by the exposed surface area of the soaked sample ($A_t$) as depicted in Equation 4.

$$(W_{St}) = \frac{(Wt_{component\ wet} - Wt_{component\ dry})}{(A_t)} \quad (\text{Eq. 4})$$

where t refers to the particular soaking-duration data point (e.g., 1, 2, 4, 9, 16, or 25 minutes), as mentioned above.

The water uptake rate for the elastomeric material is then determined as the slope of the specific weight gains ($Ws_t$) versus the square root of time (in minutes), as determined by a least squares linear regression of the data points. For the elastomeric material of the present disclosure, the plot of the specific weight gains ($Ws_t$) versus the square root of time (in minutes) provides an initial slope that is substantially linear (to provide the water uptake rate by the linear regression analysis). However, after a period of time depending on the thickness of the component, the specific weight gains will slow down, indicating a reduction in the water uptake rate, until the saturated state is reached. This is believed to be due to the water being sufficiently diffused throughout the elastomeric material as the water uptake approaches saturation, and will vary depending on component thickness.

As such, for the component having an average thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the component having an average dried thickness (as measured above) of 0.3 millimeters or more, the specific weight gain data points at 1, 2, 4, 9, 16, and 25 minutes are used in the linear regression analysis. The resulting slope defining the water uptake rate for the sample has units of weight/(surface area-square root of time), such as grams/(meter$^2$–minutes$^{1/2}$) or g/m$^2$/$\sqrt{\text{min}}$.

Furthermore, some component surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain in data points at 1, 2, and 4 minutes continue to show an increase in water uptake. If not, the water uptake rate under this test methodology is considered to be about zero g/m$^2$/$\sqrt{\text{min}}$.

Swelling Capacity Test Protocol

This test measures the swelling capacity of the component in terms of increases in thickness and volume after a given soaking duration for a sample (e.g., taken with the above-discussed Footwear Sampling Procedure). The sample is initially dried at 60° C. until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc.). The dried sample is then fully immersed in a deionized water bath maintained at 25° C. After a given soaking duration, the sample is removed from the deionized water bath, blotted with a cloth to remove surface water, and the same dimensions for the soaked sample are re-measured.

Any suitable soaking duration can be used. Accordingly, as used herein, the expression "having a swelling thickness (or volume) increase at 5 minutes of." refers to a soaking duration of 5 minutes, the expression "having a swelling thickness (or volume) increase at 1 hour of" refers to a test duration of 1 hour, the expression "having a swelling thickness (or volume) increase at 24 hours of" refers to a test duration of 24 hours, and the like.

The swelling of the component is determined by (1) an increase in the thickness between the dried and soaked component, by (2) an increase in the volume between the dried and soaked component, or (3) both. The increase in thickness between the dried and soaked components is calculated by subtracting the measured thickness of the initial dried component from the measured thickness of the soaked component. Similarly, the increase in volume between the dried and soaked components is calculated by subtracting the measured volume of the initial dried component from the measured volume of the soaked component. The increases in the thickness and volume can also be represented as percentage increases relative to the dry thickness or volume, respectively.

Contact Angle Test

This test measures the contact angle of the layered material based on a static sessile drop contact angle measurement for a sample (e.g., taken with the above-discussed Footwear Sampling Procedure or Co-extruded Film Sampling Procedure). The contact angle refers to the angle at which a liquid interface meets a solid surface, and is an indicator of how hydrophilic the surface is.

For a dry test (i.e., to determine a dry-state contact angle), the sample is initially equilibrated at 25 degree C. and 20% humidity for 24 hours. For a wet test (i.e., to determine a wet-state contact angle), the sample is fully immersed in a deionized water bath maintained at 25 degree C. for 24 hours. After that, the sample is removed from the bath and blotted with a cloth to remove surface water, and clipped to a glass slide if needed to prevent curling.

The dry or wet sample is then placed on a moveable stage of a contact angle goniometer commercially available under the tradename "RAME-HART F290" from Rame-Hart Instrument Co., Succasunna, N.J. A 10-microliter droplet of deionized water is then placed on the sample using a syringe and automated pump. An image is then immediately taken of the droplet (before film can take up the droplet), and the contact angle of both edges of the water droplet are measured from the image. The decrease in contact angle between the dried and wet samples is calculated by subtracting the measured contact angle of the wet layered material from the measured contact angle of the dry layered material.

Coefficient of Friction Test

This test measures the coefficient of friction of the Coefficient of Friction Test for a sample (e.g., taken with the above-discussed Footwear Sampling Procedure, Co-extruded Film Sampling Procedure, or the Neat Film Sampling Procedure). For a dry test (i.e., to determine a dry-state coefficient of friction), the sample is initially equilibrated at 25 degree C. and 20% humidity for 24 hours. For a wet test (i.e., to determine a wet-state coefficient of friction), the sample is fully immersed in a deionized water bath maintained at 25 degree C. for 24 hours. After that, the sample is removed from the bath and blotted with a cloth to remove surface water.

The measurement is performed with an aluminum sled mounted on an aluminum test track, which is used to perform a sliding friction test for test sample on an aluminum surface of the test track. The test track measures 127 millimeters wide by 610 millimeters long. The aluminum sled measures 76.2 millimeters.times.76.2 millimeters, with a 9.5 millimeter radius cut into the leading edge. The contact area of the aluminum sled with the track is 76.2 millimeters× 66.6 millimeters, or 5,100 square millimeters).

The dry or wet sample is attached to the bottom of the sled using a room temperature-curing two-part epoxy adhesive commercially available under the tradename "LOCTITE 608" from Henkel, Dusseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newtons). The crosshead of the test frame is increased at a rate of 5 millimeters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

Storage Modulus Test

This test measures the resistance of the layered material to being deformed (ratio of stress to strain) when a vibratory or oscillating force is applied to it, and is a good indicator of film compliance in the dry and wet states. For this test, a sample is provided in neat form using the Neat Film Sampling Procedure, which is modified such that the surface area of the test sample is rectangular with dimensions of 5.35 millimeters wide and 10 millimeters long. The layered material thickness can range from 0.1 millimeters to 2 millimeters, and the specific range is not particularly limited as the end modulus result is normalized according to layered material thickness.

The storage modulus (E') with units of megaPascals (MPa) of the sample is determined by dynamic mechanical analysis (DMA) using a DMA analyzer commercially available under the tradename "Q800 DMA ANALYZER" from TA Instruments, New Castle, Del., which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25 degree C., frequency of 1 Hertz, strain amplitude of 10 micrometers, preload of 1 Newton, and force track of 125%. The DMA analysis is performed at a constant 25 degree C. temperature according to the following time/relative humidity (RH) profile: (i) 0% RH for 300 minutes (representing the dry state for storage modulus determination), (ii) 50% RH for 600 minutes, (iii) 90% RH for 600 minutes (representing the wet state for storage modulus determination), and (iv) 0% RH for 600 minutes.

The E' value (in MPa) is determined from the DMA curve according to standard DMA techniques at the end of each time segment with a constant RH value. Namely, the E' value at 0% RH (i.e., the dry-state storage modulus) is the value at the end of step (i), the E' value at 50% RH is the value at the end of step (ii), and the E' value at 90% RH (i.e., the wet-state storage modulus) is the value at the end of step (iii) in the specified time/relative humidity profile.

The layered material can be characterized by its dry-state storage modulus, its wet-state storage modulus, or the reduction in storage modulus between the dry-state and wet-state layered materials, where wet-state storage modulus is less than the dry-state storage modulus. This reduction in storage modulus can be listed as a difference between the dry-state storage modulus and the wet-state storage modulus, or as a percentage change relative to the dry-state storage modulus.

Glass Transition Temperature Test

This test measures the glass transition temperature ($T_g$) of the outsole film for a sample, where the outsole film is provided in neat form, such as with the Neat Film Sampling Procedure or the Neat Material Sampling Procedure, with a 10-milligram sample weight. The sample is measured in both a dry state and a wet state (i.e., after exposure to a humid environment as described herein).

The glass transition temperature is determined with DMA using a DMA analyzer commercially available under the tradename "Q2000 DMA ANALYZER" from TA Instruments, New Castle, Del., which is equipped with aluminum hermetic pans with pinhole lids, and the sample chamber is purged with 50 milliliters/minute of nitrogen gas during analysis. Samples in the dry state are prepared by holding at 0% RH until constant weight (less than 0.01% weight change over 120 minute period). Samples in the wet state are prepared by conditioning at a constant 25 degree C. according to the following time/relative humidity (RH) profile: (i) 250 minutes at 0% RH, (ii) 250 minutes at 50% RH, and (iii) 1,440 minutes at 90% RH. Step (iii) of the conditioning program can be terminated early if sample weight is measured during conditioning and is measured to be substantially constant within 0.05% during an interval of 100 minutes.

After the sample is prepared in either the dry or wet state, it is analyzed by DSC to provide a heat flow versus temperature curve. The DSC analysis is performed with the following time/temperature profile: (i) equilibrate at −90 degree C. for 2 minutes, (ii) ramp at +10 degree C./minute to 250 degree C., (iii) ramp at −50 degree C./minute to −90 degree C., and (iv) ramp at +10 degree C./minute to 250 degree C. The glass transition temperature value (in Celsius) is determined from the DSC curve according to standard DSC techniques.

Sampling Procedures

Various properties of the resin compositions and plates and other articles formed therefrom can be characterized using samples prepared with the following sampling procedures:

Material Sampling Procedure

A material sampling procedure can be used to obtain a neat sample of a resin composition or, in some instances, a sample of a material used to form a resin composition. The material is provided in media form, such as flakes, granules, powders, pellets, and the like. If a source of the resin composition is not available in a neat form, the sample can be cut from a plate or other component containing the resin composition, thereby isolating a sample of the material.

Plaque Sampling Procedure

Polyolefin resin is combined with the effective amount of the polymeric resin modifier along with any additional components to form the resin composition. A portion of the resin composition is then be molded into a plaque sized to fit inside the Ross flexing tester used, the plaque having dimensions of about 15 centimeters (cm) by 2.5 centimeters (cm) and a thickness of about 1 millimeter (mm) to about 4 millimeter (mm) by thermoforming the resin composition in a mold. The sample is prepared by mixing the components of the resin composition together, melting the components, pouring or injecting the melted composition into the mold cavity, cooling the melted composition to solidify it in the mold cavity to form the plaque, and then removing the solid plaque from the mold cavity.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

The term "providing," as used herein and as recited in the claims, is not intended to require any particular delivery or receipt of the provided item. Rather, the term "providing" is merely used to recite items that will be referred to in subsequent elements of the claim(s), for purposes of clarity and ease of readability. The terms "Material Sampling Procedure", "Plaque Sampling Procedure", "Cold Ross Flex Test", "ASTM D 5963-97a", and "Differential Scanning calorimeter (DSC) Test" as used herein refer to the respective sampling procedures and test methodologies described in the Property Analysis And Characterization Procedure section. These sampling procedures and test methodologies characterize the properties of the recited materials, films, articles and components, and the like, and are not required to be performed as active steps in the claims.

The term "about," as used herein, can include traditional rounding according to significant figures of the numerical value. In some aspects, the term about is used herein to mean a deviation of 10%, 5%, 2.5%, 1%, 0.5%, 0.1%, 0.01%, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

A random copolymer of propylene with about 2.2% by weight (wt %) ethylene is commercially available under the tradename "PP9054" from ExxonMobil Chemical Company, Houston, Tex. It has a MFR (ASTM-1238D, 2.16 kilograms, 230° C.) of about 12 grams/10 minutes and a density of 0.90 grams/cubic centimeter (g/cm$^3$).

PP9074 is a random copolymer of propylene with about 2.8% by weight (wt %) ethylene and is commercially available under the tradename "PP9074" from ExxonMobil Chemical Company, Houston, Tex. It has a MFR (ASTM-1238D, 2.16 kilograms, 230° C.) of about 24 grams/10 minutes and a density of 0.90 grams/cubic centimeter (g/cm$^3$).

PP1024E4 is a propylene homopolymer commercially available under the tradename "PP1024E4" from ExxonMobil Chemical Company, Houston, Tex. It has an MFR (ASTM-1238D, 2.16 kilograms, 230° C.) of about 13 grams/10 minutes and a density of 0.90 grams/cubic centimeter (g/cm$^3$).

Vistamaxx 6202 is a copolymer primarily composed of isotactic propylene repeat units with about 15% by weight (wt %) of ethylene repeat units randomly distributed along the copolymer. It is a metallocene catalyzed copolymer available under the tradename "VISTAMAXX 6202" from ExxonMobil Chemical Company, Houston, Tex. and has an MFR (ASTM-1238D, 2.16 kilograms, 230° C.) of about 20 grams/10 minutes, a density of 0.862 grams/cubic centimeter (g/cm$^3$), and a Durometer Hardness of about 64 (Shore A).

Vistamaxx™ 3000 is a copolymer primarily composed of isotactic propylene repeat units with about 11% by weight (wt %) of ethylene repeat units randomly distributed along the copolymer. It is a metallocene catalyzed copolymer available from ExxonMobil Chemical Company and has an MFR (ASTM-1238D, 2.16 kilograms, 230° C.) of about 8 grams/10 minutes, a density of 0.873 grams/cubic centimeter (g/cm$^3$), and a Durometer Hardness of about 27 (Shore D).

Vistamaxx™ 6502 is a copolymer primarily composed of isotactic propylene repeat units with about 13% by weight of ethylene repeat units randomly distributed along the copolymer. It is a metallocene catalyzed copolymer available from ExxonMobil Chemical Company and has an MFR (ASTM-1238D, 2.16 kilograms, 230° C.) of about 45 grams/10 minutes, a density of 0.865 grams/cubic centimeter (g/cm$^3$), and a Durometer Hardness of about 71 (Shore A).

Examples

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

For the examples described below, the following base resins were used.

TABLE 1

Base Resins
Base Resin Description

| Polyolefin Base Resin | Supplier | MFI | Description |
|---|---|---|---|
| PP9054 | ExxonMobil | 12 | Propylene Random Copolymer |
| PP9074Med | ExxonMobil | 24 | Propylene Random Copolymer/High Clarity |
| PP1024E4 | ExxonMobil | 13 | Propylene Homopolymer |

The following polymeric resin modifiers were used in the examples.

TABLE 2

Polymeric Resin Modifiers
Modifier/Blend Description

| Polymeric Resin Modifiers | Supplier | MFI | Loading % | Ethylene Percent |
|---|---|---|---|---|
| Vistamaxx 6202 | ExxonMobil | 21 | 30 | 15 |
| Vistamaxx 3000 | ExxonMobil | 9.1 | 50 | 11 |
| Vistamaxx 6502 | ExxonMobil | 43 | 40 | 13 |

The resin compositions including the base resins and varying amounts of polymeric resin modifier were prepared and tested to determine the abrasion loss pursuant to the ASTM D 5963-97a using the Material Sampling Procedure; and by a flex test pursuant to the Cold Ross Flex Test using the Plaque Sampling Procedure. The results are presented in Table 3. The percent (%) crystallization was measured for sample resin compositions using according to the Differential Scanning calorimeter (DSC) Test using the Material Sampling Procedure. The results are reported in Table 4.

TABLE 3

Density, DIN Abrasion Loss, and Cold Ross Flex Summary of Resin Compositions With Varying Amounts of Polymeric Resin Modifier

| Polyolefin Base Resin | Base Resin wt % | Polymeric Resin Modifier | Resin Modifier wt % | Cold Ross Flex Summary | Density | DIN Abrasion Loss ($cm^3$) |
|---|---|---|---|---|---|---|
| PP9054 | 100 | n/a | 0 | Fail | 0.896 | 0.089 |
| PP9054 | 85 | 6202 | 15 | Pass | 0.891 | 0.085 |
| PP9054 | 70 | 6202 | 30 | * | 0.891 | 0.095 |
| PP9054 | 50 | 6202 | 50 | * | 0.883 | 0.158 |
| PP9054 | 85 | 6502 | 15 | * | 0.896 | 0.084 |
| PP9054 | 80 | 6502 | 20 | Pass | * | * |
| PP9054 | 60 | 6502 | 40 | * | * | * |
| PP9054 | 85 | 3000 | 15 | * | 0.897 | 0.078 |
| PP9054 | 75 | 3000 | 25 | Pass | * | * |
| PP9054 | 50 | 3000 | 50 | * | * | * |
| PP9074Med | 100 | n/a | 0 | Fail | 0.902 | 0.089 |
| PP9074Med | 85 | 6202 | 15 | * | 0.894 | 0.101 |
| PP9074Med | 70 | 6202 | 30 | Pass | * | * |
| PP1024E4 | 100 | n/a | 0 | Pass | 0.903 | 0.083 |
| PP1024E4 | 85 | 6202 | 15 | * | 0.899 | 0.162 |
| PP1024E4 | 50 | 3000 | 50 | Pass | * | * |

*not determined

TABLE 4

Percent Crystallization of Representative Resin Compositions

| Base Resin | Base Resin wt % | Blend Resin | Blend Resin wt % | % Crystalization |
|---|---|---|---|---|
| PP9054 | 100 | n/a | 0 | 38% |
| PP9054 | 85 | 6202 | 15 | 34% |
| PP9054 | 70 | 6202 | 30 | 30% |
| PP9054 | 80 | 6502 | 20 | 24% |
| PP9054 | 60 | 6502 | 40 | 24% |
| PP9054 | 75 | 3000 | 25 | 29% |
| PP9054 | 50 | 3000 | 50 | 23% |
| PP9074Med | 100 | n/a | 0 | 45% |
| PP9074Med | 70 | 6202 | 30 | 30% |
| PP1024E4 | 100 | n/a | 0 | 54% |
| PP1024E4 | 50 | 3000 | 50 | 30% |

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following features, which should not be confused with the claims.

Feature 1. A sole structure for an article of footwear, the sole structure comprising: a plate comprising a polyolefin resin, the plate having a first side and a second side, wherein the first side is configured to be ground-facing when the plate is a component of an article of footwear; and a textile disposed on one or both of the first side and the second side.

Feature 2. The sole structure according to any one of Features 1-105, wherein the textile is on the second side.

Feature 3. The sole structure according to any one of Features 1-105, further comprising a lower chassis, wherein the lower chassis is configured to be on the first side of the plate.

Feature 4. The sole structure according to any one of Features 1-105, wherein the lower chassis is configured to wrap around the plate and to engage or be attached to an upper when the sole structure is a component of an article of footwear.

Feature 5. The sole structure according to any one of Features 1-105, wherein the lower chassis is configured to attach to the upper at the bite line when the sole structure is a component of an article of footwear.

Feature 6. The sole structure according to any one of Features 1-105, wherein the lower chassis comprises a polymer selected from the group consisting of polypropylene, polypropylene/polyethylene copolymers, copolymers of ethylene and higher olefins such as polyethylene/polyoctene copolymers, copolymers thereof including one or more additional polymers, and blends thereof.

Feature 7. The sole structure according to any one of Features 1-105, wherein the chassis comprises a polyolefin.

Feature 8. The sole structure according to any one of Features 1-105, wherein the chassis comprises a resin composition according to any one of Features 130-194.

Feature 9. The sole structure according to any one of Features 1-105, wherein the textile is on the first side of the plate, and wherein the textile comprises a patterned or decorative textile.

Feature 10. The sole structure according to any one of Features 1-105, wherein the textile is on the first side of the plate, and wherein a bond strength of the first side to the chassis is greater than a bond strength of the otherwise same plate to the otherwise same chassis using the otherwise same bonding procedure except without the textile.

Feature 11. The sole structure according to any one of Features 1-105, wherein the textile comprises a first textile on the first side of the plate and a second textile on the second side of the plate.

Feature 12. The sole structure according to any one of Features 1-105, wherein the first textile and the second textile are different.

Feature 13. The sole structure according to any one of Features 1-105, wherein the first textile and the second textile are the same.

Feature 14. The sole structure according to any one of Features 1-105, wherein the sole structure is configured to extend from a medial side to a lateral side of the article of footwear when the sole structure is the component of the article of footwear.

Feature 15. The sole structure according to any one of Features 1-105, wherein a length of the plate is configured to extend through a metatarsal region to a midfoot region of the article of footwear when the sole structure is the component of the article of footwear.

Feature 16. The sole structure according to any one of Features 1-105, wherein a length of the plate is configured to extend through a midfoot region to a heel region of the article of footwear when the sole structure is the component of the article of footwear.

Feature 17. The sole structure according to any one of Features 1-105, wherein a length of the plate is configured to extend from a toe region to a heel region of the article of footwear when the sole structure is the component of the article of footwear.

Feature 18. The sole structure according to any one of Features 1-105, wherein the first side of the plate includes traction elements.

Feature 19. The sole structure according to any one of Features 1-105, wherein the traction elements are integrally formed in the plate.

Feature 20. The sole structure according to any one of Features 1-105, wherein the traction elements include the injection molded resin composition.

Feature 21. The sole structure according to any one of Features 1-105, wherein the chassis includes traction elements on a side of the chassis that is configured to be ground facing when the sole structure is a component of an article of footwear.

Feature 22. The sole structure according to any one of Features 1-105, wherein the traction elements are integrally formed in the chassis.

Feature 23. The sole structure according to any one of Features 1-105, wherein the first side of the plate comprises one or more openings configured to receive a detachable traction element.

Feature 24. The sole structure according to any one of Features 1-105, wherein the chassis includes one or more openings configured to receive a detachable traction element on a side of the chassis that is configured to be ground facing when the sole structure is a component of an article of footwear.

Feature 25. The sole structure according to any one of Features 1-105, wherein the traction elements comprise a second resin that is different from the polyolefin resin.

Feature 26. The sole structure according to any one of Features 1-105, wherein the second resin comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, an olefin elastomer, a copolymer thereof, or a blend or mixture thereof.

Feature 27. The sole structure according to any one of Features 1-105, wherein the second resin comprises about 20%, about 10%, or less of a polyolefin.

Feature 28. The sole structure according to any one of Features 1-105, wherein the second resin comprises about 20%, about 10%, or less of polypropylene.

Feature 29. The sole structure according to any one of Features 1-105, wherein the second resin comprises an ethylene-propylene rubber (EPDM) dispersed in a polypropylene.

Feature 30. The sole structure according to any one of Features 1-105, wherein the second resin comprises a block copolymer comprising a polystyrene block.

Feature 31. The sole structure according to any one of Features 1-105, wherein the block copolymer comprises a copolymer of styrene and one or both of ethylene and butylene.

Feature 32. The sole structure according to any one of Features 1-105, wherein the textile is disposed on the plate by injection molding the plate onto the textile, by laminating the textile onto the plate, by welding the textile onto the plate, and/or by bonding to the plate using an adhesive.

Feature 33. The sole structure according to any one of Features 1-105, wherein the textile is selected from the group consisting of a woven textile, a non-woven textile, a knit textile, a braided textile, and a combination thereof.

Feature 34. The sole structure according to any one of Features 1-105, wherein the textile comprises one or more fibers comprising a polymer selected from the group consisting of a polyester, a polyamide, a polyolefin, a blend thereof, and a combination thereof.

Feature 35. The sole structure according to any one of Features 1-105, wherein the textile comprises a yarn comprising the fibers.

Feature 36. The sole structure according to any one of Features 1-105, wherein a surface roughness of the surface comprising the textile is greater than a surface roughness of the otherwise same surface except without the textile.

Feature 37. The sole structure according to any one of Features 1-105, wherein the plate comprises a resin composition according to any one of Features 130-194.

Feature 38. The sole structure according to any one of Features 1-105, wherein the plate further comprises a clarifying agent.

Feature 39. The sole structure according to any one of Features 1-105, wherein the clarifying agent is present in an amount from about 0.5% by weight to about 5% by weight or about 1.5% by weight to about 2.5% by weight based upon a total weight of the polyolefin resin.

Feature 40. The sole structure according to any one of Features 1-105, wherein the clarifying agent is selected from the group consisting of a substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl) methylene], and a derivative thereof.

Feature 41. The sole structure according to any one of Features 1-105, wherein the clarifying agent comprises an acetal compound that is the condensation product of a polyhydric alcohol and an aromatic aldehyde.

Feature 42. The sole structure according to any one of Features 1-105, wherein the polyhydric alcohol is selected from the group consisting of acyclic polyols such as xylitol and sorbitol and acyclic deoxy polyols such as 1,2,3-trideoxynonitol or 1,2,3-trideoxynon-1-enitol.

Feature 43. The sole structure according to any one of Features 1-105, wherein the aromatic aldehyde is selected from the group consisting of benzaldehyde and substituted benzaldehydes.

Feature 44. A sole structure for an article of footwear, the sole structure comprising: a plate comprising a polyolefin resin, the plate having a first side and a second side, wherein the first side is configured to be ground-facing when the plate is a component of an article of footwear; and a chassis, wherein the chassis is configured to be on the first side of the plate.

Feature 45. The sole structure according to any one of Features 1-105, wherein the chassis is configured to wrap around the plate and to engage or be attached to an upper when the sole structure is a component of an article of footwear.

Feature 46. The sole structure according to any one of Features 1-105, wherein the chassis is configured to attach to the upper at the bite line when the sole structure is a component of an article of footwear.

Feature 47. The sole structure according to any one of Features 1-105, wherein the chassis comprises a polymer selected from the group consisting of polypropylene, polypropylene/polyethylene copolymers, copolymers of ethylene and higher olefins such as polyethylene/polyoctene copolymers, copolymers thereof including one or more additional polymers, and blends thereof.

Feature 48. The sole structure according to any one of Features 1-105, wherein the chassis comprises a polyolefin.

Feature 49. The sole structure according to any one of Features 1-105, wherein the chassis comprises a resin composition according to any one of Features 130-194.

Feature 50. The sole structure according to any one of Features 1-105, wherein the chassis comprises a second resin that is different from the polyolefin resin.

Feature 51. The sole structure according to any one of Features 1-105, wherein the second resin comprises a polystyrene, a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, an olefin elastomer, a copolymer thereof, or a blend or mixture thereof.

Feature 52. The sole structure according to any one of Features 1-105, wherein the second resin comprises about 20%, about 10%, or less of a polyolefin.

Feature 53. The sole structure according to any one of Features 1-105, wherein the second resin comprises about 20%, about 10%, or less of polypropylene.

Feature 54. The sole structure according to any one of Features 1-105, wherein the second resin comprises an ethylene-propylene rubber (EPDM) dispersed in a polypropylene.

Feature 55. The sole structure according to any one of Features 1-105, wherein the second resin comprises a block copolymer comprising a polystyrene block.

Feature 56. The sole structure according to any one of Features 1-105, wherein the block copolymer comprises a copolymer of styrene and one or both of ethylene and butylene.

Feature 57. The sole structure according to any one of Features 1-105, wherein the sole structure is configured to extend from a medial side to a lateral side of the article of footwear when the sole structure is the component of the article of footwear.

Feature 58. The sole structure according to any one of Features 1-105, wherein a length of the plate is configured to extend through a metatarsal region to a midfoot region of the article of footwear when the sole structure is the component of the article of footwear.

Feature 59 The sole structure according to any one of Features 1-105, wherein a length of the plate is configured to extend through a midfoot region to a heel region of the article of footwear when the sole structure is the component of the article of footwear.

Feature 60. The sole structure according to any one of Features 1-105, wherein a length of the plate is configured to extend from a toe region to a heel region of the article of footwear when the sole structure is the component of the article of footwear.

Feature 61. The sole structure according to any one of Features 1-105, wherein the first side of the plate includes traction elements.

Feature 62. The sole structure according to any one of Features 1-105, wherein the traction elements are integrally formed in the plate.

Feature 63. The sole structure according to any one of Features 1-105, wherein the traction elements include the injection molded resin composition.

Feature 64. The sole structure according to any one of Features 1-105, wherein the chassis includes traction elements on a side of the chassis that is configured to be ground facing when the sole structure is a component of an article of footwear.

Feature 65. The sole structure according to any one of Features 1-105, wherein the traction elements are integrally formed in the chassis.

Feature 66. The sole structure according to any one of Features 1-105, wherein the chassis includes one or more openings configured to receive a detachable traction element on a side of the chassis that is configured to be ground facing when the sole structure is a component of an article of footwear.

Feature 67. The sole structure according to any one of Features 1-105, wherein the plate comprises a resin composition according to any one of Features 130-194.

Feature 68. The sole structure according to any one of Features 1-105, wherein the plate further comprises a clarifying agent.

Feature 69. The sole structure according to any one of Features 1-105, wherein the clarifying agent is present in an amount from about 0.5% by weight to about 5% by weight or about 1.5% by weight to about 2.5% by weight based upon a total weight of the polyolefin resin.

Feature 70. The sole structure according to any one of Features 1-105, wherein the clarifying agent is selected from the group consisting of a substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl) methylene], and a derivative thereof.

Feature 71. The sole structure according to any one of Features 1-105, wherein the clarifying agent comprises an acetal compound that is the condensation product of a polyhydric alcohol and an aromatic aldehyde.

Feature 72. The sole structure according to any one of Features 1-105, wherein the polyhydric alcohol is selected from the group consisting of acyclic polyols such as xylitol and sorbitol and acyclic deoxy polyols such as 1,2,3-trideoxynonitol or 1,2,3-trideoxynon-1-enitol.

Feature 73. The sole structure according to any one of Features 1-105, wherein the aromatic aldehyde is selected from the group consisting of benzaldehyde and substituted benzaldehydes.

Feature 74. The sole structure according to any one of Features 1-105, wherein the first side of the plate comprises a hydrogel material.

Feature 75. The sole structure according to any one of Features 1-105, wherein the hydrogel material comprises a polyurethane hydrogel.

Feature 76. The sole structure according to any one of Features 1-105, wherein the polyurethane hydrogel is a reaction polymer of a diisocyanate with a polyol.

Feature 77. The sole structure according to any one of Features 1-105, wherein the hydrogel material comprises a polyamide hydrogel.

Feature 78. The sole structure according to any one of Features 1-105, wherein the polyamide hydrogel is a reaction polymer of a condensation of diamino compounds with dicarboxylic acids.

Feature 79. The sole structure according to any one of Features 1-105, wherein the hydrogel material comprises a polyurea hydrogel.

Feature 80. The sole structure according to any one of Features 1-105, wherein the polyurea hydrogel is a reaction polymer of a diisocyanate with a diamine.

Feature 81. The sole structure according to any one of Features 1-105, wherein the hydrogel material comprises a polyester hydrogel.

Feature 82. The sole structure according to any one of Features 1-105, wherein the polyester hydrogel is a reaction polymer of a dicarboxylic acid with a diol.

Feature 83. The sole structure according to any one of Features 1-105, wherein the hydrogel material comprises a polycarbonate hydrogel.

Feature 84. The sole structure according to any one of Features 1-105, wherein the polycarbonate hydrogel is a reaction polymer of a diol with phosgene or a carbonate diester Feature 85. The sole structure according to any one of Features 1-105, wherein the hydrogel material comprises a polyetheramide hydrogel.

Feature 86. The sole structure according to any one of Features 1-105, wherein the polyetheramide hydrogel is a reaction polymer of dicarboxylic acid and polyether diamine.

Feature 87. The sole structure according to any one of Features 1-105, wherein the hydrogel material comprises a hydrogel formed of addition polymers of ethylenically unsaturated monomers.

Feature 88. The sole structure according to any one of Features 1-105, wherein the hydrogel material comprises a hydrogel formed of a copolymer, wherein the copolymer is a combination of two or more types of polymers within each polymer chain.

Feature 89. The sole structure according to any one of Features 1-105, wherein the copolymer is selected from the group consisting of: a polyurethane/polyurea copolymer, a polyurethane/polyester copolymer, and a polyester/polycarbonate copolymer.

Feature 90. The sole structure according to any one of Features 1-105, wherein the sole structure comprises the chassis, and wherein the chassis or a side of the chassis that is configured to be ground facing when the sole structure is a component of an article of footwear comprises the hydrogel material.

Feature 91. The sole structure of according any one of Features 1-105, wherein the hydrogel material has a water cycling weight loss from about 0 wt. % to about 15 wt. % as measured using the Water Cycling Test with the Component Sampling Procedure.

Feature 92. The sole structure of according to any one of Features 1-105, wherein the hydrogel material has a water cycling weight loss of less than 15 wt. % as measured using the Water Cycling Test with the Component Sampling Procedure.

Feature 93. The sole structure of according to any one of Features 1-105, wherein the hydrogel material has a water cycling weight loss of less than 10 wt. %.

Feature 94. The sole structure of according to any one of Features 1-105, wherein the hydrogel material has a dry-state thickness in the range of about 0.2 mm to about 2.0 mm.

Feature 95. The sole structure of according to any one of Features 1-105, wherein the hydrogel material has a saturated-state thickness that is at least 100% greater than the dry-state thickness of the hydrogel material.

Feature 96. The sole structure of according to any one of Features 1-105, wherein the saturated-state thickness of the hydrogel material is at least 200% greater than the dry-state thickness of the hydrogel material.

Feature 97. The sole structure of according to any one of Features 1-105, wherein the sole structure has a ground facing side, and the hydrogel material is affixed to the ground facing side of the sole structure.

Feature 98. The sole structure of according to any one of Features 1-105, wherein the textile is on the ground facing side of the sole structure, and wherein the textile is a knit textile, a woven textile, a non-woven textile, a braided textile, or a combination thereof.

Feature 99. The sole structure of according to any one of Features 1-105, wherein the sole structure further includes an adhesive, a primer, or a tie layer located between the ground facing side and the hydrogel material or elastomeric material.

Feature 100. The sole structure according to any one of Features 1-105, wherein one or more of the adhesive, the primer, and the tie layer include a polymer having epoxy segments, urethane segments, acrylic segments, cyanoacrylate segments, silicone segments, or any combination thereof.

Feature 101. The sole structure according to any one of Features 1-105, wherein one or more of the polyolefin resin of the plate, the adhesive, the primer, and the tie layer include a polymer having maleic anhydride functional groups.

Feature 102. The sole structure according to any one of Features 1-105, wherein one or more of the plate, the adhesive, the primer, and the tie layer include maleic anhydride.

Feature 103. The sole structure according to any one of Features 1-105, wherein the adhesive, the primer or the tie layer includes a thermoplastic polyurethane.

Feature 104. The sole structure according to any one of Features 1-105, wherein the ground facing side of the sole structure includes a texture.

Feature 105. The sole structure according to any one of Features 1-105, wherein the ground facing side of the sole structure formed by the hydrogel material has a mud pull-off force that is less than about 12 Newton as determined by the Mud Pull-Off Test using the Component Sampling Procedure.

Feature 106. An article of footwear comprising an upper and a sole structure according to any one of Features 1-105.

Feature 107. The article of footwear according to any one of Features 106-110, wherein the article includes a mechanical bond between the plate and the upper.

Feature 108. The article of footwear according to any one of Features 106-110, wherein the article includes an adhesive bond between the surface comprising the textile and the upper.

Feature 109. The article of footwear according to any one of Features 106-110, further comprising a bond between the chassis and the upper.

Feature 110. The article of footwear according to any one of Features 106-110, wherein one or more of the resin composition of the plate, the resin composition of the chassis, and a polymeric material of the upper are melded together.

Feature 111. A method of manufacturing a component for an article of footwear or athletic equipment, the method comprising disposing a textile onto a surface of a polyolefin resin composition.

Feature 112. The method according to any one of Features 111-118, comprising injection molding the resin composition onto the textile.

Feature 113. The method according to any one of Features 111-118, comprising one or more of laminating the textile onto a surface of the resin composition, welding the textile onto a surface of the resin composition, and bonding to a surface of the resin composition using an adhesive.

Feature 114. The method according to any one of Features 111-118, wherein the textile is selected from the group consisting of a woven textile, a non-woven textile, a knit textile, a braided textile, and a combination thereof.

Feature 115. The method according to any one of Features 111-118, wherein the textile comprises one or more fibers comprising a polymer selected from the group consisting of a polyester, a polyamide, a polyolefin, a blend thereof, and a combination thereof.

Feature 116. The method according to any one of Features 111-118, wherein the textile comprises a yarn comprising the fibers.

Feature 117. The method according to any one of Features 111-118, wherein a surface roughness of the surface comprising the textile is greater than a surface roughness of the otherwise same surface except without the textile.

Feature 118. The method according to any one of Features 111-118, wherein the resin composition comprises a resin composition according to any one of Features 130-194.

Feature 119. A method of manufacturing a sole structure, the method comprising disposing a textile onto a surface of a plate, wherein the plate comprises a polyolefin resin composition.

Feature 120. The method according to any one of Features 119-129, comprising injection molding the plate onto the textile.

Feature 121. The method according to any one of Features 119-129, comprising one or more of laminating the textile onto a surface of the plate, welding the textile onto a surface of the plate, and bonding to a surface of the plate using an adhesive.

Feature 122. The method according to any one of Features 119-129, wherein the textile is selected from the group consisting of a woven textile, a non-woven textile, a knit textile, a braided textile, and a combination thereof.

Feature 123. The method according to any one of Features 119-129, wherein the textile comprises one or more fibers comprising a polymer selected from the group consisting of a polyester, a polyamide, a polyolefin, a blend thereof, and a combination thereof.

Feature 124. The method according to any one of Features 119-129, wherein the textile comprises a yarn comprising the fibers.

Feature 125. The method according to any one of Features 119-129, wherein a surface roughness of the surface comprising the textile is greater than a surface roughness of the otherwise same surface except without the textile.

Feature 126. The method according to any one of Features 119-129, wherein the resin composition comprises a resin composition according to any one of Features 130-194.

Feature 127. The method according to any one of Features 119-129, further comprising disposing the plate in a chassis configured to be on a ground facing side of the plate when the sole structure is a component of an article of footwear.

Feature 128. The method according to any one of Features 119-129, further comprising injection molding the plate into a chassis configured to be on a ground facing side of the plate when the sole structure is a component of an article of footwear.

Feature 129. The method according to any one of Features 119-129, wherein the chassis is injection molded prior to injection molding the plate.

Feature 130. A resin composition comprising: a polyolefin copolymer, and an effective amount of a polymeric resin modifier.

Feature 131. The resin composition according to any one of Features 130-194, wherein the resin composition has an abrasion loss of about 0.05 cubic centimeters to about 0.1 cubic centimeters or about 0.08 cubic centimeters to about 0.1 cubic centimeters pursuant to ASTM D 5963-97a using the Material Sampling Procedure.

Feature 132. The resin composition according to any one of Features 130-194, wherein the effective amount of the polymeric resin modifier is an amount effective to allow the resin composition to pass a flex test pursuant to the Cold Ross Flex Test using the Plaque Sampling Procedure.

Feature 133. The resin composition according to any one of Features 130-194, wherein the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to ASTM D 5963-97a using the Material Sampling Procedure.

Feature 134. The resin composition according to any one of Features 130-194, wherein the abrasion loss of the resin composition is about 0.08 cubic centimeters to about 0.1 cubic centimeters.

Feature 135. The resin composition according to any one of Features 130-194, wherein the polyolefin copolymer is a random copolymer.

Feature 136. The resin composition according to any one of Features 130-194, wherein the polyolefin copolymer comprises a plurality of repeat units, with each of the plurality of repeat units individually derived from an alkene monomer having about 1 to about 6 carbon atoms.

Feature 137. The resin composition according to any one of Features 130-194, wherein the polyolefin copolymer comprises a plurality of repeat units, with each of the plurality of repeat units individually derived from a monomer selected from the group consisting of ethylene, propylene, 4-methyl-1-pentene, 1-butene, and a combination thereof.

Feature 138. The resin composition according to any one of Features 130-194, wherein the polyolefin copolymer comprises a plurality of repeat units each individually selected from Formula 1A-1D

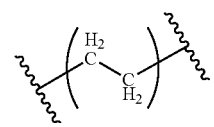

Formula 1A

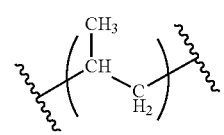

Formula 1B

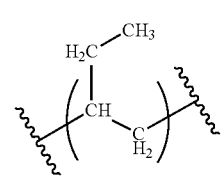

Formula 1C

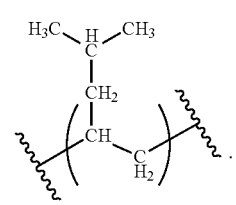

Formula 1D

Feature 139. The resin composition according to any one of Features 130-194, wherein the polyolefin copolymer comprises a plurality of repeat units each individually having a structure according to Formula 2

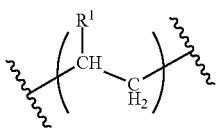

Formula 2 where $R^1$ is a hydrogen or a substituted or unsubstituted, linear or branched, $C_1$-$C_{12}$ alkyl or heteroalkyl.

Feature 140. The resin composition according to any one of Features 130-194, wherein polymers in the resin composition consist essentially of polyolefin copolymers.

Feature 141. The resin composition according to any one of Features 130-194, wherein the polyolefin copolymer is a random copolymer of a first plurality of repeat units and a second plurality of repeat units, and wherein each repeat unit in the first plurality of repeat units is derived from ethylene and the each repeat unit in the second plurality of repeat units is derived from a second olefin.

Feature 142. The resin composition according to any one of Features 130-194, wherein the second olefin is selected from the group consisting of propylene, 4-methyl-1-pentene, 1-butene, and other linear or branched terminal alkenes having about 3 to 12 carbon atoms.

Feature 143. The resin composition according to any one of Features 130-194, wherein each of the repeat units in the first plurality of repeat units has a structure according to Formula 1A, and wherein each of the repeat units in the second plurality of repeat units has a structure selected from Formula 1B-1D

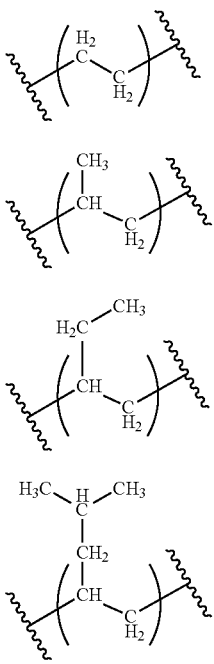

Formula 1A

Formula 1B

Formula 1C

Formula 1D

Feature 144. The resin composition according to any one of Features 130-194, wherein each of the repeat units in the first plurality of repeat units has a structure according to Formula 1A, and wherein each of the repeat units in the second plurality of repeat units has a structure according to Formula 2

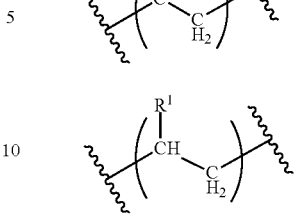

Formula 1A

Formula 2 where $R^1$ is a hydrogen or a substituted or unsubstituted, linear or branched, $C_2$-$C_{12}$ alkyl or heteroalkyl.

Feature 145. The resin composition according to any one of Features 130-194, wherein the polyolefin copolymer comprises about 80% to about 99%, about 85% to about 99%, about 90% to about 99%, or about 95% to about 99% polyolefin repeat units by weight based upon a total weight of the polyolefin copolymer.

Feature 146. The resin composition according to any one of Features 130-194, wherein the polyolefin copolymer comprises about 1% to about 5%, about 1% to about 3%, about 2% to about 3%, or about 2% to about 5% ethylene by weight based upon a total weight of the polyolefin copolymer.

Feature 147. The resin composition according to any one of Features 130-194, wherein the polyolefin copolymer is substantially free of polyurethanes.

Feature 148. The resin composition according to any one of Features 130-194, wherein polymer chains of the polyolefin copolymer are substantially free of urethane repeat units.

Feature 149. The resin composition according to any one of Features 130-194, wherein the resin composition is substantially free of polymer chains including urethane repeat units.

Feature 150. The resin composition according to any one of Features 130-194, wherein the polyolefin copolymer is substantially free of polyamide.

Feature 151. The resin composition according to any one of Features 130-194, wherein polymer chains of the polyolefin copolymer are substantially free of amide repeat units.

Feature 152. The resin composition according to any one of Features 130-194, wherein the resin composition is substantially free of polymer chains including amide repeat units.

Feature 153. A resin composition comprising: a polypropylene copolymer, and an effective amount of a polymeric resin modifier.

Feature 154. The resin composition according to any one of Features 130-194, wherein the resin composition has an abrasion loss of a about 0.05 cubic centimeters (cm³) to about 0.1 cubic centimeters (cm³), about 0.07 cubic centimeters (cm³) to about 0.1 cubic centimeters (cm³), about 0.08 cubic centimeters (cm³) to about 0.1 cubic centimeters (cm³), or about 0.08 cubic centimeters (cm³) to about 0.11 cubic centimeters (cm³) pursuant to ASTM D 5963-97a using the Material Sampling Procedure.

Feature 155. The resin composition according to any one of Features 130-194, wherein the effective amount of the polymeric resin modifier is an amount effective to allow the resin composition to pass a flex test pursuant to the Cold Ross Flex Test using the Plaque Sampling Procedure.

Feature 156. A resin composition comprising: a polypropylene copolymer, and an effective amount of a polymeric resin modifier.

Feature 157. The resin composition according to any one of Features 130-194, wherein the effective amount of the polymeric resin modifier is an amount effective to allow the resin composition to pass a flex test pursuant to the Cold Ross Flex Test using the Plaque Sampling Procedure without a significant change in an abrasion loss as compared to an abrasion loss of a second resin composition identical to the resin composition except without the polymeric resin modifier when measured pursuant to ASTM D 5963-97a using the Material Sampling Procedure.

Feature 158. The resin composition according to any one of Features 130-194, wherein the abrasion loss of the resin composition is about 0.05 cubic centimeters (cm$^3$) to about 0.1 cubic centimeters (cm$^3$), about 0.07 cubic centimeters (cm$^3$) to about 0.1 cubic centimeters (cm$^3$), about 0.08 cubic centimeters (cm$^3$) to about 0.1 cubic centimeters (cm$^3$), or about 0.08 cubic centimeters (cm$^3$) to about 0.11 cubic centimeters (cm$^3$).

Feature 159. The resin composition according to any one of Features 130-194, wherein the polypropylene copolymer is a random copolymer.

Feature 160. The resin composition according to any one of Features 130-194, wherein the polypropylene copolymer comprises about 80% to about 99%, about 85% to about 99%, about 90% to about 99%, or about 95% to about 99% polypropylene repeat units by weight based upon a total weight of the polypropylene copolymer.

Feature 161. The resin composition according to any one of Features 130-194, wherein the polypropylene copolymer comprises about 1% to about 5%, about 1% to about 3%, about 2% to about 3%, or about 2% to about 5% ethylene by weight based upon a total weight of the polypropylene copolymer.

Feature 162. The resin composition according to any one of Features 130-194, wherein the polypropylene copolymer is a random copolymer comprising about 2% to about 3% of a first plurality of repeat units by weight and about 80% to about 99% by weight of a second plurality of repeat units based upon a total weight of the polypropylene copolymer; wherein each of the repeat units in the first plurality of repeat units has a structure according to Formula 1A and each of the repeat units in the second plurality of repeat units has a structure according to Formula 1B

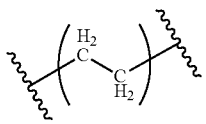

Formula 1A

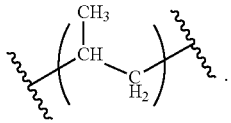

Formula 1B

Feature 163. The resin composition according to any one of Features 130-194, wherein the polypropylene copolymer is substantially free of polyurethane.

Feature 164. The resin composition according to any one of Features 130-194, wherein polymer chains of the polypropylene copolymer are substantially free of urethane repeat units.

Feature 165. The resin composition according to any one of Features 130-194, wherein the resin composition is substantially free of polymer chains including urethane repeat units.

Feature 166. The resin composition according to any one of Features 130-194, wherein the polypropylene copolymer is substantially free of polyamide.

Feature 167. The resin composition according to any one of Features 130-194, wherein polymer chains of the polypropylene copolymer are substantially free of amide repeat units.

Feature 168. The resin composition according to any one of Features 130-194, wherein the resin composition is substantially free of polymer chains including amide repeat units.

Feature 169. The resin composition according to any one of Features 130-194, wherein polymers in the resin composition consist essentially of propylene repeat units.

Feature 170. The resin composition according to any one of Features 130-194, wherein the resin composition consists essentially of polypropylene copolymers.

Feature 171. The resin composition according to any one of Features 130-194, wherein the polypropylene copolymer is a random copolymer of ethylene and propylene.

Feature 172. The resin composition according to any one of Features 130-194, wherein the abrasion loss of the resin composition is within about 20% of an abrasion loss of the otherwise same resin composition except without the resin modifier when measured pursuant to ASTM D 5963-97a using the Material Sampling Procedure.

Feature 173. The resin composition according to any one of Features 130-194, wherein the resin composition has a % crystallization of about 35%, about 30%, about 25%, or less when measured according to the Differential Scanning calorimeter (DSC) Test using the Material Sampling Procedure.

Feature 174. The resin composition according to any one of Features 130-194, wherein the resin composition has a % crystallization that is at least 4 percentage points less than a % crystallization of the otherwise same resin composition except without the polymeric resin modifier when measured according to the DSC Test using the Material Sampling Procedure.

Feature 175. The resin composition according to any one of Features 130-194, wherein the effective amount of the polymeric resin modifier is about 5% to about 30%, about 5% to about 25%, about 5% to about 20%, about 5% to about 15%, about 5% to about 10%, about 10% to about 15%, about 10% to about 20%, about 10% to about 25%, or about 10% to about 30% by weight based upon a total weight of the resin composition.

Feature 176. The resin composition according to any one of Features 130-194, wherein the effective amount of the polymeric resin modifier is about 20%, about 15%, about 10%, about 5%, by weight, or less based upon a total weight of the resin composition.

Feature 177. The resin composition according to any one of Features 130-194, wherein the polymeric resin modifier comprises about 10% to about 15% ethylene repeat units by weight based upon a total weight of the polymeric resin modifier.

Feature 178. The resin composition according to any one of Features 130-194, wherein the polymeric resin modifier comprises about 10% to about 15% repeat units according to Formula 1A by weight based upon a total weight of the polymeric resin modifier Formula 1A

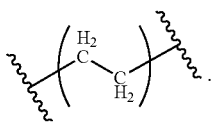

Formula 1B

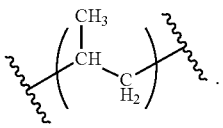

Feature 179. The resin composition according to any one of Features 130-194, wherein the resin composition has a total ethylene repeat unit content of about 3% to about 7% by weight based upon a total weight of the resin composition.

Feature 180. The resin composition according to any one of Features 130-194, wherein the polymeric resin modifier has an ethylene repeat unit content of about 10% to about 15% by weight based upon a total weight of the polymeric resin modifier.

Feature 181. The resin composition according to any one of Features 130-194, wherein the polymeric resin modifier is a copolymer comprising isotactic repeat units derived from an olefin.

Feature 182. The resin composition according to any one of Features 130-194, wherein the polymeric resin modifier is a copolymer comprising repeat units according to Formula 1B, and wherein the repeat units according to Formula 1B are arranged in an isotactic stereochemical configuration Formula 1B

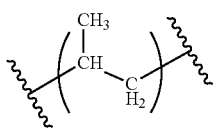

Feature 183. The resin composition according to any one of Features 130-194, wherein an otherwise same resin composition except without the polymeric resin modifier does not pass the cold Ross flex test using the Material Sampling Procedure.

Feature 184. The resin composition according to any one of Features 130-194, wherein the polymeric resin modifier is a copolymer comprising isotactic propylene repeat units and ethylene repeat units.

Feature 185. The resin composition according to any one of Features 130-194, wherein the polymeric resin modifier is a copolymer comprising a first plurality of repeat units and a second plurality of repeat units; wherein each of the repeat units in the first plurality of repeat units has a structure according to Formula 1A and each of the repeat units in the second plurality of repeat units has a structure according to Formula 1B, and wherein the repeat units in the second plurality of repeat units are arranged in an isotactic stereochemical configuration Formula 1A

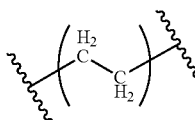

Feature 186. The resin composition according to any one of Features 130-194, wherein the polymeric resin modifier is a metallocene catalyzed polymer.

Feature 187. The resin composition according to any one of Features 130-194, wherein the polymeric resin modifier is a metallocene catalyzed copolymer.

Feature 188. The resin composition according to any one of Features 130-194, wherein the polymeric resin modifier is a metallocene catalyzed propylene copolymer.

Feature 189. The resin composition according to any one of Features 130-194, wherein the plate further comprises a clarifying agent.

Feature 190. The resin composition according to any one of Features 130-194, wherein the clarifying agent is present in an amount from about 0.5% by weight to about 5% by weight or about 1.5% by weight to about 2.5% by weight based upon a total weight of the polyolefin resin.

Feature 191. The resin composition according to any one of Features 130-194, wherein the clarifying agent is selected from the group consisting of a substituted or unsubstituted dibenzylidene sorbitol, 1,3-O-2,4-bis(3,4-dimethylbenzylidene) sorbitol, 1,2,3-trideoxy-4,6:5,7-bis-O-[(4-propylphenyl)methylene], and a derivative thereof.

Feature 192. The resin composition according to any one of Features 130-194, wherein the clarifying agent comprises an acetal compound that is the condensation product of a polyhydric alcohol and an aromatic aldehyde.

Feature 193. The resin composition according to any one of Features 130-194, wherein the polyhydric alcohol is selected from the group consisting of acyclic polyols such as xylitol and sorbitol and acyclic deoxy polyols such as 1,2,3-trideoxynonitol or 1,2,3-trideoxynon-1-enitol.

Feature 194. The resin composition according to any one of Features 130-194, wherein the aromatic aldehyde is selected from the group consisting of benzaldehyde and substituted benzaldehydes.

We claim:

1. A sole structure for an article of footwear, the sole structure comprising:
    a plate comprising a polyolefin resin, a polymeric resin modifier, and a clarifying agent, the plate having a first side and a second side, wherein the first side is configured to be ground- facing when the plate is a component of an article of footwear;
    wherein the polyolefin resin comprises a polyolefin copolymer and has a % crystallization of about 35% or less when measured according to the Differential Scanning Calorimeter (DSC) Test using the Material Sampling Procedure, and
    the polymeric resin modifier comprises about 10% to about 15% ethylene repeat units by weight based upon a total weight of the polymeric resin modifier.

2. The sole structure according to claim 1, wherein the polymeric resin modifier is about 5% to about 30% by weight based upon a total weight of the polyolefin resin composition.

3. The sole structure according to claim 2, wherein the polymeric resin modifier is a copolymer comprising isotactic propylene repeat units and ethylene repeat units.

4. The sole structure according to claim 1, wherein the polyolefin resin passes a flex test pursuant to the Cold Ross Flex Test using the Plaque Sampling Procedure.

5. The sole structure according to claim 1, wherein the polyolefin resin has an abrasion loss of about 0.05 cubic centimeters to about 0.1 cubic centimeters pursuant to ASTM D 5963-97a using the Material Sampling Procedure.

6. The sole structure according to claim 1, wherein the abrasion loss of the resin composition is about 0.08 cubic centimeters to about 0.1 cubic centimeters.

7. The sole structure according to claim 1, wherein the polyolefin copolymer comprises a polypropylene copolymer.

8. The sole structure according to claim 1, wherein the clarifying agent is present in an amount from about 0.5% by weight to about 5% by weight based upon a total weight of the polyolefin resin.

9. The sole structure according to claim 1, wherein the clarifying agent is selected from the group consisting of a substituted or unsubstituted dibenzylidene sorbitol, 1,3-O-2,4-bis(3,4-dimethylbenzylidene) sorbitol, 1,2,3-trideoxy-4,6:5,7-bis -O-[(4-propylphenyl)methylene], and a derivative thereof.

10. The sole structure according to claim 1, wherein the clarifying agent comprises an acetal compound that is the condensation product of a polyhydric alcohol and an aromatic aldehyde.

11. The sole structure according to claim 10, wherein the polyhydric alcohol is selected from the group consisting of acyclic polyols such as xylitol and sorbitol and acyclic deoxy polyols such as 1,2,3-trideoxynonitol or 1,2,3-trideoxynon-1-enitol and the aromatic aldehyde is selected from the group consisting of benzaldehyde and a substituted benzaldehyde.

12. The sole structure according to claim 1, further comprising a textile disposed on one or both of the first side and the second side.

13. The sole structure according to claim 12, further comprising a lower chassis, wherein the lower chassis is configured to be on the first side of the plate.

14. The sole structure according to claim 12, wherein the chassis includes traction elements on a side of the chassis that is configured to be ground facing when the sole structure is a component of an article of footwear.

15. An article of footwear comprising an upper of the article of footwear and a sole structure according to claim 1.

16. The article of footwear according to claim 15, wherein the article includes a mechanical bond between the plate and the upper of the article of footwear.

17. The article of footwear according to claim 15, wherein the article includes an adhesive bond between the surface comprising the textile and the upper of the article of footwear.

18. The article of footwear according to claim 15, wherein one or more of the resin composition of the plate, the resin composition of the chassis, and a polymeric material of the upper are melded together.

* * * * *